United States Patent [19]

Raz

[11] Patent Number: 5,701,480
[45] Date of Patent: *Dec. 23, 1997

[54] DISTRIBUTED MULTI-VERSION COMMITMENT ORDERING PROTOCOLS FOR GUARANTEEING SERIALIZABILITY DURING TRANSACTION PROCESSING

[75] Inventor: Yoav Raz, Newton, Mass.

[73] Assignee: Digital Equipment Corporation, Maynard, Mass.

[ * ] Notice: The term of this patent shall not extend beyond the expiration date of Pat. No. 5,504,900.

[21] Appl. No.: 47,271

[22] Filed: Apr. 14, 1993

Related U.S. Application Data

[63] Continuation-in-part of Ser. No. 778,254, Oct. 17, 1991, abandoned.

[51] Int. Cl.[6] .................................................. G06F 15/00
[52] U.S. Cl. ............................... 395/671; 395/182.17
[58] Field of Search .............................. 395/700, 650, 395/600, 610, 671, 182.17

[56] References Cited

U.S. PATENT DOCUMENTS

| 4,224,664 | 9/1980 | Trinchieri | 364/200 |
|---|---|---|---|
| 4,249,241 | 2/1981 | Aberle et al. | 364/200 |
| 4,627,019 | 12/1986 | Ng | 364/900 |
| 4,881,166 | 11/1989 | Thompson et al. | 364/200 |
| 5,193,188 | 3/1993 | Franaszek et al. | 395/650 |
| 5,212,788 | 5/1993 | Lomet et al. | 395/600 |
| 5,263,156 | 11/1993 | Bowen et al. | 395/600 |
| 5,369,757 | 11/1994 | Spiro et al. | 395/575 |
| 5,504,900 | 4/1996 | Raz | 395/650 |

FOREIGN PATENT DOCUMENTS 0457112   11/1991   European Pat. Off. .......... G06F 9/46

OTHER PUBLICATIONS

H.F. Korth & A. Silberschatz, *Database System Concepts*, McGraw-Hill, Inc., United States, pp. xiv–xix, 490–503 (1991).

Vassos Hadzilacos, "A Knowledge Theoretic Analysis of Atomic Commitment Protocols," Proc. of the Sixth ACM Symposium on Principles of Database Systems, Association for Computing Machinery, New York, NY, Mar. 23–25, 1987. pp. 129–134.

Joseph Y. Halpern, "Using Reasoning about Knowledge to Analyze Distributed Systems," Research Report RJ 5522 (56421) Mar. 3, 1987, Computer Science, IBM Almaden Research Center, San Jose, California, 1987.

(List continued on next page.)

Primary Examiner—Kevin A. Kriess
Assistant Examiner—Kakali Chaki

[57] ABSTRACT

In a multi-version database, copies of prior committed versions (snapshots) are kept for access by the read-only transactions. The read-write transactions are selectively aborted to enforce an order of commitment of read-write transactions that is the same as an order of conflicts among the read-write transactions. In a preferred embodiment, the read-write transactions are serialized by maintaining and referencing a graph of conflicts among read-write transactions, and the read-only transactions are serialized by a timestamp mechanism for selection of the snapshots to be read. Each time that a read-write transaction is committed, the read-write transaction is assigned a unique timestamp that is used to timestamp all resources committed by the read-write transaction. Upon starting, each read-only transaction is also assigned a timestamp. Each read-only transaction reads only the latest committed versions of all resources, that are timestamped earlier than the timestamp of the read-only transaction. In a multiprocessing system, the timestamps are issued to global coordinators and distributed locally with atomic commit messages and global queries. Moreover, read-write transactions may selectively access a hierarchy of uncommitted versions to prepare for various possible commitment orders. The hierarchy defines a path for record access and for cascading aborts. A plurality of mutually-conflicting uncommitted versions may be prepared for each transaction to prepare for all possible commitment orders.

34 Claims, 37 Drawing Sheets

OTHER PUBLICATIONS

Lampson et al., "Crash Recovery in a Distributed Data Storage System," Technical Report, Xerox, Palo Alto Research Center, Palo Alto, California, 1986.

Litwin et al., "Flexible Concurrency Control Using Value Dates," in Integration of Information Systems: Bridging Heterogeneous Databases, ed. A Gupta, IEEE Press. IEEE, New York, NY, 1989, pp. 144–145.

Weihl, "Distributed Version Management for Read–Only Actions," IEEE Transactions on Software Engineering, vol. SE–13, No. 1, IEEE, New York, NY, Jan. 1987, pp. 55–64.

Christos Papadimitriou, *The Theory Database Concurrency Control*, Computer Science Press, Inc., Rockville, Maryland, (1986), pp. 93–158, 201–224.

Vassos Hadzilacos, "A Theory of Reliability in Database Systems," *Journal of the ACM*, vol. 35, No. 1, Jan., 1988, pp. 121–145, Association for Computing Machinery, New York, New York.

Agrawal et al., "Modular Synchronization in Multiversion Databases: Version Control and Concurrency Control," *Proc. of the 1989 ACM SIGMOD Int. Conf. on Management of Data*, pp. 408–417, Portland, Oregon, Jun., 1989 Association for Computing Machinery, New York N.Y.

Raghavan et al., "Database Availability for Transaction Processing," *Digital Technical Journal*, vol. 3, No. 1, Winter 1991, pp. 65–69, Digital Equipment Corp., Maynard, Mass. 1991.

Bober et al., "Multiversion Query Locking," Proc. of the Eighteenth Int. Conf. on Very Large Databases, Vancouver, British Columbia, (Aug. 1992), pp. 497–510.

Agrawal et al., "An Approach to Eliminate Transaction Blocking in Locking Protocols," *Proc. of the Eleventh ACM Symposium on Principles of Database Systems*, San Diego Calif. (Jun. 1992), pp. 223–235.

Bober et al., "On Mixing Queries and Transactions Via Multiversion Locking," *Proc. of the Eighth Int. Conf. on Data Engineering*, Tempe, (Feb. 1992), pp. 535–545.

Vaijalainen et al., "Prepare and Commit Certification for Decentralized Transaction Management in Rigorous Heterogeneous Multidatabase," *IEEE*, New York, N.Y. (1992), pp. 470–479.

Mohan et al., "Efficient and Flexible Methods for Transient Versioning of Records to Avoid Locking by Read–Only Transactions," 1992 ACM SIGMOND Conf. Assoc.–Computing Machinery, New York, NY (Jun. 1992), pp. 124–133.

Silberschatz et al., "Database Systems: Achievements and Opportunities," *Communications of the ACM*, vol. 34, No. 10, Association for Computing Machinery, New York, N.Y., Oct., 1991, pp. 110, 120.

Breitbart et al., "On Rigorous Transaction Scheduling," *IEEE Transactions on Software Engineering*, vol. 17, No. 9, IEEE, New York, NY (Sept. 1991).

Agrawal et al., "Performance Characteristics of Protocols With Ordered Shared Locks," *Proceedings of the Seventh IEEE International Conference on Data Engineering*, Institute of Electrical and Electronics Engineers, New York, N.Y. (Apr. 1991), pp. 592–601.

Georgakopoulos et al., "On Serializability of Multidatabase Transactions through Forced Local Conflicts," *Proceedings of the Seventh Int. Conf. on Data Engineering*, Kobe, Japan (Apr. 1991).

L. Hobbs et al., "Rdb/VMS—A Comprehensive Guide", Digital Press, Digital Equipment Corporation, Maynard, Mass., 1991.

David Lomet, "Consistent Timestamping for Transactions in Distributed Systems," TR CRL 90/3, Digital Equipment Corporation, CRL, Cambridge, Mass. (Sep. 1990).

Sheth et al., "Federated Database System for Managing Distributed Hetergeneous and Autonomous Databases," *ACM Computing Surveys*, Col. 22, No. 3, Assoc. for Computing Machinery, New York, N.Y. (Sep. 1990), pp. 183–236.

Y. Breitbart, "Multidatabase Inoperability," Sigmond Record, vol. 19, No. 3, Assoc. for Computing Machinery, New York, N.Y. (Sep. 1990), pp. 53–60.

Breitbart et al., "Reliable Transaction Management in a Multidatabase System," *Proc. of the ACM SIGMOD Conf. on Management of data*, Atlantic City, New Jersey (Jun. 1990), pp. 215–224.

Agrawal et al., "Locks with Constrained Sharing," *Proceedings of the Nineth ACM Symposium on Principles of Database Systems, Association for Computing Machinery*, New York, N.Y. (Apr. 1990), pp. 85–93.

Elmagarmid et al., "A Paradigm for Concurrency Control in Heterogeneous Distributed Database Systems," *IEEE*, New York, N.Y. (1990), pp. 17–46.

Georgakopoulos et al., "Transaction Management in Multidatabase Systems," Technical Report #UH–CS–89–20, Depart. of Computer Science, University of Houston, Houston, Texas (Sep. 1989).

Calton Pu, "Transactions across Heterogeneous Databases: the Superdatabase Architecture," Department of Computer Science, Columbia University, New York, N.Y. (Jun. 1988), pp. 1–18.

Carlton Pu, "Superdatabase for Composition of Heterogeneous Databases," *4th International Conference on Data Engineering*, Los Angeles, California IEEE, New York, N.Y. (Feb. 1–5, 1988), pp. 548–555.

Garcia–Molina et al., "Node Autonomy in Distributed Systems," IEEE, New York, N.Y. (1988), pp. 158–166.

William E. Weihl, "Distributed Version Management for Read–Only Actions," *IEEE Transactions on Software Engineering*, vol. SE–13, No. 1, IEEE, New York, N.Y. (Jan. 1987), pp. 55–64.

Bernstein et al., "Concurrency Control and Recovery in Database Systems," Addison–Wesley, Reading, Mass. (1987), pp. 58–78.

Chan et al., "Implementing Distributed Read–Only Transactions," *IEEE Transactions on Software Engineering*, vol. SE–11, No. 2, IEEE, New York, N.Y. (Feb. 1985), pp. 205–212.

J. Eliot B. Moss, Nested Transactions, The MIT Press, Cambridge, Mass. (1985).

Kung et al., "On Optimistic Methods for Concurrency Control," *ACM Transactions on Database Systems*, vol. 6, No. 2, Columbus, Ohio (Jun. 1981), pp. 213–226.

Jim Gray, "Operating Systems: An Advanced Course," Lecture Notes in Computer Science 60, IBM Research Laboratory, San Jose Calif. (1978), pp. 393–481.

OS/Texas–11 Programming Manual, Digital Equipment Corporation, Maynard, Mass. (Apr. 20, 1972).

Roger Bamford, "Using Multiversioning to Improve Performance Without Loss of Consistency," Abstract, Proc. of the ACM SIGMOND Int. Conf. on Management of Data, San Diego, Calif. (Jun. 1992), p. 164.

Yoav Raz, "The Principle of Commitment Ordering, or Guaranteeing Serializability in a Heterogeneous Environment of Multiple Autonomous Resource Managers, Using Atomic Commitment", in the Proc. of the Eighteenth Int. Conf. on Very Large Data Bases, pp. 292–312, Vancouver, Canada, Aug. 1992.

H. Garcia–Molina, G. Wiederhold, "Read–Only Transactions in a Distributed Database", ACM Trans. Database Systems 7(2), Association for Computing Machinery, New York, N.Y. Jun. 1982, pp. 209–234.

J. Puustjarvi, "Distributed Management of Transactions in Heterogeneous Distributed Database Systems", BIT, 31(2), pp. 406–420, 1991.

Agrawal et al., "The Performance of Protocols based on Locks with Ordered Sharing," University of California, Department of Computer Science TRCS 92–9, Santa Barbara, California, Apr., 1992.

Breitbart et al., "Overview of Multi–Database Transaction Management," University of Kentucky, Lexington, Kentucky.

Breitbart et al., "Complexity of Global Transaction Management in Multidatabase Systems," Technical Report No. 198–91, University of Kentucky, Lexington, Kentucky, Nov. 1, 1991.

Breitbart et al., "Using Delayed Commitment in Locking Protocols for Real–Time Databases," Proc. of the ACM SIGMOD Int. Conf. on Management of of Data, San Diego, Calif. (Jun. 1992), pp. 104–112.

Breitbart et al., "Strong Recoverabilty in Multidatabase Systems," Proceedings, 2nd International Workshop on Research Issues in Database Engineering (RIDE–TQP), Phoenix, AZ, February 1992.

CASE 1: T₂ CAN READ THE WRITE DATA OF
T₁ ONLY AFTER T₁ IS COMMITED (A)  $T_1$ —— $(W_X \ C_1)$ — — — —
     $T_2$ ———————— $R_X$ — $C_2$ —

(B)  $T_1$ —— $(W_X \ C_1)$ — — — — ⎫
     $T_2$ — $R_X$ ——————— $C_2$ — ⎭ INCONSISTENT (C)  $T_1$ —— $(W_X \ C_1)$ — — — —
     $T_2$ — $R_X$ — $C_2$ —————

FIG. 4A

CASE 2: T₂ CAN READ THE WRITE DATA OF
T₁ BEFORE T₁ IS COMMITED (A)  $T_1$ — $W_X$ ——— $C_1$ — — —
     $T_2$ ——— $R_X$ ——— $C_2$ — —

(B)  $T_1$ ——— $W_X$ — $C_1$ — — — ⎫
     $T_2$ — $R_X$ ——————— $C_2$ — — ⎭ INCONSISTENT (C)  $T_1$ ——— $W_X$ ——— $C_1$ — —
     $T_2$ — $R_X$ ——— $C_2$ — — —

(D)  $T_1$ — $W_X$ ——————— $C_1$ — — ⎫
     $T_2$ ——— $R_X$ — $C_2$ — — — ⎭ INCONSISTENT (E)  $T_1$ ———— $W_X$ — $C_1$ — —
     $T_2$ — $R_X$ — $C_2$ —————

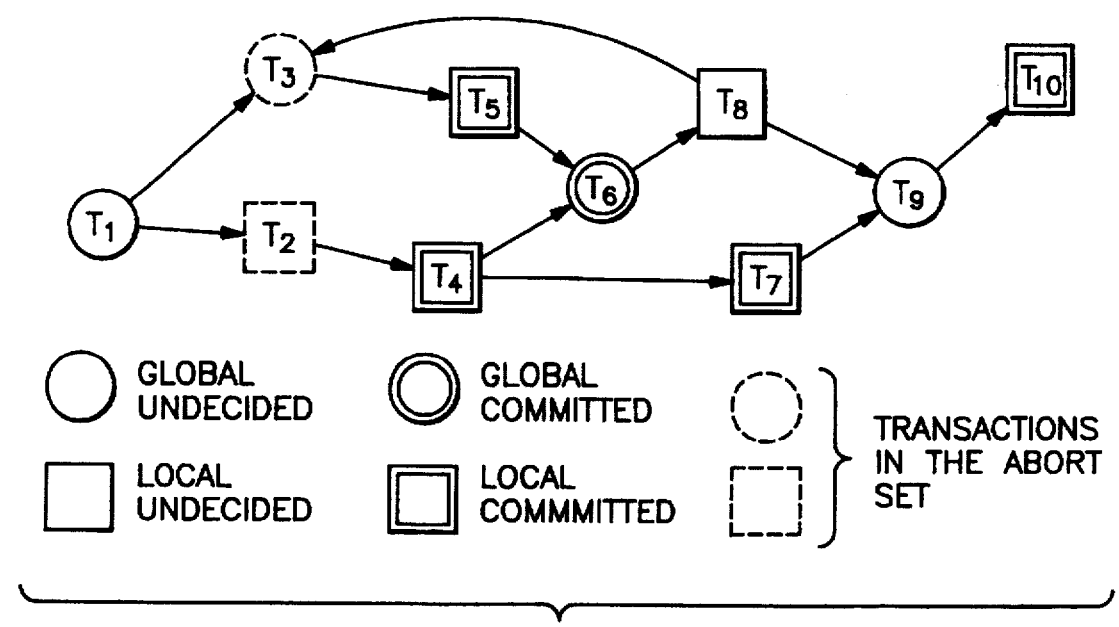
FIG. 9
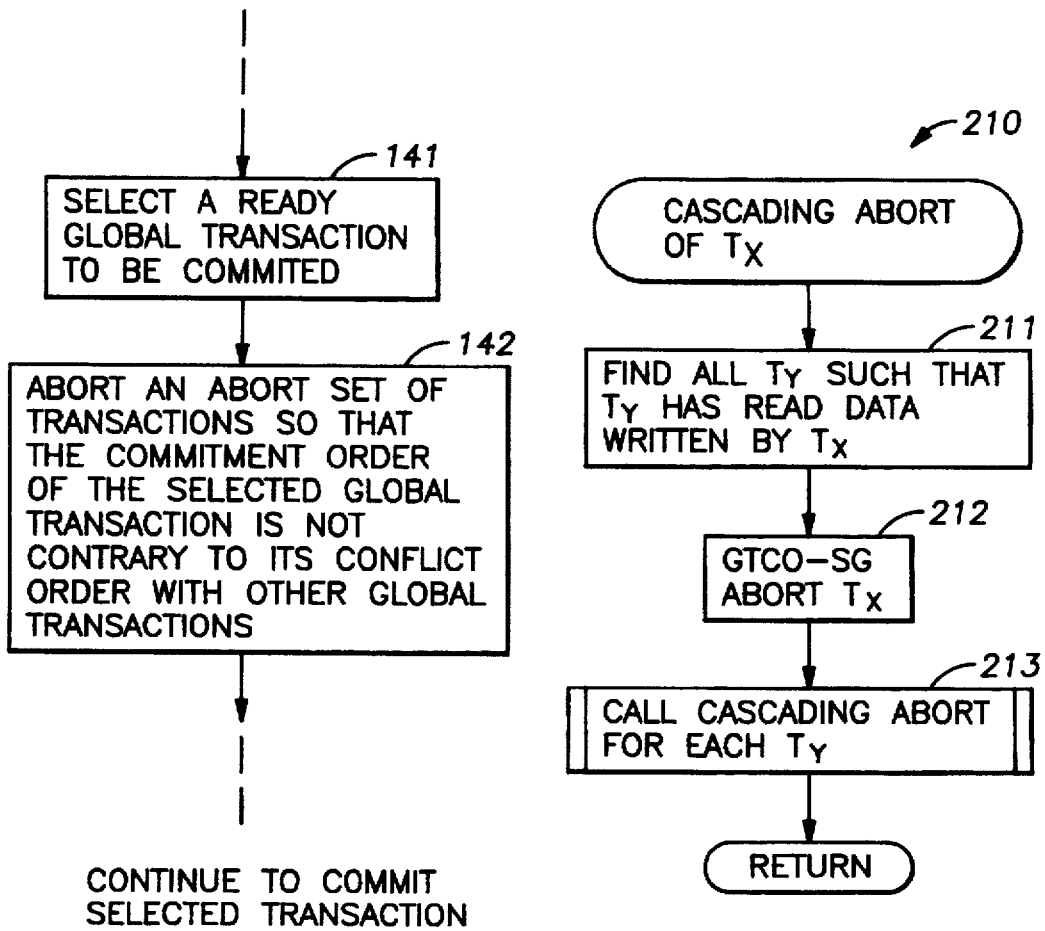
FIG. 10
FIG. 17

BOTH T₁ AND T₂ WRITE TO LAST COMMITTED VERSION

T₁ READS LAST COMMITTED VERSION

T₂ WRITES TO LAST COMMITTED VERSION

T₁ WRITES TO LAST COMMITTED VERSION

T₂ READS LAST COMMITTED VERSION

T₁ READS OR WRITES TO UNCOMMITTED BUT READY VERSION WRITTEN BY T₂

T₂ READS OR WRITES TO UNCOMMITTED BUT READY VERSION WRITTEN BY T₁

NOTES: 1. EXCLUSIVE CANDIDATES FOR NEXT COMMIT ARE ON THE FIRST LOWER LEVEL ($T_{1a}$, $T_{2a}$, $T_{3a}$).
2. MUTUAL CONFLICTS (NOT SHOWN) ARE IMPLIED BETWEEN PLURAL INSTANCES OF EACH TRANSACTION.
3. ADDITIONAL CONFLICTS (NOT SHOWN) MAY OCCUR.

| 610 |
|---|
| TSN |
| POINTER TO NEXT YOUNGER TSN INSTANCE |
| POINTER TO PARENT |
| POINTER TO YOUNGER SIBLING |
| POINTER TO OLDER SIBLING |
| POINTER TO FIRST CHILD |
| READ RECORD LIST |
| WRITE RECORD LIST |
| ABORT LIST |
| READY FLAG |

FIG. 40

| 620 |
|---|
| RECORD ID |
| POINTER TO PRIOR VERSION |
| READ TRANSACTION LIST |
| WRITE TRANSACTION LIST |
| DATA |
| RECORD TSN |
| SNAPSHOT TSN |

FIG. 41

DISTRIBUTED MULTI-VERSION COMMITMENT ORDERING PROTOCOLS FOR GUARANTEEING SERIALIZABILITY DURING TRANSACTION PROCESSING

RELATED APPLICATIONS

The present application is a continuation-in-part of Yov Raz, U.S. patent application Ser. No. 07/778,254 filed Oct. 17, 1991, now abandoned entitled "Guaranteeing Global Serializability By Applying Commitment Ordering Selectively to Global Transactions." The prior application Ser. No. 07/778,254 shows that the component operations of a number of global transactions can be distributed and scheduled for execution using any kind of resource manager with a local scheduler that ensures local serializability, yet global consistency can be maintained by enforcing a global transaction commitment ordering that is consistent with the order of conflicts among global transactions, including indirect conflicts caused by local transactions. Conformance to such a global transaction commitment ordering in such a distributed transaction processing system guarantees the serializability of the combined (global) schedule.

The present application includes disclosure from Yoav Raz, U.S. patent application Ser. No. 07/703,394 filed May 21, 1991, now abandoned entitled "Commitment ordering for Guaranteeing Serializability Across Distributed Transactions," which shows that if global atomicity of transactions is achieved via an atomic commitment protocol, then a "commitment ordering" property of transaction histories is a sufficient condition for global serializability. The performance of conflicting operations is scheduled according to available resources, and the "commitment ordering" property is enforced by ensuring that the results of the conflicting operations are committed in the same order as the order of performance of the conflicting operations.

The present application also includes disclosure from Spiro et al., U.S. patent application Ser. No. 07/717,212 filed Jun. 18, 1991, now U.S. Pat. No. 5,369,757 entitled "Recovery Logging in the Presence of Snapshot Files by Ordering of Buffer Pool Flushing," which discloses aspects of a multi-version transaction processing system that permits read-only transactions to bypass write locks in the "Rdb/VMS" (Trademark) brand of operating system sold by Digital Equipment Corporation of Maynard, Mass. 01754-1499.

BACKGROUND OF THE INVENTION

1. Field of the Invention

The present invention relates generally to distributed computing, and more particularly to a transaction processing system in which component operations in related transactions are distributed so that at least one operation in a second transaction is performed before a first transaction having a conflicting operation is committed. The present invention specifically concerns a method and apparatus for scheduling the commitment of conflicting transactions in a multi-version transaction processing system that allows read-only transactions to be executed without blocking read-write transactions or being blocked by the read-write transactions.

2. Description of the Background Art

A desirable feature of a computing system is the ability to recover from partial system failures that interrupt memory write operations. If an application program has a memory write operation in progress at the time of the system failure, it is most likely that the memory record will become erroneous. To enable the recovery of memory records after a partial system failure, it is necessary for the application program to keep backup copies of the records in nonvolatile memory. When the computing system is restarted, the memory records to be recovered are replaced with the backup copies.

To facilitate the making of backup copies and the recovery of memory records, the operating system typically provides an established set of memory management procedures that can be invoked or called from an application program to define a "recovery unit." The recovery unit consists of program statements between a "START" statement and a "COMMIT" statement. All of the statements in the "recovery unit" must be completed before the memory records modified by the statements in the recovery unit are made available for subsequent processing. The "START" statement corresponds to initiating the making of a backup copy in nonvolatile memory, and the "COMMIT" statement corresponds to switching of the backup copy with a modified version. The statements in the "recovery unit" specify operations in a single "transaction." Upon recovering from a partial system error, inspection of the nonvolatile memory will reveal that the operations in the single "transaction" are either all completed, or none of them are completed.

In a distributed computing system, the operations in a single transaction may modify files in different data bases, and the files may be shared by other processes. During the operation of the transaction, the files may be inconsistent for a time, although the files will be consistent upon completion of the transaction. A typical example is a transfer of funds from one account to another, in which a first account is debited, and at a slightly later time, another account is credited. During the interim, the two accounts are inconsistent because the sum of the two accounts does not represent the total funds in the two accounts. Due to inconsistency when files are being modified by a transaction, it is known to prevent other processes from accessing the files until the modification is finished. Atomicity can be assured in this example by performing commitment for both files at the same time and place. By changing a single flag, for example, the backup copies of each file can be replaced at the same time with the modified versions of the files. In many instances, however, it is desirable to distribute the operations in a transaction among multiple processors or processes in a computing system, and to commit the transaction by committing the operations in each process or processor while permitting some variability between the times of commitment. In these instances, an "atomic commitment protocol" is typically used to ensure atomicity. The protocol requires the exchange of information about the state of the transaction between the processors or processes. To identify the transaction being performed, the transaction is typically assigned a unique "transaction identification number."

A widely used atomic commitment protocol is known as the "two-phase commit protocol." In a somewhat elementary example of this protocol, one processor or process in the computing system is assigned the role of a coordinator which initiates the commit process of a transaction. For this purpose, the coordinator sends a prepare command to all of the processors or processes participating in the transaction.

Upon receipt of the "prepare" command, each processor or process participating in the transaction checks whether the operation can be completed successfully, writes an indication of the decision to acknowledge successful completion together with the transaction identification number into permanent memory to remember that it is prepared for the transaction, and then sends an acknowledgement back to the coordinator processor, but does not yet commit its results for the transaction. The coordinator waits for acknowledgements from all of the participants. When the coordinator receives acknowledgements from all of the participants, the coordinator records in permanent memory a list of the participants and a notation that the transaction is now being completed, and then the coordinator sends "commit" commands to all of the participants. The coordinator, however, may receive a message from a participant indicating that it cannot prepare for the transaction, or the coordinator may fail to receive acknowledgements from all of the participants after a predetermined time period, possibly after the coordinator has retransmitted the "prepare" command. In this case the coordinator transmits an "abort" command to all of the participants.

Upon receipt of the "commit" command, each participant checks its permanent memory for the transaction identification number to determine whether the participant has prepared for the transaction, and, if it has, it then performs a "COMMIT" operation to write its results into permanent memory and clear the transaction ID from permanent memory in one "atomic" step. Then the participant sends an acknowledgement back to the coordinator. When the coordinator receives acknowledgments from all of the participants, it erases the list of participants from permanent memory, and the transaction is finished.

Additional complexity is introduced when it is desired to process global transactions concurrently across multiple processors or processes in a distributed computing system. It is well known that global serializability is not guaranteed merely by ensuring that each processor or process achieves local serializability, because local transactions may introduce indirect conflicts between distributed global transactions. It is impractical to permit a processor or process to view a global picture of all the conflicts in all of the other processors or processes. Without a global picture, however, it is difficult for a processor or process to ensure that there is a correlation between its serialability order and the serialability orders of the other processors or processes. Time-stamping of transaction requests and data updates is one method that has been used to address this problem of concurrency control. In general, concurrency control in a distributed computing system has been achieved at the expense of restricted autonomy of the local processors or processes, or by locking.

The problem of global deadlock also has to be addressed whenever global transactions are performed concurrently. One known solution is to provide a global transaction scheduler that decides whether or not to dispatch concurrent global transaction requests. An example is described Y. Breitbart et al., "Reliable Transaction Management in a Multidatabase System", *Proc. of the ACM SIGMOD conf. on Management of Data*, Atlantic City, N.J., June 1990, pp. 215-224. The global scheduler keeps track of global transaction requests for local locks on data items by using a global lock mechanism. Each global data item has a global lock associated with it. A global transaction that needs only to read a data item requests a global read-lock. Locks are conflicting if they are requested by two different transactions on the same data item and at least one of the requested locks is a write-lock. If two global transactions request conflicting global locks, the scheduler will prevent one of the transactions from proceeding because it knows that the two transactions will cause a conflict at the local site. The scheduler uses strict two-phase locking for allocating global locks to global transactions, and maintains a global "wait for graph." The "global wait for graph" is a directed Graph G=(V,E) whose set of vertices V is a set of global transactions and an edge $T_i \rightarrow T_j$ belongs to E if and only if Global transaction $T_i$ waits for a global lock allocated to global transaction $T_j$. If a global transaction waits for a global lock, then the transaction state becomes "blocked" and the transaction is included in the "global wait for graph." The transaction becomes active again only after it can obtain global locks that it was waiting for. To avoid global deadlocks, the "global wait for graph" is always made acyclic. To ensure data consistency in the presence of failures, the scheduler also uses a "commit graph" and a "wait-for-commit graph" to determine when to schedule a commit operation. The commit graph CG=<TS,E> is an undirected bipartite graph whose set of nodes TS consists of a set of global transactions (transaction nodes) and a set of local sites (site nodes). Edges from E may connect only transaction nodes with site nodes. An edge $(T_i, S_j)$ is in E if and only if transaction $T_i$ was executing at site $S_j$, and the commit operation for $T_i$ has been scheduled for processing. After the commit operation for $T_i$ is completed, $T_i$ is removed from the commit graph along with all edges incidental to $T_i$. Global database consistency is assured if the commit graph does not contain any loops. The wait-for-commit graph is a directed Graph G=(V,E) whose set of vertices V consists of a set of global transactions. An edge $T_i \rightarrow T_j$ is in E if and only if $T_i$ has finished its execution, but its commit operation is still pending and $T_j$ is a transaction whose commit operation should be completed or aborted before the commit of $T_i$ can be scheduled. The scheduler uses the following algorithm for constructing the wait-for-commit graph, and in scheduling a commit operation of transaction $T_i$:

1. For each site $S_k$ in which $T_i$ is executing, temporarily add the edge $T_i \rightarrow S_k$ to the commit graph.
2. If the augmented commit graph does not contain a cycle, then the global commit operation is submitted for processing, and the temporary edges become permanent.
3. If the augmented commit graph contains a cycle then:
   a) The edges $T_i \rightarrow T_{i1}, \ldots T_i \rightarrow T_{im}$ are inserted into the wait-for-commit graph. The set $\{T_{i1}, T_{i2}, \ldots T_{im}\}$ consists of all the transactions which appear in the cycle which was created as a result of adding the new edges to the commit graph.
   b) Remove the temporary edges from the commit graph.

The transaction $T_i$, however, need not necessarily wait for the completion of every transaction $T_{ik}$ such that $T_i \rightarrow T_{ik}$. It may be ready to be scheduled for a commit operation after some of transactions $T_{ik}$ such that $T_i \rightarrow T_{ik}$ (0<1<r) successfully commit (and in some cases, a successful commit of only one such transaction would be sufficient to schedule the transaction's commit!).

Global serializability can be guaranteed in a distributed transaction processing system by enforcing a "commitment ordering" for all transactions. In Yoav Raz, U.S. patent application Ser. No. 07/703,394, filed May 21, 1991, and entitled "Commitment Ordering For Guaranteeing Serializability Across Distributed Transactions," it was shown that if global atomicity of transactions is achieved via an atomic commitment protocol, then a "commitment ordering" property of transaction histories is a sufficient condition for global serializability. The "commitment ordering" property occurs when the order of commitment is the same as the order of performance of conflicting component operations of transactions. Moreover, it was shown that if all of the local processes were "autonomous," i.e., they do not share any concurrency control information beyond atomic commitment messages, then "commitment ordering" is also a necessary condition for global serializability.

Multi-version (MV) based database systems allow queries (read-only transactions) to be executed without blocking, or being blocked by updaters (read-write transactions). Although various mechanisms for multi-versioning have been proposed, most maintiain several prior versions of a data item or object. In general, there is a considerable storage cost for maintaining the required number of prior versions, and for reading older versions rather than younger versions of the data objects. Attempts to reduce these costs have focused on improving the efficiency of caching or buffering the prior versions, and on scheduling the read-only transactions in order reduce the number of prior versions that are kept in storage. In general, scheduling selectively delays the initiation of read-only transactions, and therefore involves a trade-off of querry response time for reduced storage cost and system overhead. It has also been proposed that consistency for read-only transactions should be relaxed, when appropriate, to permit the reading of younger versions, in order to reduce the number of prior versions. These performance issues are further discussed in P. Bober & M. Carey, "On Mixing Queries and Transactions via Multiversion Locking", in Proc. of the Eighth Int. Conf. on Data Engineering, pp. 535–545, Tempe, February 1992; and P. Bober & M. Carey, "Multiversion Query Locking", in Proc. of the Eighteenth Int. Conf. on Very Large Databases, pp. 497–510, Vancouver, British Columbia, August 1992.

A multi-versioning mechanism is employed in the "Rdb/VMS" (Trademark) and "VAX/DBMS" (Trademark) operating systems sold by Digital Equipment Corporation of Maynard, Mass. A "snapshot" mechanism eliminates the need for read locks and also prevents the blocking of read-only transactions by write locks. The "snapshot" mechanism permits a transaction to obtain, at any time, a consistent version of data existing at the time that the transaction begins. Write locks, however, are placed on records to be accessed by a read-write transaction, and the write locks are not released until the results of the read-write transaction are committed. Recoverability is further ensured by flushing to an "undo" log the "before-images" of records to be updated, and then flushing the updated records to state memory just before a transaction is committed. If a crash occurs, the updated records are replaced with "before images" that are obtained from the "undo log" to undo the effects of the failed transactions.

For ensuring recoverability, a "redo" log may be used instead of, or in addition to, an "undo" log. As described in the Spiro et al., U.S. patent application Ser. No. 07/717,212 filed Jun. 18, 1991, entitled "Recovery Logging in the Presence of Snapshot Files by Ordering of Buffer Pool Flushing," updated records are not flushed to state memory after every transaction. Instead, updated records are written sequentially to an afterimage log, and all of the updated records are flushed to state memory only when certain "check points" occur. The "check points" occur, for example, after a specified number of transactions, or after a predetermined number of bytes have been written to the after-image log after the last checkpoint. The "redo" recovery mechanism therefore allows the updated, committed records to remain in volatile memory. When a system crash occurs, the volatile state memory existing at the end of the last committed transaction is reconstructed by reading from the non-volatile state memory the state memory records existing at the time of the last checkpoint, and re-doing the modifications existing in the after-image log.

In a multi database environment, transactions may span several single-version based database systems, as well as multi-version based systems. The database system may implement various concurrency control techniques. It is required that a globally correct concurrency control is guaranteed at least for read-write transactions in such a system. In general, in the multi database environment, multi-versioning in more costly because of a larger number of outstanding transactions. Blocking by write locks from read-write transactions tends to establish a threshold for system performance, and in interactive querry systems, this threshold may cause troublesome delays in querry processing at times of peak demand. Therefore, there is a need for a method of distributed concurrency control that avoids blocking by write locks and is applicable to multi-version database systems in a heterogenous environment.

SUMMARY OF THE INVENTION

The present invention guarantees serializability in a computing system across distributed read-write and read-only transactions referencing a multi-version database, wherein copies of committed versions (snapshots) are kept in order to facilitate the processing of the read-only transactions. The "snapshots" include copies of "prior" committed versions, where a "prior" committed version is a version committed earlier than the last committed version. The read-only transactions may read the prior committed versions. To ensure serializability, however, a read-write transaction is not permitted to read the prior committed versions. The read-write transactions are selectively aborted to enforce an order of commitment of read-write transactions that is the same as an order of conflicts among the read-write transactions.

In a preferred embodiment, a performance advantage is obtained by preventing the read-only transactions from reading uncommitted versions, and by maintaining a sufficient number of "snapshot" versions so that read-only transactions need not be aborted or delayed. When a read-write transaction accesses a version, for example, a "snapshot" of the version is made at that time for the benefit of any read-only transactions. The new "snapshot" version is pushed on a queue of any previously existing "snapshot" version for the same resource. A "garbage collection" mechanism removes "snapshot" versions that are sufficiently old that they will not be needed by any read-only transactions.

In a preferred embodiment, different serializing mechanisms are used to handle read-write transactions and read-only transactions. Read-write transactions are serialized by maintaining and referencing a graph of conflicts among read-write transactions. Read-only transactions are serialized by employing a timestamp mechanism for selection of the snapshot versions to be read. Each time that a read-write transaction is committed, the read-write transaction is assigned a unique timestamp that is used to timestamp all resources committed by the read-write transaction. Upon starting, each read-only transaction is also assigned a timestamp. Each read-only transaction reads only the latest committed versions of all resources, that are timestamped earlier than the timestamp of the read-only transaction. In a multiprocessing environment employing a single processor, the timestamps are conveniently propagated to the various processes along with commit messages of an atomic commitment protocol. In a multiprocessor environment wherein multiple processors function as global coordinators, it is convenient to select a single one of the processors as a source for all of the time stamps.

In an alternative embodiment, time-stamps are not used, but instead the initiation of each global read-only transaction is synchronized with commitment of any global read-write transactions that consistently update the resources to be read by the global read-only transaction, so that only "update consistency" is achieved for the global read-only transaction.

In a typical transaction processing system, a second read-write transaction can read data written by a first transaction only after the second transaction has been committed. This restriction is a sufficient condition to ensure recoverability of the system. To practice the present invention in this case, when a second read-write transaction performs a read operation before a conflicting write operation of a first read-write transaction is committed at a time when the second read-write transaction has not yet committed, the second read-write transaction is aborted to ensure that the order in which the read-write transactions are committed is not different from the conflict order of the read-write transactions.

The present invention, however, permits the construction of a transaction processing system in which a second read-write transaction may read data written by a write operation of a first read-write transaction before the first read-write transaction is committed. In this case, depending on the respective order in which the two conflicting operations occur, either of the two read-write transactions may be aborted to ensure that the order of commitment is the same as the conflict order of the read-write transactions. Moreover, to insure recoverability, both of the read-write transactions should be aborted in the case of the read operation following the write operation and the read operation being performed before aborting of the write operation. In general, in a transaction processing system in which a second read-write transaction may read data written by a write operation of a read-write transaction, recoverability is enforced by a process of cascading aborts; the aborting of a transaction requires the additional aborting of all other transactions that have read data written by aborted transactions.

In a preferred embodiment in a multi-processing or multiprocessor system, a global transaction commitment order of read-write transactions is enforced by committing a selected global read-write transaction for which a result has been prepared, and aborting an abort set of other read-write transactions for which a result is being prepared or is prepared. The global read-write transaction to commit is selected, for example, by a commitment request from an atomic commitment coordinator. The abort set is selected so that the committing of the selected global read-write transaction is not contrary to the order of conflict with read-write transactions that are not included in the abort set. In a multiprocessor system in which an atomic commitment coordinator communicates with a plurality of transaction processors by way of "prepare" and "commit" commands, acknowledgement that a transaction has been "prepared" is preferably delayed until an "abort set" for the transaction has been minimized.

In a multiprocesssor or multiprocessing system, each process may have global transactions as well as local transactions, and the local transactions may be serialized by any kind of serialization mechanism. In this case, it is preferable to assume that a read-write transaction is global, unless indicated otherwise, because an incorrect assumption that a transaction is global will not cause a serializability violation. It is preferred to maintain a directed graph for each local processor or process. The nodes are all the undecided global read-write transactions being processed by the processor or process, together with all the non-aborted local transactions (i.e., committed and undecided) that lie on paths or possible further paths in the graph between undecided global read-write transactions. Edges in the graph represent the order of performance of conflicting operations of the read-write transactions. In particular, there is an edge from transaction T1 to transaction T2 if the transactions have respective conflicting operations, and the respective operation of T2 has occurred after the respective operation of T1. Each time a global read-write transaction is committed, all paths and possible future paths to it in the graph from all undecided transactions are disconnected by aborting a selected set of transactions on the paths. The aborted transactions, for example, are all the undecided transactions on the paths from undecided global read-write transactions to the committed transactions, which are closest (one on each path separately) to the committed transaction. Additional searching through the graph from the committed transaction could be done to possibly find a more optimal "abort set." The graph is further maintained by removing global decided (both committed and aborted) read-write transactions, and local aborted transactions. A local committed transaction, however, is removed from the graph only when there is no path to it from any undecided transaction. Local transactions are committed upon an explicit request from the local concurrency control mechanism.

In accordance with another aspect of the invention, each time that processing is begun for a read-write transaction, a predefined strategy is followed to select, for the processing of the transaction, either the last committed version of memory state or any existing uncommitted version of memory state. Conflicts with the transaction will depend on the particular version selected, and therefore a predefined strategy is followed to minimize aborting of the results of transactions.

In one preferred embodiment, the last committed version is selected for transaction processing unless selection of the last committed version causes conflict with another active read-write transaction. If there is such conflict, then the uncommitted version of that other active read-write transaction is selected. In general, there may exist in the database a multiplicity of uncommitted versions, each associated with a possible commitment order for transactions following the last committed transaction. The uncommitted versions therefore form a hierarchy depending from the last committed version. When processing is begun for a transaction, an "instance" of the transaction is created that depends from the version selected for processing. The hierarchy, for example, defines a path by which records are fetched for processing of the transaction instance, and conflicts are detected when records are fetched. Moreover, each active transaction may have more than one "instance". Any plural instances of a transaction, however, are mutually conflicting. Therefore, a transaction "instance" must not be a descendant of any other instance of the same transaction, and when any instance of a transaction is committed, all other instances of the transaction are aborted.

BRIEF DESCRIPTION OF THE DRAWINGS

Other objects and advantages of the invention will become apparent upon reading the following detailed description and upon reference to the drawings in which:

FIG. 4A illustrates various scheduling possibilities for conflicting memory access operations of distributed global transactions for the case in which a second transaction can read the write data of a first transaction only after the first transaction is committed;

FIG. 4B illustrates various scheduling possibilities for conflicting memory access operations of distributed global transactions for the case in which a second transaction can read the write data of a first transaction before the first transaction is committed;

FIG. 9 is a pictorial diagram of the graph corresponding to the data stored in the data structures of FIGS. 7 and 8;

FIG. 10 is a flow chart of a procedure that references the data structure of FIG. 7 to enforce global transaction commitment ordering;

FIG. 17 is a flow chart of a recursive procedure for insuring recoverability by performing cascading aborts;

FIG. 40 is a diagram showing a data structure for a node or "transaction instance" in the serializability graph of FIG. 39;

FIG. 41 is a diagram showing a data structure for a record accessed by a transaction instance in the serializability graph of FIG. 39;

While the invention is susceptible to various modifications and alternative forms, specific embodiments thereof have been shown by way of example in detail here is and will be described in detail herein. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENT

Figure 1:
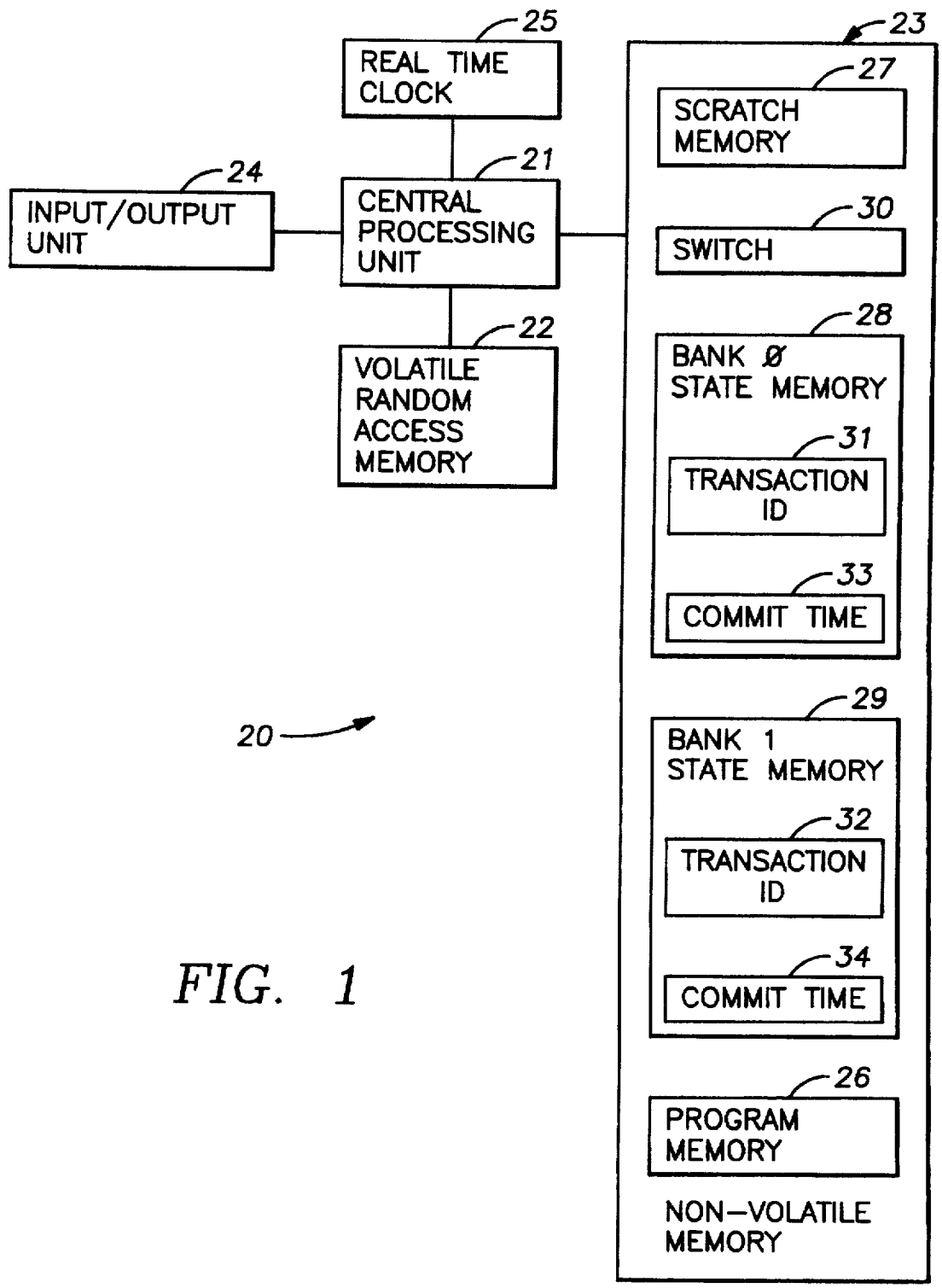
FIG. 1 is a block diagram of a digital computer configured for transaction processing.

Turning now to FIG. 1, there is shown a block diagram generally designated 20 of a digital computer configured for transaction processing. The computer 20 includes a central processing unit 21 for executing programmed instructions; a volatile random access memory 22 for holding instructions or data; a non-volatile memory 23 such as a hard disk drive, an input/output unit 24, and a real time clock 25. The non-volatile memory 23 includes a program memory 26 in which programs are stored, and a scratch memory area 27 for storing data records.

Typically, the digital computer 20 executes programs which have been transferred from the program memory 26 to the volatile random access memory 22. During the execution of a program, it is often necessary to operate upon an amount of data that exceeds the capacity of the volatile random access memory 22. In this case, data records are alternately stored and retrieved from the scratch memory area 27.

A common problem associated with the digital computer 20 is the likelihood that the execution of instructions by the central processing unit will become disrupted due to a hardware failure, software error or power failure. A power failure, for example, will cause the disappearance of data and programs stored in the volatile random access memory 22. The problem of the loss of data in the volatile random access memory 22 due to a power failure can be solved by storing back-up copies of data in the non-volatile memory 23. The back-up copies, however, must be made in such a way that considers the possibility of failure during a write operation to the non-volatile memory 23. In this case the data record affected by the write operation might have been corrupted and therefore must be discarded.

To deal with the problem of possible failure when writing to non-volatile memory, there has been established a method of programming called "transaction processing" which guarantees that a portion of the non-volatile memory (referred to hereinafter as "state memory") will either be unaffected by a transaction or will be properly updated by results of a transaction, in the presence of the failures. Transaction processing is based upon the technique of making a back-up copy of state memory before the results of a transaction are written to state memory, and also writing in non-volatile memory an indication of either a first processing phase in which the back-up copy is being made, or a second processing phase in which the results of a transaction are being written to state memory, in order to indicate which copy might have been corrupted during a failure. For making a back-up copy of state memory, for example, the non-volatile memory 23 includes two banks of state memory 28 and 29. To provide an indication of which bank of stat memory might have been corrupted by a failure, the non-volatile memory 23 includes a memory location 30 for storing a switch or flag.

When recovering from a failure, it is desirable to know the transaction that was last performed by the central processing unit 21, so that processing can be resumed from the interrupted point without repeating or skipping a transaction. For this purpose, whenever the state memory in either of the memory banks 28 or 29 is updated, a transaction identification code 31, 32 is written into the state memory along with the time 33, 34 at which the results of the transaction were first written (i.e., committed) to state memory.

Figure 2A:
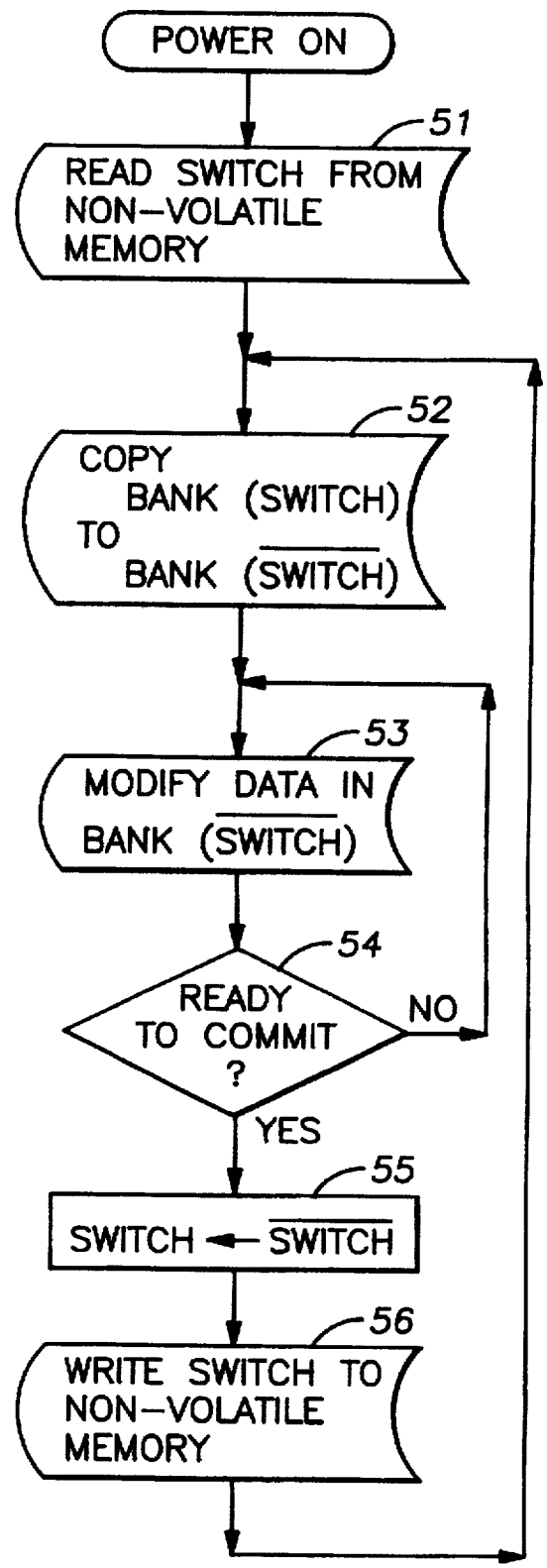
FIG. 2A is a flow chart of a procedure for performing transaction processing in the computer of FIG. 1 by switching between two banks of state memory.

Turning now to FIG. 2A, there is shown a flow chart of a procedure for guaranteeing that when recovering from a failure, the state memory of the computer 20 shown in FIG. 1 is either unaffected by a transaction or is properly updated by the result of a transaction. Assume, for example, that the computer system is turned on after a power failure. In a first step 51, the central processing unit 21 reads the value of the switch 30 stored in the non-volatile memory 23. This switch indicates which of the two banks of state memory 28, 29 might possibly have been corrupted by the power failure. In step 52, the central processing unit 21 references the value of the switch to read the bank of state memory known not to have been corrupted, and to make a "working copy" of the data in the other bank of state memory. Therefore, after step 52, both bank 28 and bank 29 of state memory have the same contents. Moreover, the transaction identifier 31, 32 and the commit time 33, 34 can be inspected to find the location in a program of the next transaction to be processed.

In step 53 that processing is continued by modifying the data in the working copy of state memory by writing results of the transaction being processed. The end of processing of the transaction is reached in step 54. To commit the results of the transaction to state memory, the value of the switch is changed in step 55, and in step 56 the changed value of the switch is written into the switch location 30 of the non-volatile memory. When viewed by the central processing unit 21 during recovery from a failure, the writing of the changed value of the switch into the non-volatile memory has the effect of insuring that the committed result of the transaction either has no effect upon the state memory, or properly updates the state memory, depending upon whether the failure occurs before or after the value of the switch has been written into the non-volatile memory. Because the value of the switch 30 is a single bit and the switch 30 is stored in a record different from the records of the banks of state memory, any failure occurring during the writing of the this single bit is inconsequential; in this case, neither of the banks of state memory should be corrupted, so the value of the switch does not matter.

The method of committing the result of a transaction as illustrated in FIG. 2A is rather inefficient when the result of a transaction modifies only a small portion of the state memory. In this case, step 52 spends a good deal of time unnecessarily copying data records that have not been modified. This unnecessary copying can be eliminated by the somewhat more complex procedure of FIG. 2B.

Figure 2B:
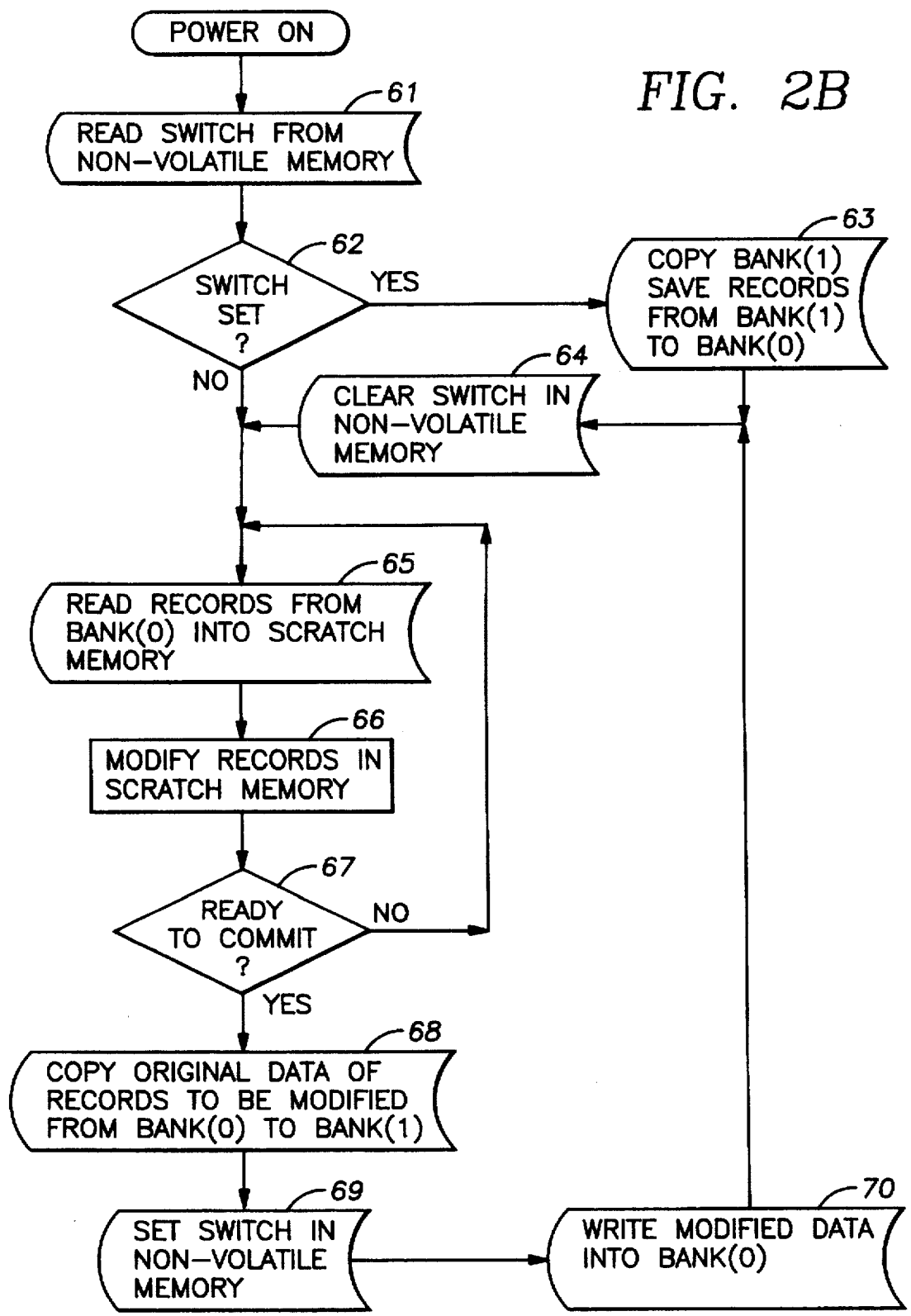
FIG. 2B is an alternative procedure for operating the digital computer of FIG. 1 for transaction processing by saving copies of only the data records of state memory that are modified by a transaction.

In the first step 61 of FIG. 2B, the switch is read from the non-volatile memory. Next, in step 62, the central processing unit checks whether the switch is set. If so, then a failure occurred during the processing phase in which the results of a transaction were being committed to state memory, as further described below. Therefore, in step 63 records saved in the state memory bank 29 are copied to state memory bank 28. Then, in step 64, the switch in non-volatile memory is cleared.

To process a transaction, in step 65, data records are read from the state memory bank 28 and transferred into the scratch memory area 27. Then in step 66 the records in scratch memory are modified in accordance with results of the transaction. When the transaction is finished, as found in step 67, then in step 68, original data of records to be modified are copied from state memory bank 28 to the state memory bank 29. Then in step 69 the switch is set in non-volatile memory. Then in step 70 the results of the transaction are committed by writing the modified data into the state memory bank 28. Finally, in step 64, the switch is cleared in non-volatile memory. Processing of the next transaction begins in step 65.

As described above with respect to FIG. 2A or FIG. 2B, it is assumed that transactions are processed in sequence by the central processing unit 21 of the computer 20 in FIG. 1. In a conventional transaction processing system, however, the processing of transactions are typically distributed in such a way that the performance of a second transaction is begun before the results of a first transaction are committed. Moreover, the preparation and committing of transactions is scheduled in such a way as to ensure consistent results. In other words, the transaction processing system provides a mechanism for enforcing local serializability. The scheduling of operations for the transactions is typically performed by a multi-tasking or multi-processing operating system program that services a transaction queue. In such a system, the transaction at the head of the queue is given priority and is processed unless this transaction at the head of the queue must wait for completion of an input/output operation or a memory access operation to non-volatile memory. In this situation, the transaction having priority may return execution to the operating system, and the operating system will pass execution to the next transaction having priority. Upon completion of the input/output or memory access operation, however, an input/output or memory interrupt will occur, causing execution to be interrupted in favor of an interrupt handler that will return execution to the operating system. The operating system will then transfer execution to transaction at the head of the queue, which was waiting for the completion of the input/output or memory access operation. In this fashion, the resources of the computer 20 are used more effectively. Such multi-tasking and multi-processing operating systems are well known in the art and are available commercially from the major computer manufacturers. A specific example is the "Rdb/VMS" (Trademark) and "VAX DBMS" (Trademark) brand of operating systems manufactured and sold by Digital Equipment Corporation of Maynard, Mass. 01754-1418. A detailed description of Rdb/VMS is given in L. Hobbs et al., *Rdb/VMS—A Comprehensive Guide*, Digital Press, Digital Equipment Corporation, Maynard, Mass., 1991. The processing of transactions in such a conventional system will now be described below, with reference to FIG. 3.

To ensure ease of recovery in the situation where a second transaction is begun before a first transaction commits, the second transaction is usually precluded from reading any results of the first transaction before the first transaction commits. A transaction places "write locks" on the state memory records to be modified by the transaction, and these "write locks" are removed when the transaction is committed, as further described below with reference to FIG. 3.

To ensure consistency of data read by a transaction, the transaction could place "read locks" on any state memory records that are read by the transaction. The use of memory locks, however, inhibits concurrency between transactions, which causes a decrease in transaction processing speed. Therefore, the "Rdb/VMS" (Trademark) operating system uses a known "snapshot" mechanism to prevent memory locks from blocking read operations by read-only transactions. The "snapshot" mechanism permits a "read-only" transaction to read, at any time, a consistent version of any state memory record existing at the time that the transaction begins. In particular, a lock placed on a record for the benefit of a first transaction need not block the reading of the record by a second "read-only" transaction because a "snapshot" of the locked record is created for the benefit of the "read-only" transactions, as further described below with reference to FIG. 3. The "snapshot" mechanism is further described in L. Hobbs et al., *Rdb/VMS—A Comprehensive Guide*, cited above, and it is also described in Spiro et al. U.S. patent application Ser. No. 07/717,212 filed Jun. 18, 1991, incorporated herein by reference.

Figure 3:
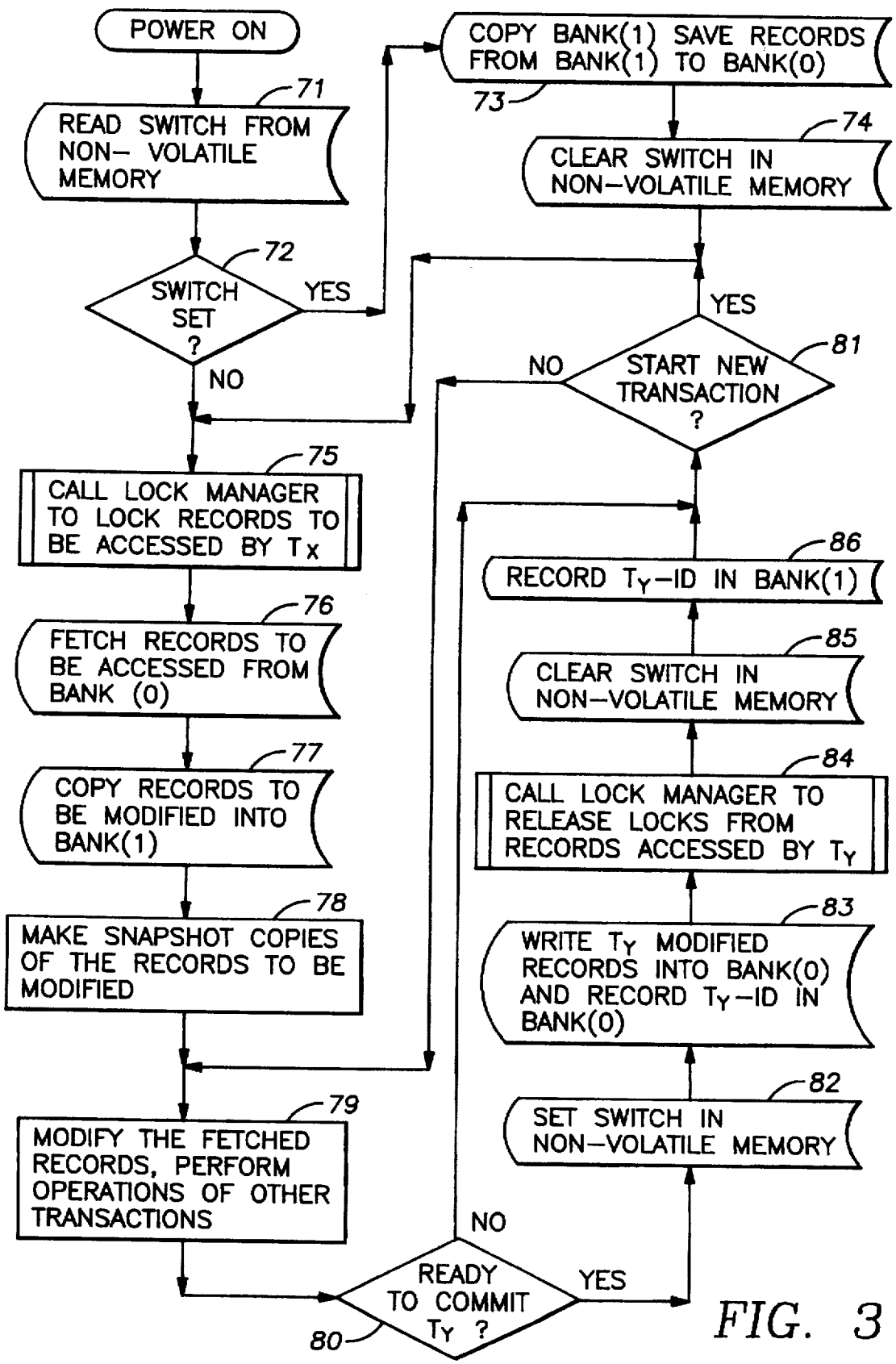
FIG. 3 is a flow chart illustrating the operation of a conventional transaction processing system that permits multiple transactions to be processed in such a way that the performance of a second transaction is begun before the results of a first transaction are committed.

Turning now to FIG. 3, there is shown a flow chart of the operation of the computer 20 for processing transactions when using the "Rdb/VMS" (Trademark) operating system. In this case the operating system uses a conventional "undo" recovery procedure, in contrast to the procedure of FIG. 2B, which is known as a "re-do" procedure. When the computer (20 in FIG. 1) is turned on, for example after a power failure, execution by the central processing unit (21 in FIG. 1) begins in the first step 71. In step 71, the Central processing unit 21 reads the switch from non-volatile memory. If the switch is found in step 72 to be set, then execution branches to step 73, to copy records saved in BANK(1) to BANK(0). In step 73, the transaction-ID recorded in BANK(1) is also copied to BANK(0). Then in step 74 the switch in non-volatile memory is cleared. Steps 71 to 74 in effect "undo" the effects of failed transactions. The BANK(1) save records constitute a so-called "before-image log file" indicating records that were modified by failed transactions (i.e., the transactions that had begun but had not yet committed at the time that the failure interrupted the processing of the transactions). The switch read from non-volatile memory in step 71 is an indication of whether or not the "before-image log file" contains any records that were modified by transactions that have not yet been committed.

Once the non-volatile state memory in BANK(0) has been restored, transaction processing can resume in step 75 by beginning processing for a next transaction $T_x$ selected by the scheduler of the operating system. The scheduler, for example, selects the next transaction $T_x$ from a predefined schedule based on the transaction having been last committed that is indicated by the transaction-ID recorded in BANK(0), and begins a "fetch" phase for the transaction $T_x$. In step 75, a "lock manager" program is called to check the availability of records to be accessed by the transaction $T_x$. A multi-processing operating system typically provides such a "lock manager". The lock manager, for example, maintains lock data structures such as a hash index table to a cache of locks. The cache of locks is indexed before a record is fetched in the following step 76, in order to determine whether a record to be accessed by the current transaction is already locked, and to lock a free record to be accessed by a "read-write" transaction. Such a lock manager is desirable in multi-processing systems to simplify scheduling. If a record to be accessed by the current transaction is already locked, then the operating system is invoked to interrupt processing of the current transaction, and to begin or continue processing of another transaction, such as the transaction having locked the record. Otherwise, the record is locked for the transaction $T_x$.

Once the records to be accessed by the current transaction are locked, in step 76 the records are fetched from BANK(0) and written into volatile memory. In step 77, the records to be modified are copied into BANK(1). In step 78, "snapshot copies" of the records to be modified are also made. This completes the "fetch" phase for the transaction $T_x$.

Next, in step 79, the records are modified in accordance with results of the transaction. Under the control of the scheduler of the operating system, processing of the transaction $T_x$ may be interrupted in step 79 (for example while waiting for completion of a memory or input/output request), to perform operations of other transactions. Moreover, preparation of results for a transaction $T_y$ may become finished in step 79, as detected by the scheduler in step 80, or the processing of a transaction may be interrupted to begin processing of a new transaction, as detected by the scheduler in step 81. Therefore, a number of "before images" may be logged in the BANK(1) state memory, and processing of a number of transactions may begin, until a transaction $T_y$ is ready to be committed, as found in step 80.

In step 82, a "commit" phase is begun for the transaction $T_y$, by setting the switch in non-volatile memory. Next, in step 83, the records modified by the transaction $T_y$ are written into BANK(0), into BANK(0), and the transaction ID of the transaction $T_y$ is also recorded in BANK(0). In step 84, the "lock manager" is called to release the locks on the records modified by the transaction Ty. In step 85, the switch in non-volatile memory is cleared. Finally, in step 86, the transaction ID of the transaction $T_y$ is recorded in BANK(1). This completes the "commit phase" of processing of the transaction $T_y$. Then, as selected by the scheduler in step 81, processing of other transactions continues in step 79 or processing for a new transaction is begun in step 75.

FIG. 3 was described in terms of a multiplicity of transactions having begun before some of the multiplicity of transactions have committed. In this situation the scheduler of the operating system program time-shares execution among the multiplicity of transactions during the transaction processing steps 75 to 81. In step 75, the lock manager places locks on a group of records that must be accessed in a consistent fashion during a "read-write" transaction, in order to prevent other transactions from also writing to them and to prevent other transactions from reading inconsistent records. When a "read-only" transaction desires to read a record, it invokes the "snapshot" mechanism, which accesses the lock data structures to determine whether the desired record is locked, and when the desired record is locked, a "snapshot copy" of the record is read instead of the record in the state memory of BANK(0).

In order to guarantee the serializability of transactions in a distributed environment, each transaction is specified as either a "read-only" transaction or a "read-write" transaction. A "read-only" transaction may read a snapshot record, but a "read-only" transaction may not modify a record. A "read-write" transaction may not read a snapshot record, but it may read and modify a record. As is shown in Appendix II to the specification, the serializability of transactions in a multi-version distributed environment generally requires that a read-write transaction does not read a version earlier than the last committed version (however, it may read later uncommitted versions). Moreover, it is preferred, but not necessary, to preclude read-only transactions from reading modified but uncommitted versions. By precluding read-only transactions from reading modified but uncommitted versions and always maintaining a sufficient number of snapshots, as described below with reference to FIGS. 22 to 23, there is no need to abort or block the read-only transactions, nor is there any advantage to permitting read-only transactions to read modified but uncommitted versions in the usual case.

So that the relatively simple recovery scheme of FIG. 3 will operate in such a distributed transaction environment, the locks imposed by a transaction are not released until step 84 when the transaction is committed. The locks imposed by a transaction are also released whenever a transaction is aborted.

In a conventional transaction processing system operating as shown in FIG. 3, consistency of state memory is ensured by the use of memory locks. In the present invention, however, global transactions need not be subject to such stringent locking procedures. Instead, consistency in the presence of global transactions is assured by committing a selected global transaction and aborting an abort set of global or local transactions selected so that the order of commitment of global transactions is consistent with an order of conflicts among the global transactions, taking into consideration indirect conflicts caused by local transactions. In particular, global serializability is ensured by scheduling the commitment of global transactions so that the commitment order of directly or indirectly conflicting global transactions conforms to the order of the conflicts (as reflected by a serializability graph). When the scheduling of commitment of global transactions has this property of "extended commitment ordering", it can also be shown that in a distributed processing system (as further described below in connection with FIG. 5B), global serializability is guaranteed when only "atomic commitment" is used to coordinate the various processors in the system, so long as local serializability is guaranteed by any kind of mechanism. This is demonstrated by a rather elaborate mathematical proof, which is appended to the present specification. From a practical standpoint, this result means that the advantages of the present invention can be applied to any existing distributed transaction processing system.

As described above with reference to FIG. 3, a conventional transaction processing system insures that a second transaction can read the write data of a first transaction only after the first transaction is committed. This is a sufficient but not necessary condition to insure recoverability. In a first embodiment of the present invention, this condition can also be maintained for global transactions to minimize the amount of non-volatile memory required and to avoid what is known as "cascading aborts" to achieve recoverability. In this first embodiment, for example, memory access by global transactions must respect "write locks" placed on records by other transactions.

FIG. 4A shows three different possibilities for the scheduling of a first global transaction having a write operation and a second global transaction having a conflicting read operation. In general, two operations are conflicting when they are memory access operations that access the same resource and at least one of the operations is a write operation. By inspection it can be seen that of the three scheduling possibilities, the possibility (b) violates the commitment ordering requirement and therefore may cause inconsistency in the state of the state memory. Due to the fact that the write operation $W_x$ does not commute with the read operation $R_x$, the result for the transaction $T_2$ for the scheduling possibility (b) may be different from the result for the transaction $T_2$ for the scheduling possibility (a). To obtain consistent results, the present invention permits conflicting operations of two global transactions to be scheduled in a selected order to most efficiently use resources available to a central processing unit, but insures consistency by enforcing a commitment order of global transactions that is consistent with the order of conflicts among the global transactions. Inconsistent scheduling possibilities, such as the possibility (b) in FIG. 4A, are prohibited by aborting a conflicting transaction when a selected global transaction is committed, or by delaying commitment of a selected global transaction until after the conflicting transaction is committed.

In the example of FIG. 4A, for example, suppose that the first operation scheduled is a read operation $R_x$ of the second global transaction $T_2$, as shown in possibilities (b) and (c). If the global transaction $T_2$ is committed before the global transaction $T_1$ as shown in possibility (c), no inconsistency will result because the scheduling is in conformance with the order of conflicts among the global transactions. If, however, the first transaction $T_1$ is committed before the second transaction $T_2$ as shown in possibility (b), then the second transaction $T_2$ must be aborted because otherwise commitment of the second transaction $T_2$ would be inconsistent with the order of conflicts and may lead to inconsistent results.

For the present invention, indirectly conflicting global transactions must also be considered. Due to the local transactions, two global transactions $T_1$ and $T_2$ may indirectly conflict, for example, when referencing different resources that are also referenced by one or more local transactions. As further described below with reference to FIG. 9, indirect conflicts are detected by maintaining a serializability graph recording the effects of transactions, including committed local transactions. Specifically, two global transactions are indirectly conflicting when there is a directed path including more than one edge between them in the serializability graph.

The present invention further permits the scheduling of operations such that a second global transaction $T_2$ can read the write data of a first global transaction $T_1$ before the first transaction $T_1$ is committed. In this case recoverability can be guaranteed by a process of cascading aborts, as further described below with reference to FIGS. 16 and 17. For the case of a first global transaction $T_1$ having a write operation $W_x$ and a second global transaction $T_2$ having a conflicting read operation $R_x$, there are six scheduling possibilities, denoted in FIG. 4B as (a) to (f). Two of these scheduling possibilities (b) and (d) are inconsistent with the order of conflicts among the global transactions and therefore may lead to inconsistent results. The present invention prevents these scheduling possibilities from occurring by determining the order of conflicts among the global transactions and then delaying commitment of a selected global transaction or aborting a conflicting operation if necessary to enforce global transaction commitment ordering.

Figure 5A:
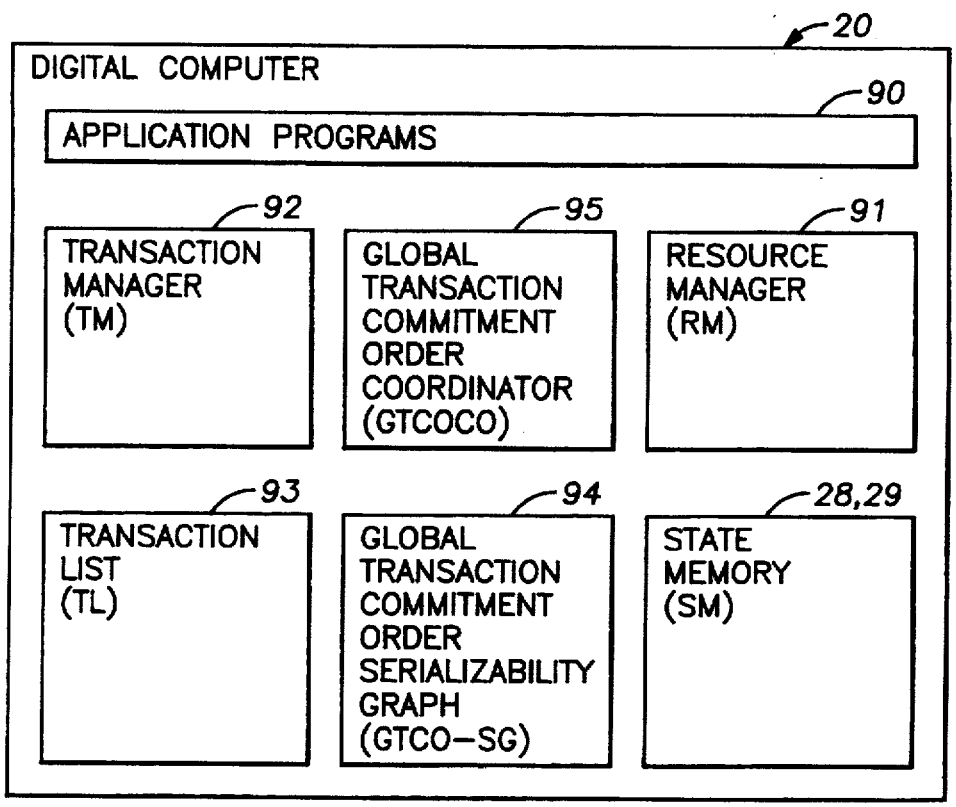
FIG. 5A shows a digital computer configured in accordance with the present invention to enforce a global transaction commitment ordering in which distributed global transactions are committed in the order in which conflicting component operations are performed.

Turning now to FIG. 5A, there is shown a block diagram of the programming and data structures used in the digital computer 20 of FIG. 1. for scheduling transactions and enforcing global transaction commitment ordering. Global and local transactions are initiated, for example, by application programs 90. To commit the results of transactions to state memory 28, 29 and to recover from failures, the digital computer is provided with a resource manager (RM) 91 that, for example, performs the operations shown in FIG. 3. The resource manager 91, for example, also manages a transaction list (TL) 93 as further described below with reference to FIG. 6. In general, a resource manager (RM) is a software component that manages state memory resources affected by committing transactions in such a way that the memory state of the resources can be restored before the transaction is committed by effectively undoing all of the changes introduced by the transaction. In other words, the resource manager ensures that the transactions have the property of "atomicity", or "all or nothing" semantics upon its state memory resources. A resource is typically, but not necessarily, a data item or a data object. Examples of resource managers are typically found in data base systems (DSB's), queue managers, and cache managers.

To provide an interface for conducting an atomic commitment protocol for scheduling global transactions, digital computer 20 also includes a transaction manager (TM) 92. Preferably the presence of operations conflicting with global transactions is detected in real time when the transactions are performed, as further described below with reference to FIG. 12. To enforce global transaction commitment ordering, the order in which such conflicting operations are performed is recorded in global transaction commitment ordering serializability graph (GTCO-SG) 94 which is a data structure in memory, and which is described further below with reference to FIGS. 8 and 9. To enforce the global transaction commitment order, global transactions are selected for commitment and transactions are selectively aborted by a global transaction commitment order coordinator (GTCOCO) 95, which is further described below with reference to FIGS. 11 to 18.

Figure 5B:
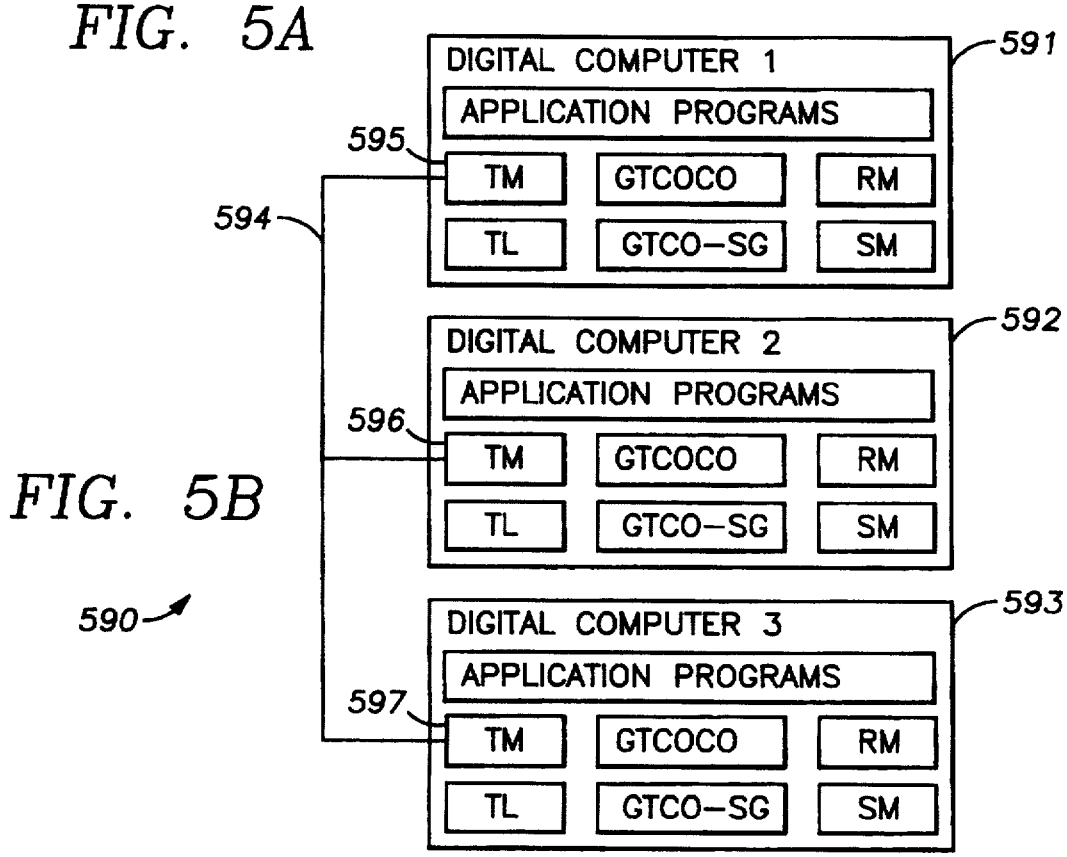
FIG. 5B illustrates a distributed computing system including a plurality of the digital computers as shown in FIG. 5A.

The present invention is directed to a multi-processor or multi-processing system in which a plurality of transactions are performed concurrently and component operations of the same "global" transaction are performed concurrently in different processors or processes. A multi-processor system 590 is illustrated in FIG. 5B. In this case, three digital computers 591, 592, 593 are interconnected through a communication channel 94, and the communication is controlled by the transaction managers (TM) 595, 596, 597. In the multi-processor system 590, any one of the transaction managers 595, 596, 597 may assume the role of a coordinator and issue global transactions to the other global transaction managers. These global transactions are coordinated, for example, according to the well-known two phase commit protocol, as was described above with reference to the background art, and as further described below with reference to FIG. 11.

The transaction managers may also exchange state information over the communication channel 594. In particular, transaction processing systems generally fall within two broad categories called database management systems and object oriented systems, depending upon whether or not state memory information is resident in the non-volatile memory files of a particular one of the digital computers 591, 592, 593, or whether the state information is associated with predefined objects which may be passed from one computer to another. The present invention, however, is applicable to both types of systems because the present invention more particularly concerns the scheduling of component operations in the transactions and the enforcement of global transaction commitment ordering, and is not particularly concerned with where the state memory is physically located or maintained in a distributed processing system.

Figure 6:
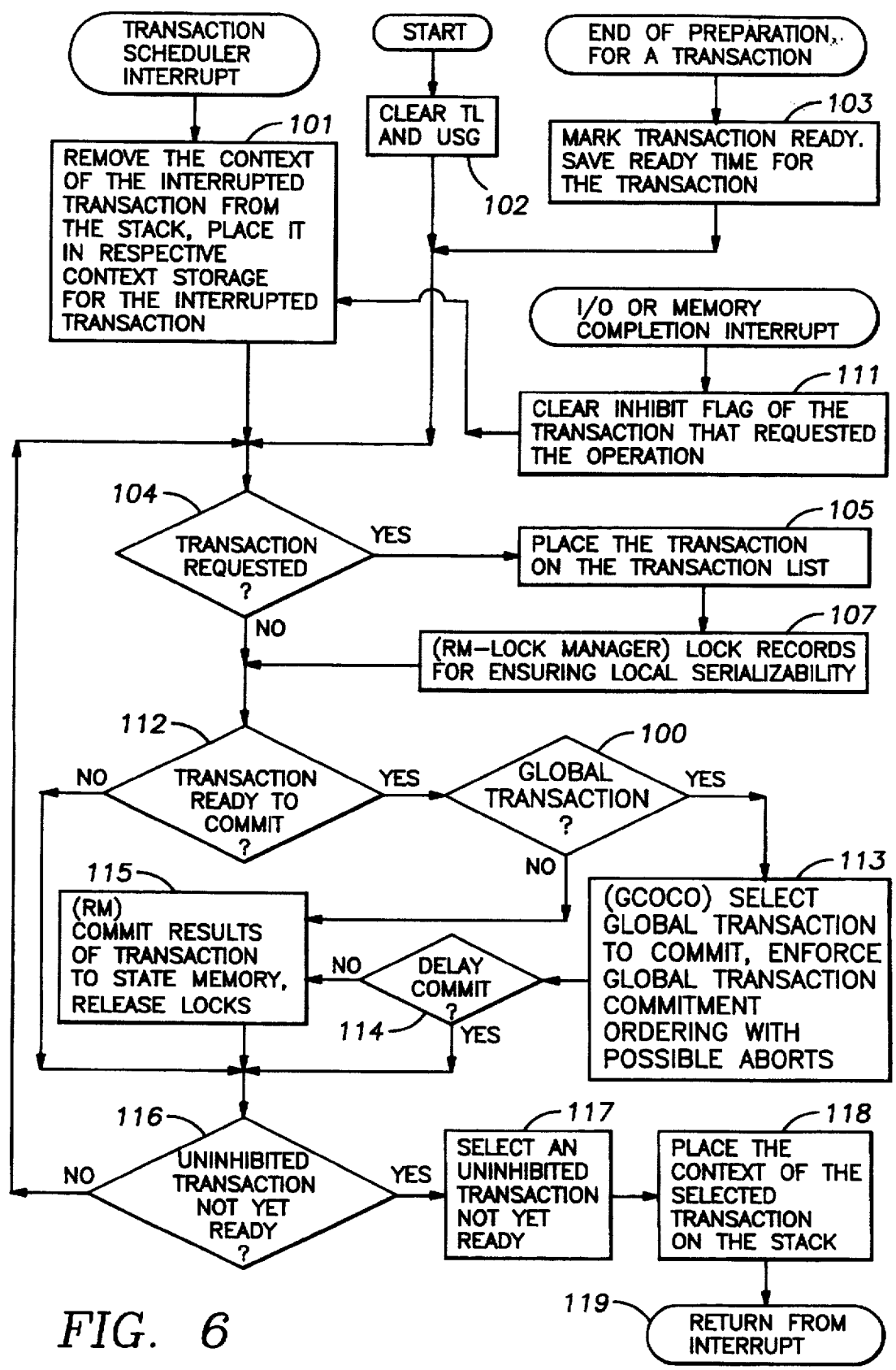
FIG. 6 illustrates a scheduling procedure employed by a transaction scheduler component of a digital computer in the system of FIG. 5B.

Turning now to FIG. 6, there is shown a flow chart of a procedure followed by a transaction scheduler in the resource manager for real-time scheduling of component operations of transactions in accordance with available computing resources of the digital computer. In particular, the transactions include input/output and memory access of rotating memory such as disk drives, and possibly mathematical computations that are performed by a coprocessor. Without real-time scheduling and interleaving of operations of different transactions, the central processing unit of the digital computer would have to spend a good deal of time waiting for these operations to be completed before performing the component operations of other transactions.

To more effectively use the resources of the digital computer, a transaction may dispatch input/output and memory access requests to the input/output and memory units of the computer, then set an inhibit flag indicating to the scheduler that the processing of the current transaction should be inhibited until completion of the input/output or memory access operation, and finally execute a software interrupt to the transaction scheduler in order to permit the transaction scheduler to transfer execution to another transaction. When the requested input/output or memory access operation is completed, the input/output or memory device issues a completion interrupt which is handled by a device handler interrupt routine that clears the inhibit flag of the transaction that requested the input/output or memory access operation. It should be noted that input/output and memory access completion interrupts and device handlers for such interrupts are well known in the art.

Referring now particularly to the first step 101 in FIG. 6, the transaction scheduler responds to an interrupt by removing the context of the interrupted transaction from the processor stack of the digital computer, and by placing the context in a respective context storage for the interrupted transaction. The context includes the value of the program counter which points to the interrupted memory location in the transaction program, as well as the context of other general purpose registers in the digital computer.

The transaction scheduler may also be entered during initial start-up of the digital computer in step 102. In step 102, the transaction list 93 and other data structures such as the serializability graph (GTCO-SG) are cleared and pointers are initialized.

The transaction scheduler may also be entered at the end of preparation for a transaction. In this case, in step 103 the transaction is marked to indicate that it is ready to be committed, and also the current time indicated by the real time clock (25 in FIG. 1) is saved in a memory location allocated to the transaction to indicate the time at which the transaction became ready. It should be noted, however, that some tasks placed on the transaction list might be so-called background tasks of low priority, which are never completed and use central processor execution time remaining after the servicing of all transactions in the list.

The transaction scheduler may also be entered at the end of a device handler interrupt routine. Step 111, for example, clears the inhibit flag (I in the list of FIG. 7) for the transaction having requested the input/output or memory operation, and then execution continues in step 101 to interrupt the current transaction to possibly reschedule execution back to the transaction having requested the input/output or memory operation.

The transaction scheduler performs three major tasks; it responds to transaction requests by placing the transactions on the transaction list; it schedules the performance of component operations of transactions; and it declares ready transactions. In step 104, for example, the transaction scheduler checks whether a transaction has been requested. A transaction scheduler interrupt, for example, may occur in response to an interrupt signal from the input/output unit indicating that a user or another digital computer has requested the performance of a transaction. In this case, in step 105 the transaction request is placed on the transaction list. Also, in step 107, the lock manager of the resource manager is invoked, as described above with respect to step 75 of FIG. 3, to lock the records to be accessed by the transaction, and thereby ensure local serializability. It is possible that some of these records are already locked by another transaction. In this case, the lock manager, for example, puts a pointer to the requested transaction on a "wait list" for the locked records, and sets the inhibit flag for the requested transaction. When the record eventually is unlocked, as described above with respect to step 84 of FIG. 3, the pointer at the head of the wait list is removed, and the inhibit flag for the transition pointed to by the removed pointer is cleared. In this example, the order of performance of conflicting operations, as well as the order of commitment, becomes the order in which the transactions are requested, so long as the memory locks are not bypassed.

Figures 7, 8:
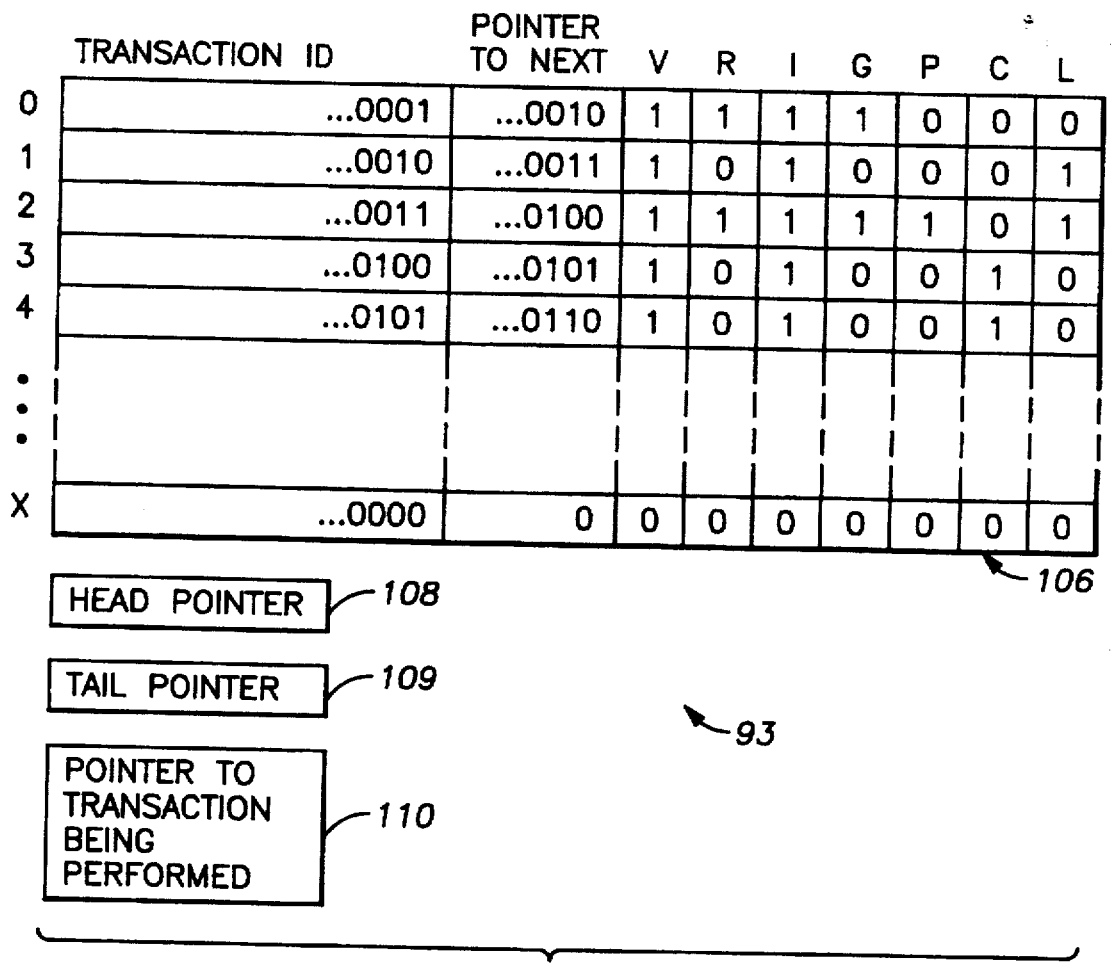
FIG. 7 illustrates an organization of a transaction list and related pointers which are used by the transaction scheduler for scheduling the performance of component operations of distributed transactions.
FIG. 8 is a schematic diagram illustrating a data structure corresponding to a graph of conflict ordering between distributed transactions having conflicting component operations.

Turning for a moment to FIG. 7, there is shown a specific example of the transaction list 93. The transaction list includes a linked list of transaction identification numbers 106. Associated with each transaction identification number is a pointer to the next entry in the linked list, and values for a number of flags (V, R, I, G, P, C, L). These flags include a valid flag V indicating whether the entry in the list includes valid data, a flag R indicating whether preparation of the transaction has been completed and the transaction is ready to be committed, a flag I indicating whether preparation of the transaction has been inhibited until completion of an input/output or memory access request, a flag G indicating whether the transaction is a local or global transaction, a flag P indicating whether the completion of preparation of a global transaction has been reported to a coordinator, a flag C indicating whether a local transaction has been committed, and a flag L indicating that lock has been placed on the transaction because it is in the "abort set" of another transaction that might be committed. The flags G and P associated with global transactions are further described below with reference to FIGS. 15 and 16.

Also associated with the list 93 are a head pointer 108, a tail pointer 109, and a pointer 110 to the transaction being performed. The head pointer 108, for example, has a negative value when the list is empty, and otherwise has a positive value pointing the list entry for the first (highest priority) transaction. In a similar fashion, the tail pointer 109 has a negative value when the list is empty and otherwise has a positive value pointing to the last entry in the list. The pointer 110 to the transaction being performed is used by the transaction scheduler in step 101 of FIG. 6 when responding to an interrupt. In particular the pointer 110 is used to find the respective context storage location for the interrupted transaction when performing step 101.

Returning now to FIG. 6, in step 112 the transaction scheduler checks whether a transaction is ready to be committed. If so, then in step 100, the transaction scheduler checks the "G" flag for the transaction. If the transaction is local, then in step 115 the resource manager (RM) commits the results of the local transaction to the state memory, and releases any locks imposed by the transaction. Otherwise, in step 113, the transaction scheduler invokes the global transaction commitment order coordinator (95) to select the global transaction to commit, and to enforce global transaction commitment ordering with possible aborts and delay. When the global transaction commitment order coordinator decides not to delay commitment, as tested in step 114, then in step 115, the reference manager (RM) commits the results of the global transaction to the state memory, and releases any locks imposed by the transaction.

Because the global transaction commitment order coordinator enforces global transaction commitment ordering, the global transactions can bypass the memory locks to more efficiently use the available resources of the processor. For the Case 1 embodiment of the invention of FIG. 4A, the global transactions may bypass the read locks to read data. For the Case 2 embodiment of FIG. 4B, the global transactions may bypass the read and write locks to read data. Also, the local transactions may bypass the locks so long as the serializability of the local schedule is not violated. The serializability of the local schedule, for example, could be insured by a combination of write locks and time stamps. Instead of using read locks, a resource would be stamped with the beginning time of the transaction that last read or wrote the resource. Any transaction attempting to write to the resource would first compare its time stamp with any time stamp of the resource, and if the write transaction would have an earlier time stamp, it would be aborted to enforce the serializability of the local schedule. Such a mechanism for ensuring local serializability would not necessarily cause the commitment order of all transactions to be the same as the order of conflicts among all of the transactions.

Finally, in step 116, the transaction scheduler checks the transaction list to determine whether there is an uninhibited transaction that is not yet ready. If so, then in step 117, the transaction scheduler selects one of the uninhibited transactions that is not yet ready. To perform steps 116 and 117, for example, the transaction scheduler first checks whether the transaction list is empty by testing whether the head pointer 108 has a negative value. If the head pointer has a positive value, then the transaction scheduler checks the flags R and I for the transaction at the head of the list to determine whether is not yet ready and is not inhibited. If the first entry is ready or is inhibited, then the transaction scheduler checks the tail pointer 109 to determine whether the end of the list has been reached. If not, then the transaction scheduler checks the pointer to the next entry and performs the same steps until either an uninhibited transaction not yet ready is found or the end of the list has been reached.

When an uninhibited transaction not yet ready has been selected, then in step 118 the context of the selected transaction is placed on the stack. In this regard it should be noted that when a transaction is first placed on the transaction list, then an initial context for the transaction is placed in the respective context storage for the interrupted transaction. The initial context, for example, includes a program counter value pointing to the first instruction in the program for the transaction. After step 118, a return from interrupt is performed in step 119 to begin or continue the execution of instructions in the program for the selected transaction.

Turning now to FIG. 8, there is shown a specific example of a data structure 94 for storing the global transaction commitment order serializability graph (GTCO-SG). As further described below in connection with FIGS. 9–14, the data structure 94 is used in connection with the flags in the transaction list 93. Whenever a particular order of performing conflicting operations in a respective pair of transactions has been established, that order of performance of the conflicting operation is noted in the global transaction commitment order serializability graph. If the memory access operations performed by each transaction and the memory locations of those memory access operations are known at the time that a transaction is placed on the list, then it is possible in Case 1 of FIG. 4A for the order of conflicts to be determined at that time. In this regard, it should be noted that for Case 1 as illustrated in FIG. 4A, write operations are in effect performed at the time of transaction commitment. Aside from this particular case, the order of performance of conflicting operations is determined when a second one of the conflicting operations is scheduled for performance by the transaction scheduler and the memory location accessed by that conflicting operation is determined.

It should be noted that the global transaction commitment order serializability graph may include committed local transactions. When a local transaction is committed in step 115 of FIG. 6, its entry in the transactions list 93 is removed at this time only when it does not have any path in the graph 94 from any undecided transactions. If it does have a path from an undecided transaction, then its I flag and its C flag are set, and it remains in the graph so long as it has a path from an undecided transaction. The graph 94 can be searched for such a path by using a recursive procedure similar to the ABORT(T) procedure listed below.

At the time that presence of a conflict is detected, as further described below with reference to FIG. 14, the order of performance is recorded in the global transaction commitment order serializability graph. The pertinent data in the graph of FIG. 8 and transactions list 93 is presented in pictorial form in FIG. 9. The flags that are set in the data structure of FIG. 8 correspond to edges 131 in the pictorial representation of FIG. 9. The direction of an edge 131 indicates the order of performance of the conflicting operations in the transactions. Once this order of performance is established, a corresponding global transaction commitment order is enforced by delaying commitment of transactions, or aborting transactions.

Enforcement of the global transaction commitment order by aborting transactions is illustrated by steps 141 and 142 in FIG. 10. In step 141 a ready global transaction to be committed is selected. Preferably, the selection is performed by an atomic commitment coordinator according to the well-known atomic commitment protocol introduced above. In this protocol, the atomic commitment coordinator sends a "vote" request to all participating processors. If all of the participating processors respond with a "yes" or "prepared" vote, then the atomic commitment coordinator sends a "commit" command to the participating processors. The preferred atomic commitment protocol is further described below with reference to the state diagram of FIG. 11.

In step 142, the global transaction commitment order is enforced by aborting an abort set so that the commitment order of the committed global transaction is consistent with the order of conflicts among global transactions. For the commitment order illustrated by the graph in FIG. 9, for example, if the transaction $T_6$ is selected, then transactions $T_2$ and $T_3$ are aborted to enforce the global transaction commitment order. In particular, when a global transaction is committed, any and all paths to it in the GTCO-SG from any and all global undecided transactions, and from any and all active transactions (representing possible future paths from global transactions) are disconnected by aborting a set of transactions on the paths. This "abort set" may include global as well as local transactions. In some cases, the abort set is empty, in which case no transactions need to be aborted to enforce the global transaction commitment order. In other cases, the abort set may not be unique, and the abort set can be selected in an expedient fashion, or a fashion optimized to maximize system performance, or some trade-off between selection expediency and overall performance.

The most convenient selection involves choosing the undecided transactions, on the paths from the undecided global transactions to the committed transactions, that are the closest (on each path separately) to the committed transaction. This selection gives a unique abort set. Shown below is pseudo-code for a specific procedure to find this abort set:

```
ABORT (T)           /* returns a "closest neighbor" abort set */
set ABORT:=empty    /* inital value is the empty set */
set NODE_VISITED:=empty  /* set of nodes visited */
BACK_FRONT (T)
return ABORT
BACK_FRONT (T)  /* a recursive procedure that computes the set
                   ABORT */
for every edge (T',T) in the GTCO-SG do
    if T' is not in NODES_VISITED then
        begin
            insert T' into NODE_VISITED
            if undecided (T') then insert T' into ABORT
                                else BACK_FRONT (T')
        end
end_BACK_FRONT
end_ABORT
```

This closest neighbor abort set, however, is not necessarily optimum. If any of the nearest undecided neighbors is ready, for example, then the next nearest undecided neighbor can be alternatively selected for the abort set. An optimal selection for the abort set would choose the abort set to maximize system performance. To maximize performance, an optimum abort set may include a minimum number of transactions to be aborted, although the performance penalty associated with aborting a transaction may be quite different with each transaction. A transaction, for example, may already have been included in another abort set of a global transaction reserved for commitment, and, in this case, the transaction already in an abort set (i.e., the transaction having its flag L=1) can be included in other abort sets with a minimal performance penalty. Depending on the particular system, it may be desirable to abort local transactions instead of global transactions. Also, a priority could be assigned to each transaction, or computed based upon the order of each transaction in the transaction list, and the priorities of the members in each abort set could be summed to compute an overall performance penalty associated with each possible abort set. Therefore, at the expense of additional search time, other possible abort sets could be found, an overall performance penalty could be estimated for each abort set, and the abort set estimated to have the least performance penalty could be chosen.

Aborting of a transaction involves discarding the results of the transaction. For local transactions, a transaction could be aborted by resetting the contents of its respective context storage to its initial context. The current value of the program counter for the transaction, for example, is reset to the beginning of the program for the transaction. In addition, the transaction list 93 and the global transaction commitment order serializability graph 94 must be updated. For a global transaction, the aborted global transaction is restarted if at all by the atomic commitment coordinator of the global transaction. In this case, the global transaction is entirely removed from the transaction list.

Figure 11:
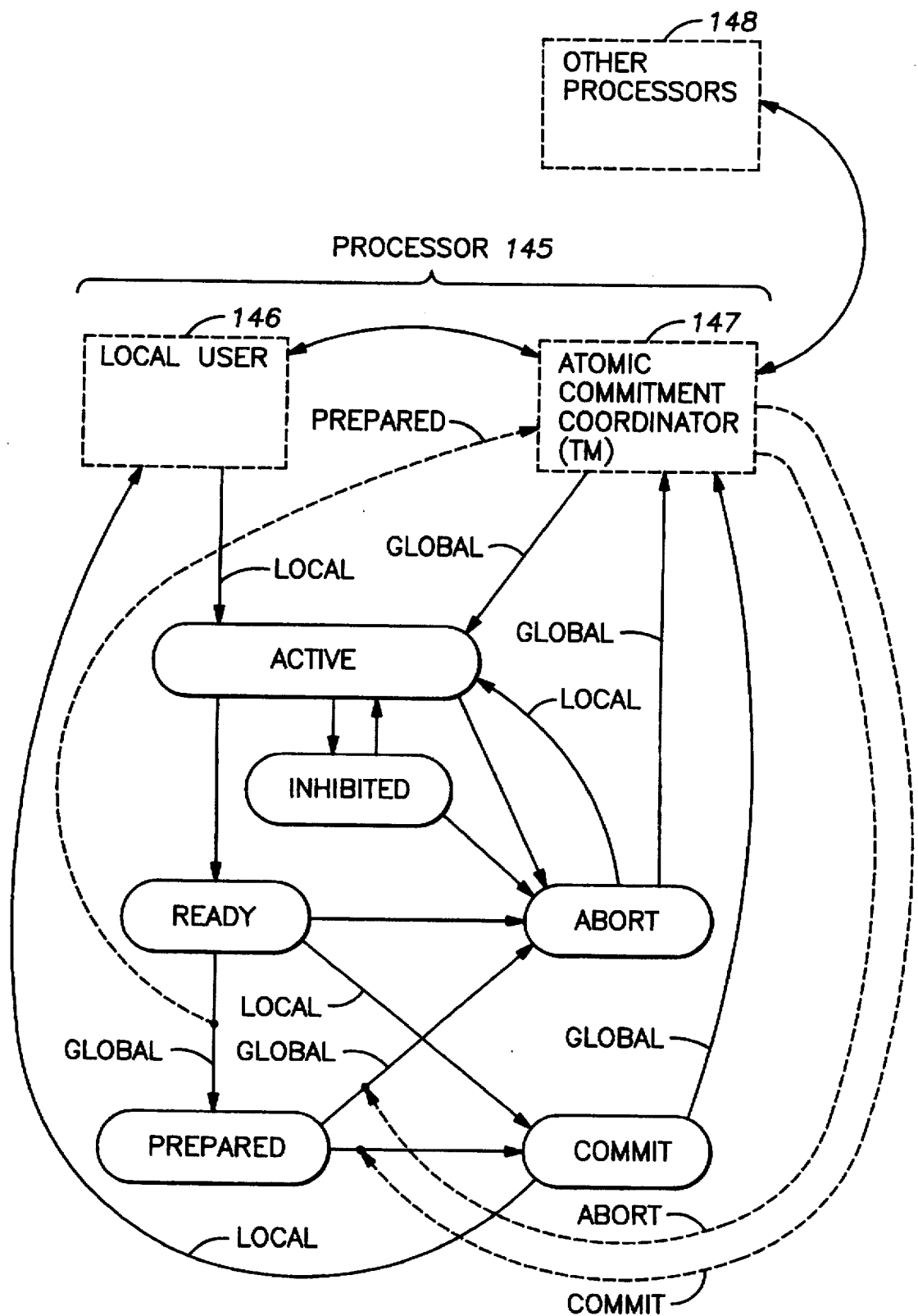
FIG. 11 is a state diagram of the digital computer shown in FIG. 5A when used in a multi-processing system of FIG. 5B for processing both local and global transactions.
Figure 12A:
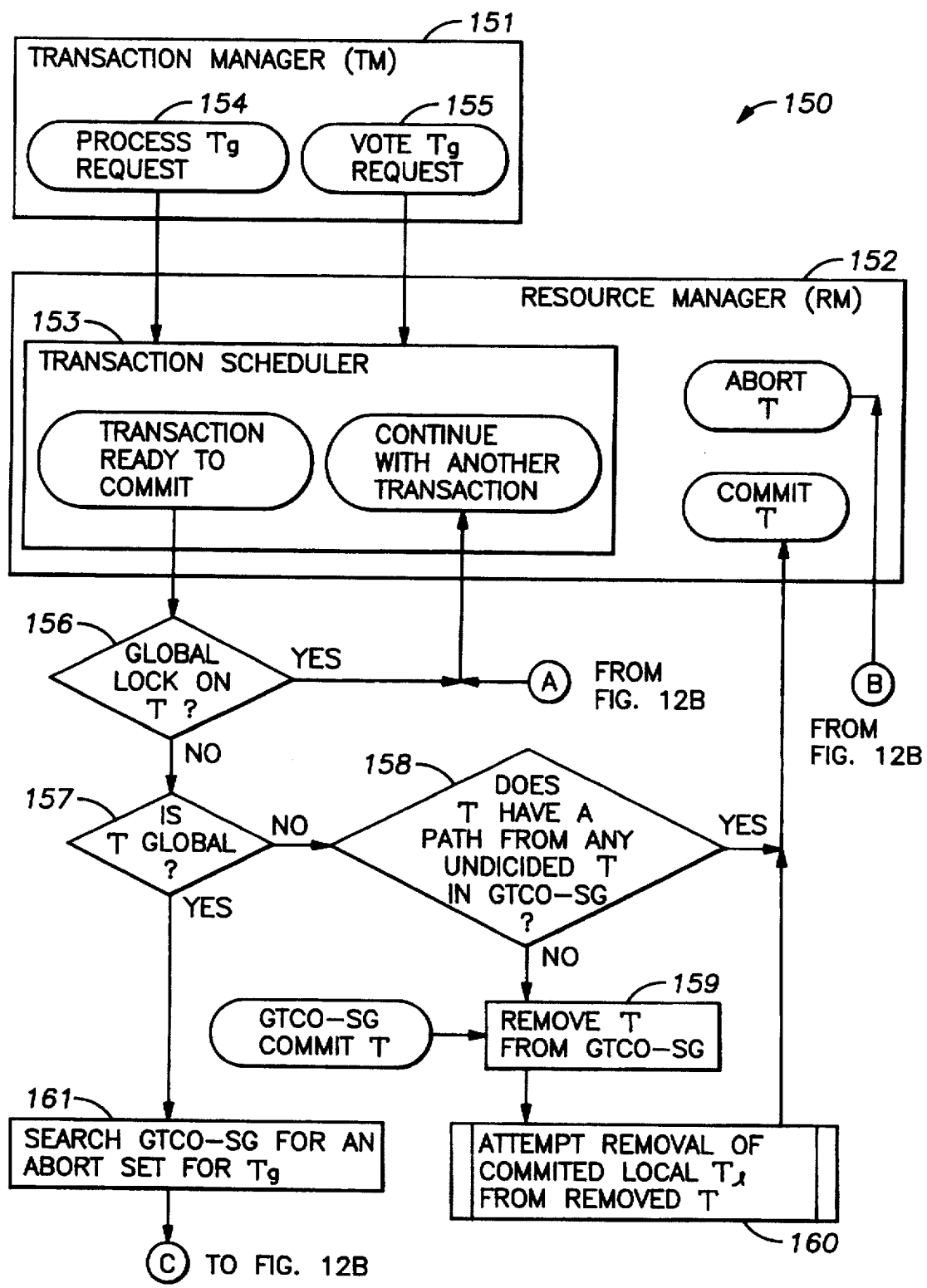
FIGS. 12A and 12B (collectively FIG. 12) are a flow chart of a procedure for selecting a transaction to commit and for selectively aborting transactions to enforce global transaction commitment ordering.
Figure 12B:
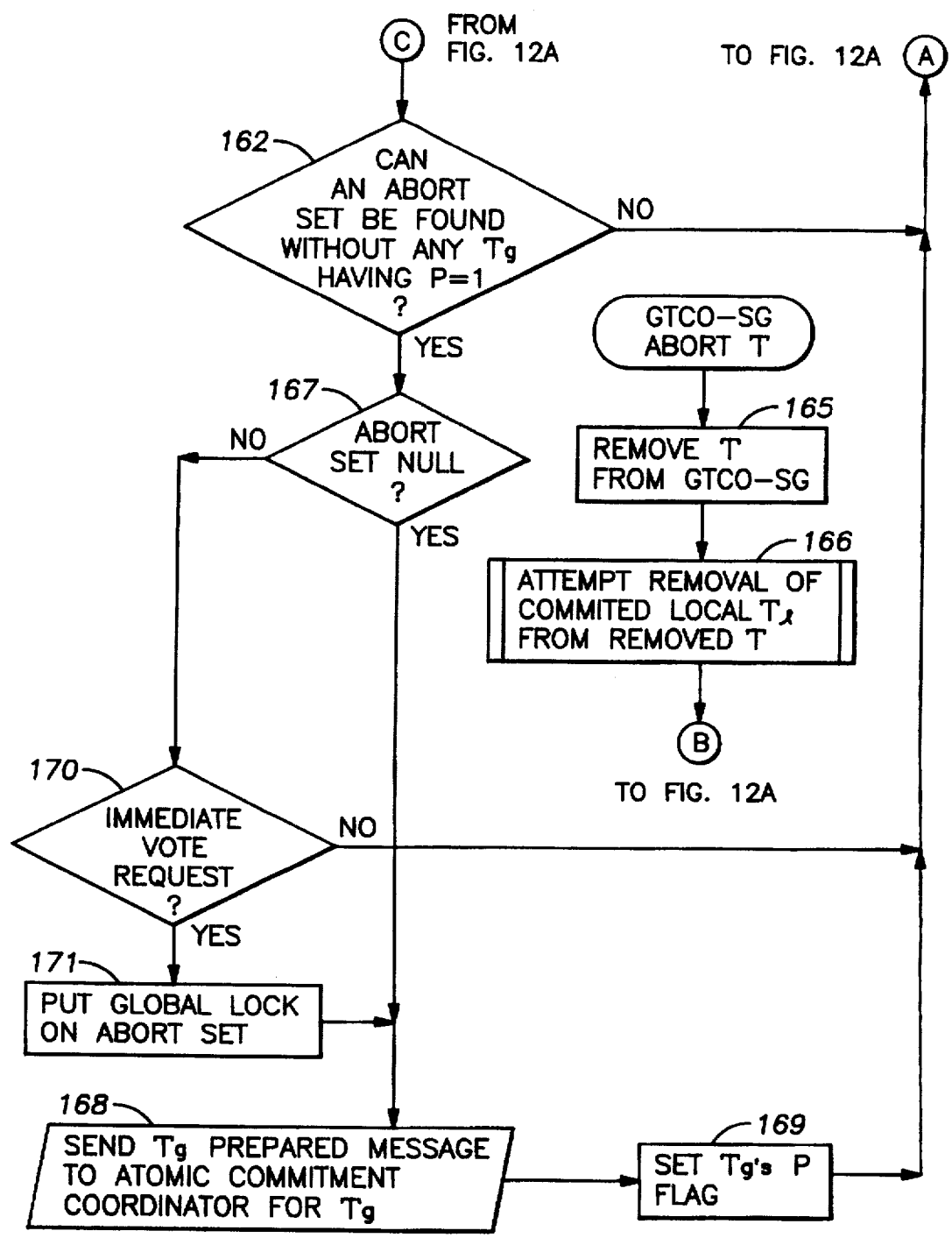

Turning now to FIG. 11, there is shown a state diagram of a processor 145 in a distributed transaction processing system that uses the preferred atomic commitment protocol to process global transactions. The processor also processes local transactions. The local transactions, for example, are issued by a local user 146 such as an application program executed by the processor. Global transactions issued by the local user are coordinated by the transaction manager 147, that functions as the atomic commitment coordinator for these global transactions. Therefore, the processor 145 should know whether a transaction is global or local, depending on the source of the transaction. Existing systems, however, may have to be modified to provide information identifying each transaction as global or local. The information should be made available to the local scheduler as early as possible for use by the local concurrency control mechanism. Otherwise, each transaction should be assumed to be global, but in this case any optimization of the local concurrency control for local transactions is lost. When an optimistic local concurrency control is used, for example, knowledge that a transaction is local can be used at any time before the transaction is decided. For some applications, some transaction types are a-prior known to be local, and hence this information could be used to identify local transactions in systems which do not explicitly identify the source of each transaction.

In any case, the transaction scheduler receives the transaction request and puts the transaction request into an entry of the transaction list. The transaction scheduler eventually transfers execution to the transaction, and the transaction is executed until either it becomes inhibited or it becomes ready. As described above in connection with FIG. 6, a transaction may become inhibited after requesting an input/output operation or memory operation, and, upon completion of the input/output or memory operation, the transaction will become uninhibited. A transaction that is either active, inhibited or ready can be aborted to enforce global transaction commitment ordering.

The transaction scheduler may commit a ready local transaction. To insure global synchronization in a distributed transaction processing system, however, a ready global transaction is committed only after a handshake with the coordinator 147. This handshake insures that a global transaction is not committed unless all of the processors that are processing assigned portions of the global transaction are also ready to commit their assigned portions of the global transaction. Therefore, when the state of a global transaction changes from the "active" to the "ready" state, a "prepared" signal is transmitted to the coordinator 147.

When the coordinator 147 receives "prepared" signals from all of the processors participating in a global transaction, then the coordinator sends a "commit" command back to the processors. If, however, the coordinator fails to receive a "prepared" signal from all of the participating processors, then the coordinator may transmit an "abort" signal to the processors. In FIG. 1, these handshake signals are indicated by dotted lines.

When a local transaction is committed, the transaction scheduler notifies the local user 146 that the transaction has been completed. When a global transaction is committed, the transaction scheduler removes the global transaction from the transaction list and sends a signal to the coordinator 147 indicating that the global transaction has been committed. Moreover, when a global transaction is aborted, the global transaction is removed from the transaction list and the global transaction commitment order serializability graph, and the transaction scheduler sends a signal to the coordinator 147 to confirm the abort. For a local transaction, however, it may be desirable to restart preparation of the transaction, and in this case it is only necessary to reset the initial context of the transaction, clear the transaction from the global transaction commitment order serializability graph, and set the state of the transaction back to "active" by resetting the R and I flags in the transaction list entry of the transaction.

Turning now to FIG. 12, there is shown a flow chart generally designated 150 of a procedure for a global transaction commitment order coordinator working in connection with a transaction manager 151 and a resource manager 152 to selectively abort or delay the commitment of transactions to enforce commitment ordering of global transactions. As described above, the transaction manager 151 acts as an interface for initiating global transactions and conducting an atomic commitment protocol. The resource manager 152 has a transaction scheduler 153 that schedules the preparation of local transactions as well as global transactions $T_g$ identified by a request 154.

The transaction scheduler 153 periodically checks whether a transaction is ready to commit. Preferably, the transaction scheduler also checks whether a global transaction is ready to commit in response to a "vote request" 155 from the atomic commitment coordinator of a global transaction. Although such a "vote request" is not needed for the atomic commit protocol described above with respect to FIG. 11, it permits the commitment of a global transaction to be delayed to possibly reduce the number of members in the global transaction's abort set. In the procedure illustrated by the flow chart 150 of FIG. 12, for example, a "prepared" message for a global transaction ready to commit is sent to the atomic commitment coordinator immediately when the abort set for the global transaction is null; otherwise, a "prepared" message for the global transaction is sent to the coordinator only after receiving a vote request 155 from the atomic commitment coordinator. In an alternative embodiment described below, a vote request is not used, but if the abort set is not null, a "prepared" message is sent to the atomic commitment coordinator only after a predetermined period of time.

When the transaction scheduler 153 finds that a transaction is ready to commit, the global transaction commitment order coordinator checks in step 156 whether a global lock has been placed on the ready transaction. If a global lock has been placed on the ready transaction, then it is not committed, and execution returns to the transaction scheduler to continue processing for another transaction. It is not necessary to use such a global lock, but the use of such a global lock permits some transactions to be committed that would otherwise have to be aborted when chosen to be included in the abort set of a global transaction. Instead of immediately aborting the members of an abort set for a global transaction, a global lock is placed (in step 171) on the members of an abort set, and then (in step 169) a "prepared" message for the global transaction is sent to the atomic commitment coordinator. If the atomic commitment coordinator then decides to abort the global transaction, the global locks for the global transaction are released (in FIG. 14), thereby permitting the members of the abort set to be committed.

Next, in step 157, execution branches to step 158 when the ready transaction is local. If the ready transaction has a path from any undecided transaction in the global transaction commitment order serializability graph, as tested in step 158, then the ready transaction must remain in the graph (even though it will become a committed local transaction). Therefore, in this case, execution branches to the resource manager 152 to commit the ready transaction. Otherwise, in step 159, the ready transaction is removed from the graph. Its removal may permit other committed local transactions to be removed from the graph, as attempted in step 160 by calling a "garbage collection" subroutine shown in the flow chart of FIG. 13. Execution continues to the resource manager 152 to commit the ready transaction.

If the ready transaction is global, as tested in step 157, then in step 161, the global transaction commitment order serializability graph is searched to find an abort set for the ready transaction, as described above. If an abort set cannot be found without any transaction reported to an atomic commitment coordinator as being prepared (i.e., without the flag P=1), then in step 167, execution branches depending on whether the abort set is null. If so, then in step 168, a message is sent to the atomic commitment coordinator indicating that the ready transaction has been prepared to be committed, and in step 169, the P flag for the ready transaction is set. Then execution continues so that the transaction scheduler 153 processes another transaction.

If in step 167 the abort set was not null, then in step 170, execution branches depending on whether the atomic commitment coordinator issued a vote request for the ready transaction. If not, then execution continues so that the transaction scheduler processes another transaction. Otherwise, in step 171, a global lock is placed on each member of the abort set. Next, in step 168, a message is sent to the atomic commitment coordinator for the global transaction indicating that the ready transaction has been prepared to be committed, and in step 169, the P flag for the ready transaction is set. Then execution continues so that the transaction scheduler 153 processes another transaction.

Figure 13:
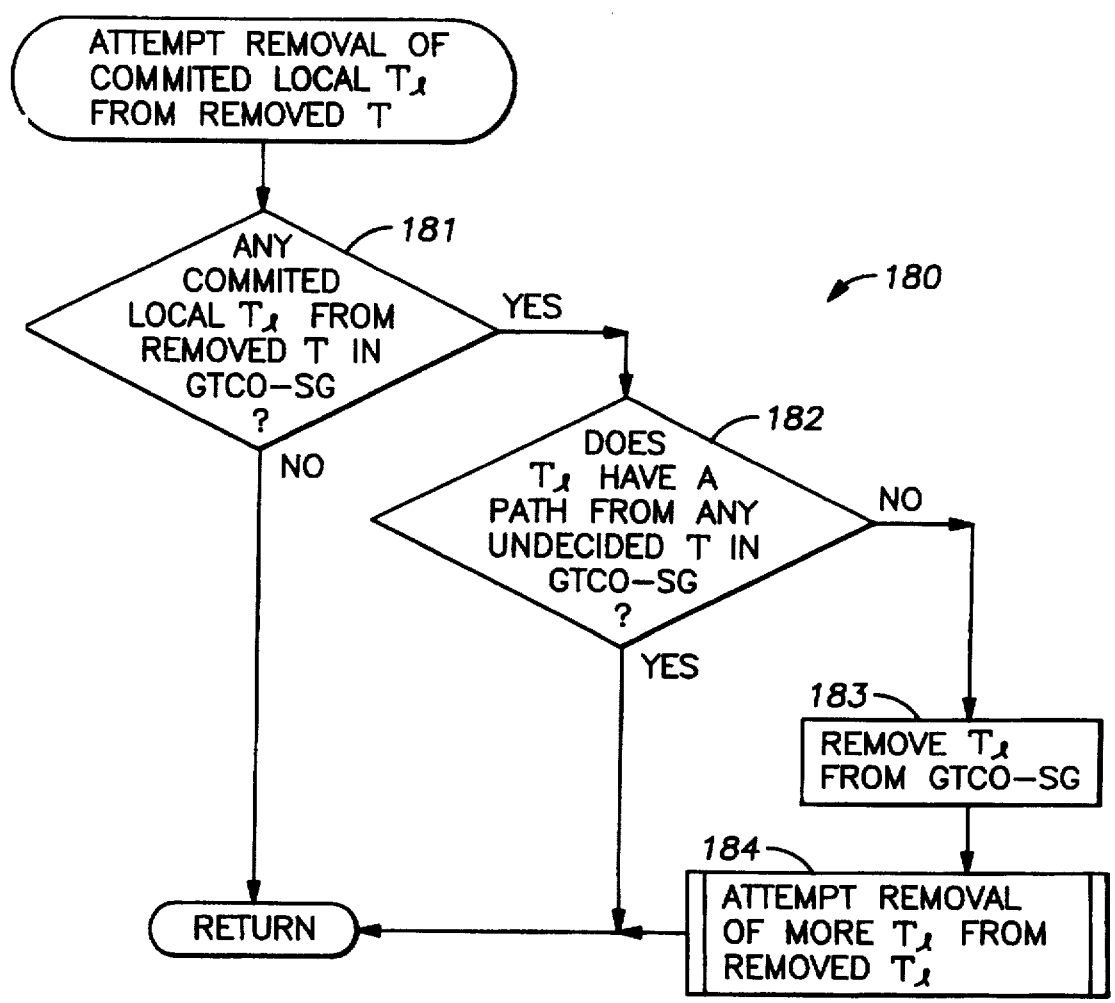
FIG. 13 is a flow chart of a "garbage collection" procedure for removing committed local transactions from the graph of conflict ordering shown in FIG. 9.

Turning now to FIG. 13, there is shown a flow chart 180 of the garbage collection subroutine that is called in steps 160 and 166 of FIG. 12. In a first step 181, execution returns if there are not any committed local transactions that were on paths from the transaction that was just removed from the global transaction commitment order serializability graph. Otherwise, in step 182, the graph is inspected to determine whether each of these local committed transactions has a path from any undecided transaction in the graph. For each of these committed local transactions which does not have any path from any undecided transaction, in step 183, that committed local transaction is removed from the graph, and, in step 184, the subroutine of FIG. 13 is called recursively to attempt the removal of more committed local transactions that were on paths in the graph from the committed local transaction that was just removed from the graph.

Figure 14:
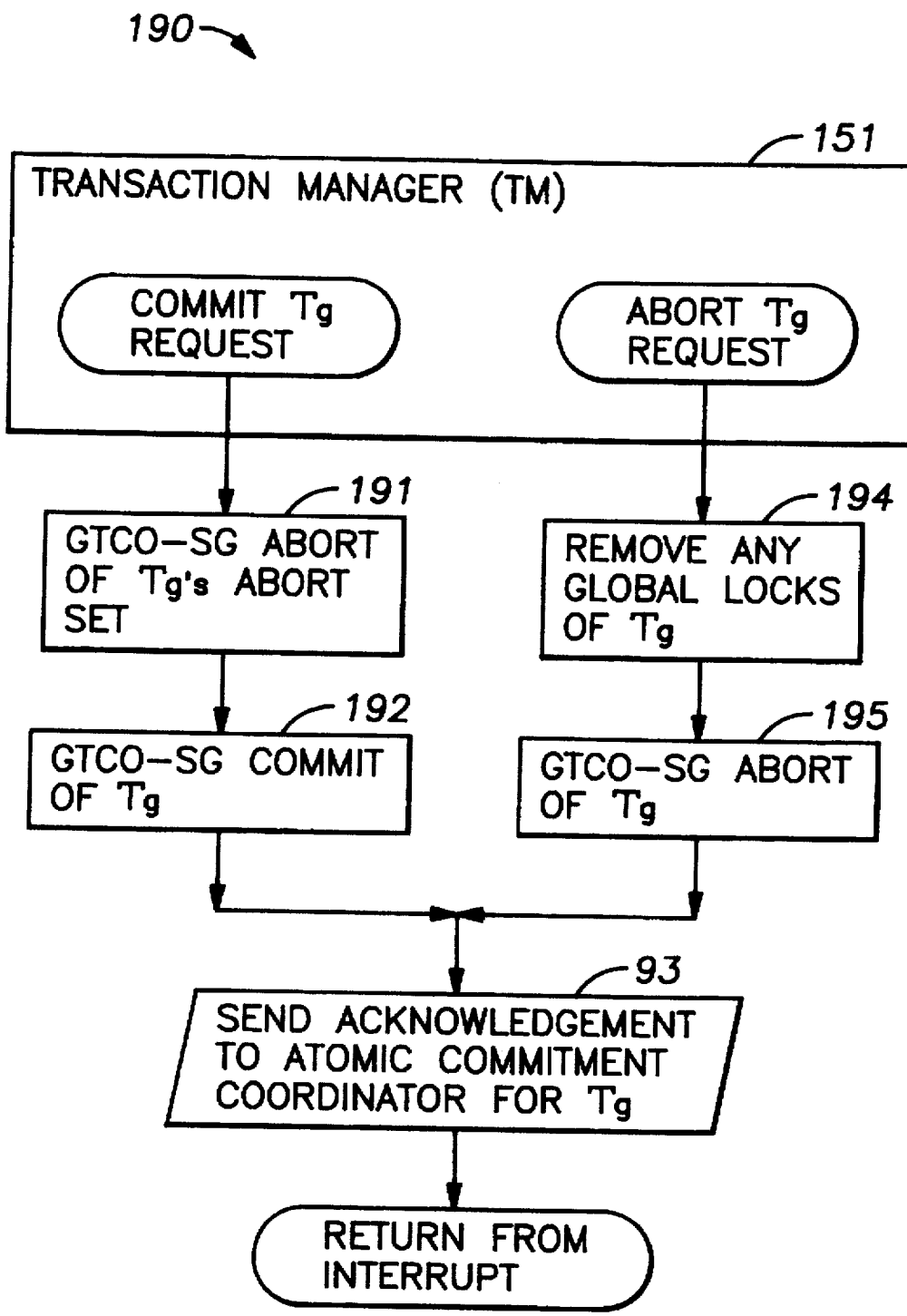
FIG. 14 is a flow chart of a procedure for committing and aborting transactions in response to signals from a coordinator of a global transaction.

Turning now to FIG. 14, there is shown a flow chart 190 of an interrupt routine for responding to commit and abort requests from an atomic commitment coordinator. These requests are passed to the global transaction commitment order coordinator through the transaction manager 151. In response to a request to commit a specified global transaction, in step 191 the members of the transaction's abort set are each removed from the global transaction commitment order serializability graph by performing steps 165 and 166 of FIG. 12, and aborted by the resource manager. Next, in step 192, the specified global transaction is removed from the graph by performing steps 159 and 160 of FIG. 12, and committed by the resource manager. Then, in step 193, an acknowledgement is sent to the atomic commitment coordinator for the global transaction, and execution returns from the interrupt.

In response to a request to abort a specified global transaction, in step 194, any global locks imposed by the transaction are removed. Associated with each globally-locked transaction, for example, is a list of pointers to all of the global transactions having locks on the locked transaction. Associated with each prepared global transaction is a list of pointers of the locked members of its abort set. Removal of the global locks imposed by the specified transaction in this example entails removing the pointers to the specified transaction from the list associated with each member of the specified transaction's abort set, and when any list associated with each member of the abort set becomes empty, releasing the lock on that member. Then, in step 195, the specified transaction is removed from the global transaction commitment order serializability graph by performing steps 165 and 166 of FIG. 12, and the specified transaction is aborted by the resource manager. Finally, in step 193, an acknowledgement is sent to the atomic commitment coordinator for the global transaction, and execution returns from the interrupt.

Figure 15:
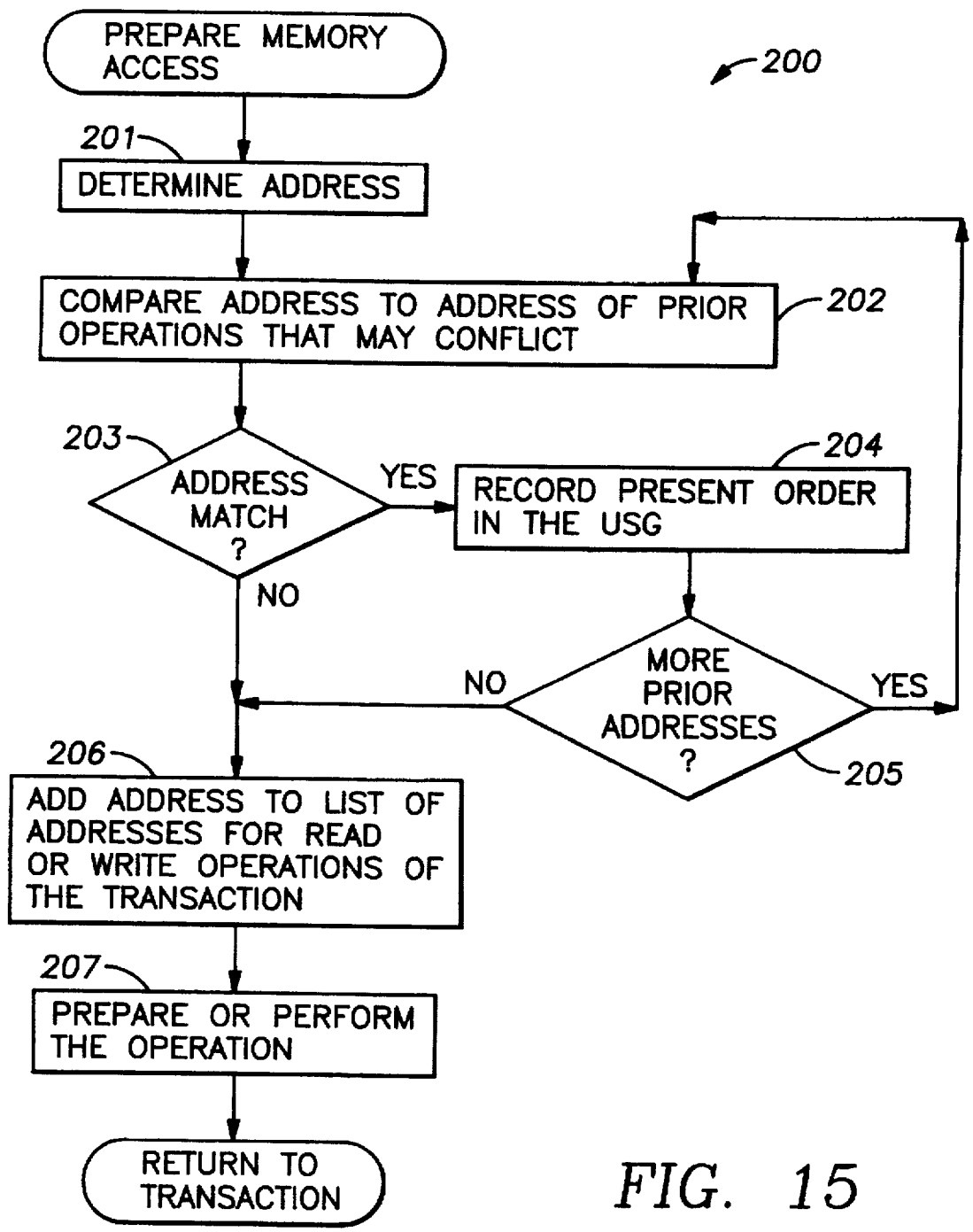
FIG. 15 is a procedure for detecting a conflicting memory access operation during the preparation of a transaction.

Turning now to FIG. 15, there is shown a flow chart 200 of a procedure for determining the order of conflicts among conflicting transactions. The procedure 200 is invoked during the preparation of a memory access operation such as a read or write. In the first step 201, the address of the memory access operation is determined. Next, in step 202 the address is compared to addresses of prior operations that may conflict. This is done by searching a list of addresses of prior operations for each transaction in the transaction list. If the present operation is a read operation, then the read operation may conflict with prior write operations. If the present operation is a write operation, then the write operation may conflict with a prior read (or for Case 2 of FIG. 4B, a prior write operation). When there is an address match as tested in step 203, then in step 204 the present order of the transaction is recorded in the global transaction commitment order serializability graph (94 in FIG. 7). In particular, for Case 1 of FIG. 4A, conflicts only occur between a read operation and a write operation, and the order of operation is read then write. For Case 2 of FIG. 4B, the present order must be for the current transaction to be performed after the previous transaction. In step 205 execution branches back to step 202 if there are additional prior memory access operations to check, or otherwise preparation of the memory access continues in step 206 by adding the address determined in step 171 to a list of addresses for read or write operations of the current transaction. Then, in step 207, the operation is prepared or performed. Execution then returns to the transaction.

Figure 16:
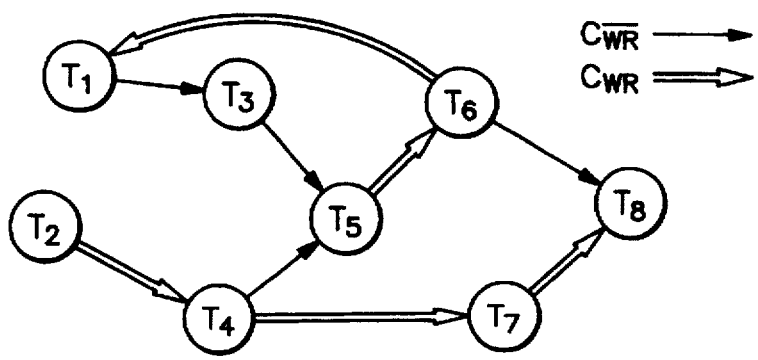
FIG. 16 is a modified graph in which write-read conflicts are distinguished from other conflicts.

Turning now to FIG. 16, there is shown an augmented global transaction commitment order serializability graph in which edges including a particular kind of write read conflict are distinguished from edges of other conflicts. Such an augmented graph can be stored in a data structure similar to the data structure shown in FIG. 8, but each edge is represented by a pair of flags, consisting of a first flag indicating any kind of conflict, and a second flag indicating that there is a write-read conflict between a first transaction that was the last transaction to write to a resource x before being read by a second transaction. The augmented graph of FIG. 16 is used to perform cascading aborts to insure recoverability for a system in which a second transaction can read the write data of a first transaction before the first transaction is committed, as was described above with reference to FIG. 4B. Suppose, for example, that global transaction $T_5$ is selected as a ready transaction to be committed. To enforce global transaction commitment ordering, then global transactions $T_3$ and $T_4$ of FIG. 16 must be aborted. However, assume that the transaction processing system operates in the fashion as described above with reference to FIG. 4B. In this case, when a transaction is aborted to enforce global transaction commitment ordering, then every transaction that has read write data of the aborted transaction must also be aborted. From the augmented graph of FIG. 16, it is seen that when the transaction $T_4$ is aborted, then the transaction $T_7$ must also be aborted because of the write read conflict between transactions $T_4$ and $T_7$. Moreover, when the transaction $T_7$ is aborted, then so must the transaction $T_8$ because the transaction $T_8$ has read data written by the transaction $T_7$.

A specific procedure for performing a cascading abort is shown in the flow chart 210 of FIG. 17. In the first step 211 the augmented graph is searched to find all of the transactions $T_y$ such that $T_y$ has read data written by a specified transaction $T_x$. Then in step 212 the transaction $T_x$ is aborted. In a final step 213, the subroutine 190 of FIG. 17 is recursively called to abort each of the transactions $T_y$. It is assumed, of course, that during the recursive call, step 212 will not attempt to abort any committed local transaction in the graph. Such an attempt is an error condition, indicating that the transaction scheduler has failed to ensure recoverability of the system. Any such error should be reported to the system manager, because it may indicate that the state memory has been corrupted with inconsistent results.

Figure 18:
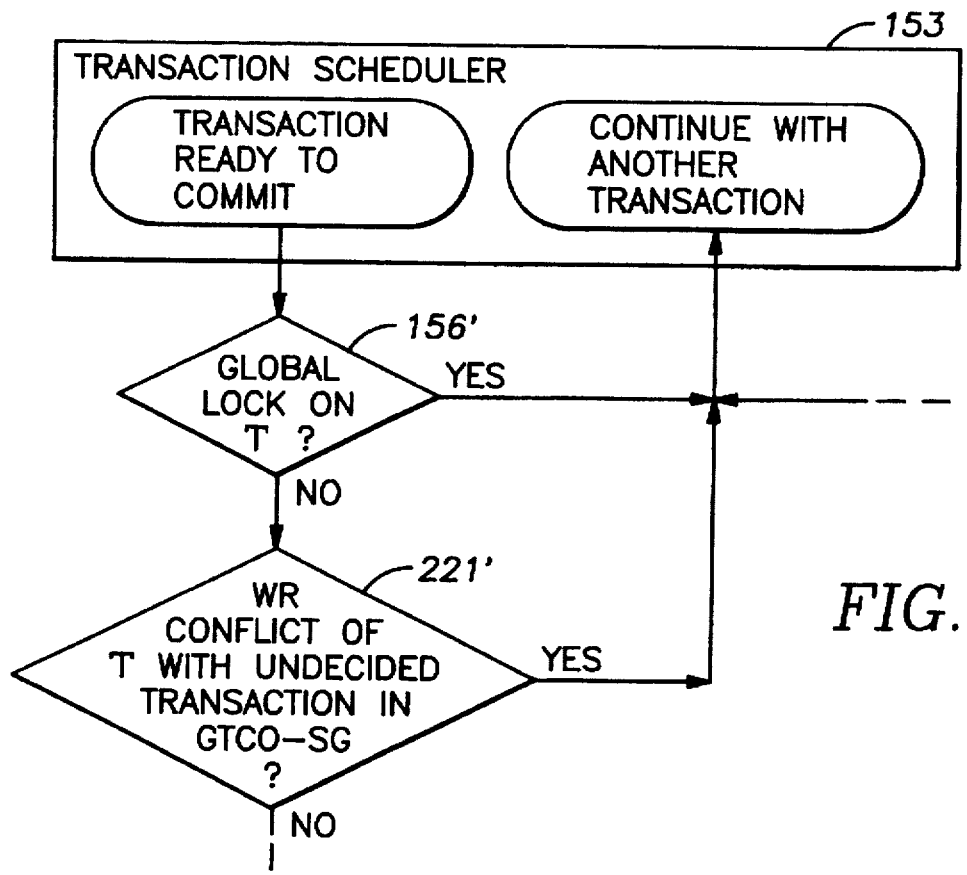
FIG. 18 shows a modification to the flow chart of FIG. 12 that should be made for an alternative embodiment of the invention that permits a global transaction to read data written by an undecided transaction.

Preferably, an explicit step is inserted into the scheduling procedure to ensure recoverability in any system intended to operate in accordance with Case 2 of FIG. 4B. As shown in FIG. 18, for example, a scheduler 153' first checks in step 156' whether there is a global lock on a ready transaction before permitting the transaction to be committed, as was shown in FIG. 12. To ensure recoverability, however, an additional step 221' is used which prevents any ready transaction from being committed when it has a write-read conflict with any undecided transaction in the augmented global transaction commitment order serializability graph.

Figure 19:
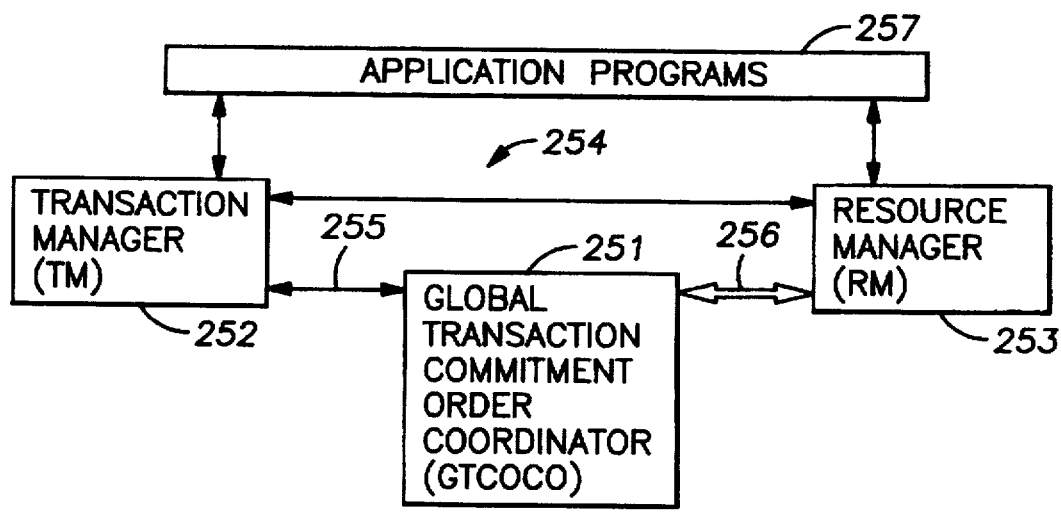
FIG. 19 is a block diagram showing a global transaction commitment order coordinator employing the present invention inserted in a conventional transaction processing system between a transaction manager and a resource manager.

Turning now to FIG. 19, there is shown an embodiment of the present invention wherein a global transaction commitment order coordinator (GTCOCO) 251 is inserted into a conventional transaction processing system having a transaction manager (TM) 252 and a resource manager (RM) 253. Application programs 257 send requests for global transactions to the transaction manager 252 and requests for local transactions to the resource manager 253. As shown, the global transaction commitment order coordinator 251 assumes a subset of the interface 254 between the transaction manager 252 and the resource manager 253. The global transaction commitment order coordinator 251 intercepts a conventional portion 255 of the interface 254, and is interconnected to the resource manager 253 via an extended interface 256 that has some additional signals unique to the operation of the global transaction commitment order coordinator. In the distributed processing system, the configuration shown in FIG. 17 may be used at each node in the system. Alternatively, only some of the processors in the system could use a global transaction commitment order coordinator, and the other processors could use conventional strong-strict two phase locking for concurrency control, in the fashion described above with respect to FIG. 3, for the scheduling of global as well as local transactions.

In general terms, the global transaction commitment order coordinator provides added value by delaying "yes votes" on behalf of global transactions when necessary to comply with global transaction commitment ordering. If the system does not provide a global deadlock resolution mechanism, then the global transaction commitment order coordinator could also provide such a mechanism by aborting transactions after a predetermined time limit (as a result of forcing "yes" votes and then committing and aborting transactions).

It is assumed that the resource manager 253 provides the following conventional services:

R_PREPARE(T): The TM notifies the RM to complete the transaction T. It means that the RM will not receive any additional requests or external data on behalf of transaction T;

R_COMMIT(T): The TM notifies the RM to commit transaction T. A prerequisite for invocation of this service is that the RM has previously acknowledged preparation of the transaction (i.e., voted YES); and R_ABORT(T): The TM notifies the RM (and eventually also all the other RMs involved with T) to abort transaction T.

It is also assumed that the transaction manager 252 provides the following conventional services:

T_READY(T): The RM notifies the TM that is has completed processing transaction T, and it votes YES (i.e. it is ready to commit or abort T according to the TM's notification);

T_ABORT(T): The RM notifies the TM that it has aborted transaction T (which will result in aborting T by all the RMs involved).

When inserted into the TM-RM interface 254, the global transaction commitment order coordinator 251, rather than the resource manager 253, directly invokes T_READY(T) and T_ABORT(T) services of the transaction manager 252. Moreover, the global transaction commitment order coordinator 251, instead of the resource manager, directly receives the signals from the transaction manager for causing the R_COMMIT(T) and R_ABORT(T) services. For convenience in identifying the services in the following description, the services of the global transaction commitment order coordinator to these signals are named as C_T_COMMIT(T) and C_T_ABORT(T), respectively.

The RM-GTCOCO interface is a superset of the TM-GTCOCO interface. In particular additional services are defined for maintaining the GTCO-SG, the GTCOCO's data structure. The signals from the RM which previously invoked the conventional T_READY(T) and T_ABORT (T) services of the transaction manager now invoke services C_R_READY(T) and C_R_ABORT(T), respectively, of the global transaction commitment order coordinator 251. The global transaction commitment order coordinator 251 is also invoked by the resource manager 253 to perform the following additional services of the commitment order coordinator:

C_R_BEGIN(T, Type): The RM notifies the GTCOCO to establish a node for T in the GTCO-SG, and "Type" takes on the values "local" or "global"; and C_R_CONFLICT($T_1,T_2$): Prior to executing an operation of $T_2$ that generates the conflict with $T_1$, the RM invokes this service to notify the GTCOCO. If a respective edge from $T_1$ to $T_2$ does not exist already in the GTCO-SG, it is being created. The actual operation of $T_2$ is executed by the RM only after receiving an acknowledgement from the GTCOCO to guarantee that the GC0-SG is updated with that conflict at that time.

The resource manager 253 is invoked by the global transaction commitment order coordinator 251 to perform the original R_COMMIT(T) and R_ABORT(T) services. The resource manager 253 is also invoked by the commitment order coordinator 251 to provide the following additional service:

R_CONFLICT_ACK($T_1,T_2$). After this invocation the RM can execute the operation or operations in $T_2$ that cause the respective conflict with $T_1$; and R_DELETE(T). This invocation is used by the GTCOCO to notify the RM to stop informing it of conflicts with a committed transaction. In other words, the GTCOCO sends this invocation after it has deleted a committed local transaction from the GTCO-SG.

Figure 20:
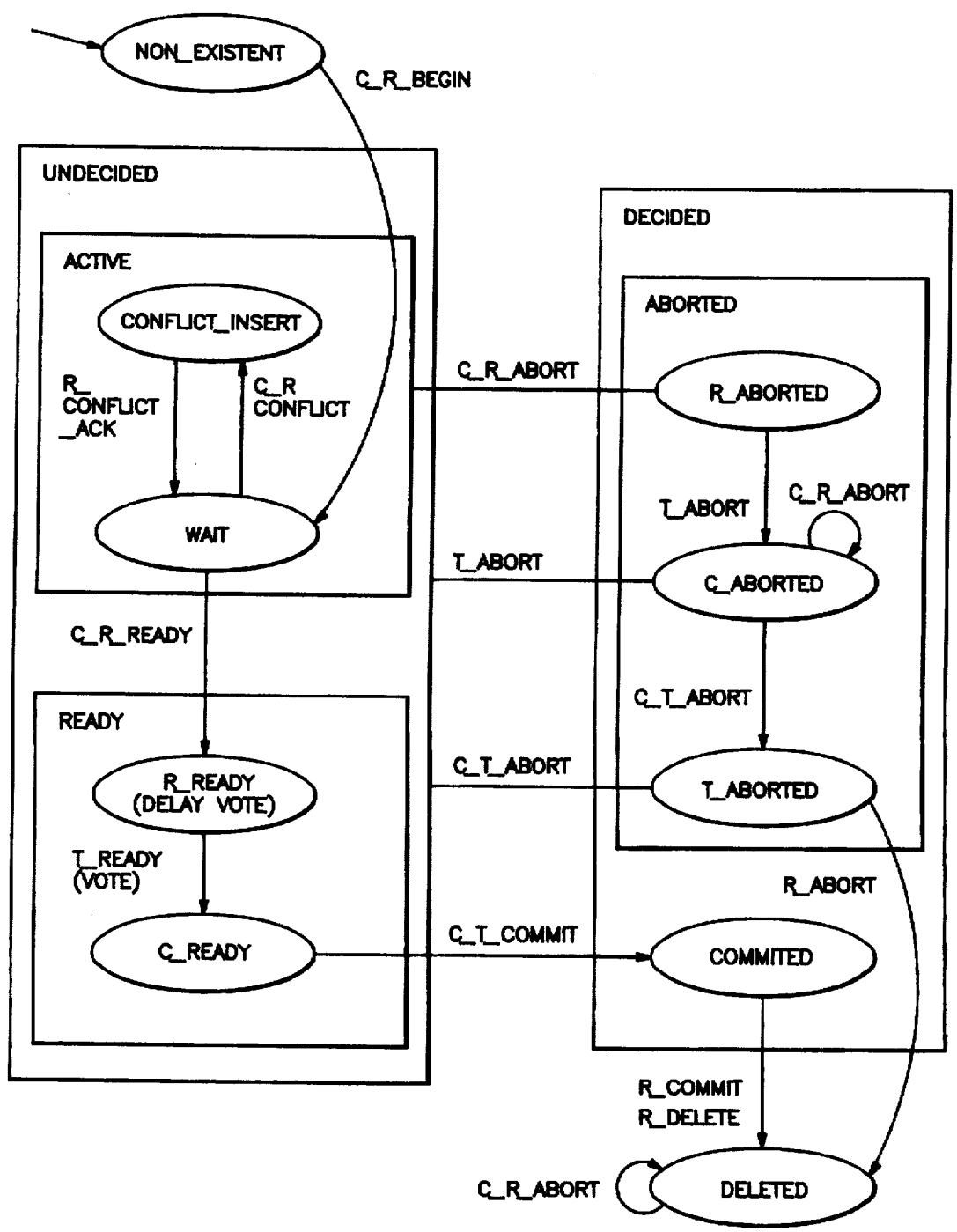
FIG. 20 is a state diagram of the transaction processing system of FIG. 19 for the processing of global transactions.
Figure 21:
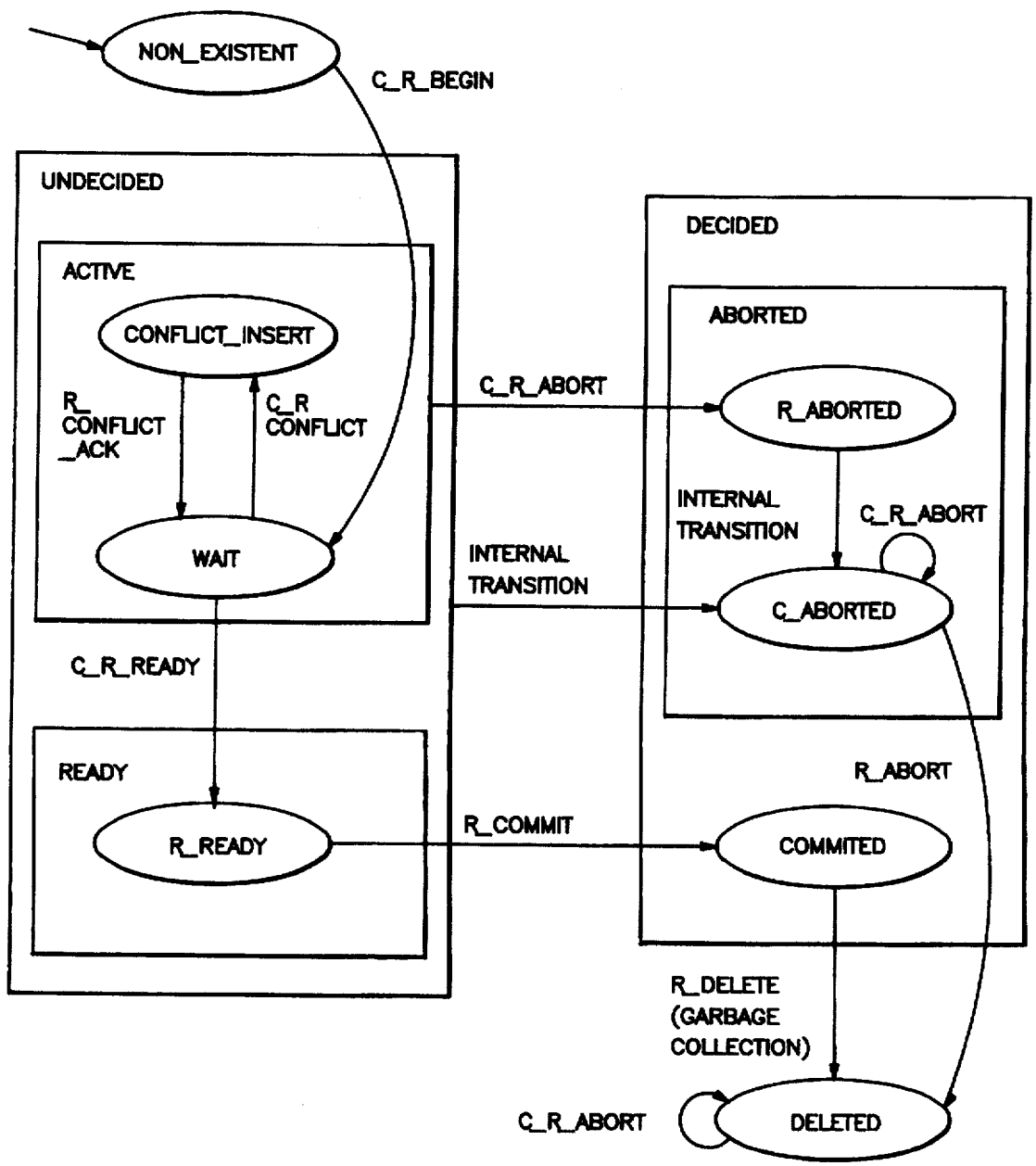
FIG. 21 is a state diagram of the transaction processing system of FIG. 19 for the processing of local transactions.

Keeping in mind the above definitions of the invocations in the system of FIG. 19, it should be apparent that states of the system are responsive to the invocations as shown in FIG. 20 for global transactions and FIG. 21 for local transactions. The invocations are further defined by the following PASCAL/SGL based pseudo code, which is based on the state diagrams of FIGS. 20 and 21.

In the following pseudo code, concurrent invocations are allowed, as well as several concurrent invocations of the same service. T_ERROR(T) and R_ERROR(T) are error message invocations of the TM, RM respectively, indicating erroneous invocation sequencing. The transaction's atomic state is returned as an error type. The procedure GARBAGE_COLLECTION(T) is invoked with R_COMMIT(T) and R_ABORT(T) after T is decided to recursively notify the RM (using DELETE(T')) to stop conflict notification committed local transactions T' ("forget" T') that have paths from T and do not belong in the GTCO-SG.

```
     GARBAGE_COLLECTION(T)          /* recursive procedure;
                                       invocation follows deciding T*/
     if decided(T) /* to stop the recursion at an undecided
     transaction */ then if (Type=local and CHECK_PATHS(T)=false or
10   Type=global then begin
               if committed(T) then DELETE(T)
               for every T' where (T,T') is in the GTCO-SG do
15                           GARBAGE_COLLECTION(T')
               delete T from the GTCO-SG          /* set deleted(T);
                                                     pseudo state change */
     end 20   CHECK _PATHS(T) /* returns Boolean; checks if T has an edge from
                        an undecided transaction or a (committed) local
                        transaction */
               set CHECK_PATHS:=false
               for every T" where (T",T) is in the GTCO-SG do
25             if T".Type=local or undecided(T") then set
               CHECK_PATHS:=true
```

```
        end_CHECK_PATHS
        end_GARBAGE_COLLECTION

5
        C_T_COMMIT(T)                    /* commit a global transaction */
        if not C_ready(T)   then T_ERROR(T)
        else
        begin
10              set committed (T)                    /* state change */
                for every T' in ABORT(T)
                        if not aborted (T') then
                case T' Type of
                local:   /* set C_aborted(T')         pseudo change */
15               R_ABORT(T')
                 GARBAGE_COLLECTION(T')
                global:  T_ABORT(T')
                         set C_aborted(T')            /* state change */

20      end_case
        R_COMMIT(T)
        GARBAGE_COLLECTION(T)
        end
        end_C_T_COMMIT
25
```

```
    C_T_ABORT(T)                        /* abort a global transaction T */
    if not (undecided (T) or C_aborted(T)) then T_ERROR(T)
    else
    begin      /* set T_aborted(T)      pseudo state change */
5              R_ABORT(T)               /* notify the RM to abort T */
               GARBAGE_COLLECTION(T)
    end
    end_C_T_ABORT

10

C_R_ABORT(T)
    if not(active(T) or /*in a case of invocation collision*/
    C_aborted(T) or deleted(T)     /*i.e. T does not exist*/  )
15  then R_ERROR(T)
    else if active(T) then
          case Type of
          local:    /* set R_aborted(T)      pseudo change */
                    /* set C_aborted(T)      pseudo change */
20                  R_ABORT(T)
                    GARBAGE_COLLECTION(T)
          global:   /* set R_aborted(T)      pseudo state change */
                    T_ABORT(T)
                    set C_aborted(T)        /* state change */
25        end case
    end_C_R_ABORT
```

```
    C_R_BEGIN(T,Type)                   /* nodes's Type is local
                                                or global */ if not non_existent(T)
    /* i.e. if there is a T node in the GTCO-SG*/ then R_ERROR(T)
5   else
    begin
            insert a node for T to the GTCO-SG
                set wait(T)              /* state change */
    end
10  end_C_R_BEGIN C_R_READY(T)
15  if not wait(T) then R_ERROR(T) else
    begin
                set time(T):=local_time
                    /* time(T) is used by the VOTE procedure to timeout
                    delaying the voting on global/committing local T;
20                  local_time indicates the local clock's value */
                set R_ready(T)           /* state change */
    end
    end_C_R_READY

25
```

```
       C_R_CONFLICT(T',T)

if not wait(T) or deleted (T') then R_ERROR(T)

else begin

5             /* set conflict_insert(T)      pseudo state change */ if the edge (T',T) does not exist in the GTCO-SG then insert the edge (T',T) to the GTCO-SG

R_CONFLICT_ACK(T',T)

/* set wait(T)                 pseudo change */

10     end end_C_R_CONFLICT

VOTE (timeout)

/* timeout: A YES vote may be issued on a ready transaction T after the time passed since T entered a ready state has exceeded 15     the timeout value, even if this may cause aborting transactions in the set ABORT(T). */ repeat select any transaction T where

R_ready(T)

20             and       (ABORT(T) is empty or   decided(T') for every T' in ABORT(T))

if found then YES(T)    /* voting YES without aborts */ else    select any transaction T where

R_ready(T)

25                       and optimal(T) /* see a remark below */ and local_time - time(T) > timeout
```

77

```
                                    /* T entered the ready state at time(T);
                                    local_time indicates the clock's value */
                    if found then
                    case Type of
5                   local:   set committed(T) /* state change */
                             R_COMMIT(T)
                             GARBAGE_COLLECTION(T)
                    global:  if not C_ready(T') for every global
                             transaction T' in ABORT(T)
10                                  /* YES vote on T' has not been invoked */
                             then YES(T) /* voting YES with
                                        possible future aborts */
                    end_case
        end_repeat
15      YES (T)
                                    /* procedure */
                    T_READY(T)      /* voting YES on T */
                    set C_ready(T)  /* state change */
        end_YES
20      end_VOTE
```

In the above vote procedure, a timeout signal is used in lieu of the immediate vote request from the atomic commitment coordinator as was described above with reference to FIG. 12. Also in the vote procedure, the Boolean optimal (T) indicates whether the choice of T to be committed is optimal concerning the effects of aborting the transactions in the above set, ABORT(T) when T is global, or affecting such sets for other global transactions when T is local. Usually, there may exist several optimal transactions simultaneously. The optimality criterion, for example, a weighted cost of the transactions in ABORT(T), and the criterion may vary according to transactions' applications, system configuration or state, etc. A way to implement such a criteria is by assigning a priority to each transaction in the GTCO-SG. Minimizing the priorities sum for transactions in ABORT(T) is an example. A priority may change dynamically until the voting event (T_READY(T)) occurs. From the architecture point of view, priorities should be carried to the GTCOCO through invocations. There is no difficulty, in principle, to acquire such priorities from the local RM (e.g., by a C_R_SET_PRIORITY(T,priority) service). Common existing two-phase commit interfaces, however, do not support, for the time being, this kind of information coming from the TM. Passing priorities through the TM, though, has the advantage of possibly considering global priorities (vs local ones if only the local RM is involved).

The global transaction commitment order coordinator 251 as defined by the above pseudo code can be modified to guarantee recoverability of the output schedule. The modified commitment coordinator will be referred to as a GTCORCO. The GTCORCO is used when the interfacing RM (253 in FIG. 19) does not guarantee recoverability, and it still follows the state diagrams of FIGS. 20 and 21. The GTCORCO differs from the above pseudo code example by using cascading aborts, and by the following additional modifications. Certain write-read conflicts are reflected in the GTCO-SG's edges, as illustrated in FIG. 16. If the edge $(T_1,T_2)$ represents a wr conflict where $T_1$ was the last transaction to write to a resource x before being read by a transaction $T_2$ (and possibly some other conflicts) the Boolean $wr(T_1,T_2)$ has the value true, and no YES vote is issued on $T_2$ if $wr(T_1,T_2)$ has the value true (to avoid recoverability violation). Moreover, the service C_R_CONFLICT has an additional Boolean parameter, wr, to indicate such a wr conflict (C_R_CONFLICT($T_1,T_2$,wr)). Furthermore, the GTCORCO's invocations, as well as its VOTE procedure, are modifications of the GTCOCO's, reflecting the differences listed above.

The following recursive procedure CASCADE(T) invokes T_ABORT(T) for global transactions and R_ABORT(T) for local transactions, and generates additional T_ABORT and R_ABORT invocations when necessary to maintain recoverability.

```
       CASCADE(T)      /* recursive procedure; invokes T_ABORT or R_ABORT for T
       and all related transactions to be aborted to maintain Recoverability
       (cascading aborts) */

25     case Type of
       local:    /* set C_aborted(T)          pseudo change */
```

```
                R_ABORT(T); GARBAGE_COLLECTION(T)
     global:    T_ABORT(T)
                set C_aborted(T)            /* state change */
     end_case
5    for every T' such that the edge (T,T') is in the GTCO-SG
                if wr(T,T') then CASCADE(T')
     end_CASCADE 10
     GARBAGE_COLLECTION(T)        /* unchanged; same as the GTCOCO's */

C_T_COMMIT(T)                /* commit a global transaction T */
     if not C_ready(T) then T_ERROR(T)
15   else
     begin       set committed(T)           /* state change */
                 for every T' in ABORT(T) do
                 if not aborted(T') then CASCADE(T')
                 R_COMMIT(T); GARBAGE_COLLECTION(T)
20               delete T from the USG      /* set deleted(T);
                                                pseudo state change */
     end
     end_C_T_COMMIT

25
```

81

```
        C_T_ABORT(T)                    /* abort a global transaction T */
        if not( undecided (T) or C_aborted(T) then T_ERROR(R)
        else
        begin          /* set T_aborted(T)      pseudo state change */
5                      for every T' such that the edge (T,T') is in the GTCO-SG
                              if wr(T,T') then CASCADE(T')
                       R_ABORT(T); GARBAGE_COLLECTION(T)
        end
        enc_C_T_ABORT
10

C_R_BEGIN(T,Type)              /* unchanged; same as the GTCOCO's
        */
15      C_R_READY(T)                   /* unchanged; same as the GTCOCO's
        */
        C_R_ABORT(T)
        if not( active(T) or   /* in a case of invocation collision */
        C_aborted(T) or deleted(T)     /* i.e. T does not exist */  )
20      then R_ERROR(T)
        else if active(T) then
                  begin
                          /* set R_aborted(T)      pseudo state change */
                          CASCADE(T)
25            end
        end_C_R_ABORT
```

```
        C_R_CONFLICT(T',T,wr)
        if not wait(T) or deleted(T') then R_ERROR(T)
5       else
        begin
                        /* set conflict_insert(T)   pseudo state change */
                        if the edge (T',T) does not exist in the GTCO-SG
        then
10                          begin   insert the edge (T',T) to the GTCO-
        SG
                                set wr(T',T):= false
                                end
                        if wr then set wr(T',T):= true
15                      R_CONFLICT_ACK(T'T,wr)
                        /* set wait(T)          pseudo change */
        end
        end_C_R_CONFLICT 20      /* Note:  The parameter wr in R_CONFLICT_ACK is used in order to
        execute respective read operations only after the wr parameter of
        the appropriate edge in the GTCO-SG has been set to "true."   */

VOTE (timeout)
25      /* timeout:  A YES vote may be issued on a ready global
        transaction T after the time passed since T entered a ready state
``` has exceeded the timeout value, even if this may cause aborting
transactions in the set ABORT(T). */
repeat
    select any global transaction T where
                R_ready(T)
    and       (ABORT(T) is empty
               or (aborted(T') and not wr(T',T) or committed(T'))
                        for every T' in ABORT(T)  }
    if found then YES(T)    /* voting YES without aborts */
    else    select any transaction T where
                R_ready(T)
        and    not wr(T'T) for every T' in ABORT(T)
        and    optimal(T)
        and    local_time - time(T) > timeout
                /* T entered the ready state at time(T);
                local_time indicates the clock's value */
        if found then
            case Type of
            local:    set committed(T) /* state change */
                        R_COMMIT(T); GARBAGE_COLLECTION(T)
            global:  if not C_ready for every global T' in
                          ABORT(T)
                      /* YES vote on T' has not been invoked */
                      then YES(T) /* voting YES with
                            possible future aborts */
            end_case

```
    end_repeat
    YES(T)
                                        /* procedure*/
              T_READY(T)                /* voting YES on T */
5             set C_ready(T)            /* state change */
    end_YES
    end_VOTE
```

It should be apparent that the services provided by the above pseudo-code are applicable to a wide range of environments in addition to a distributed transaction processing system having separate discrete processors or processes, such as object-oriented systems employing nested transactions, or systems for composed transactions based on flow management or so-called "business transactions." The services provided by the pseudo-code, for example, are directly applicable to any system using T_READY (voting), COMMIT and ABORT services, in which global serializability is required, local serializability is ensured locally, and results are obtained for conflicting operations.

Figure 22:
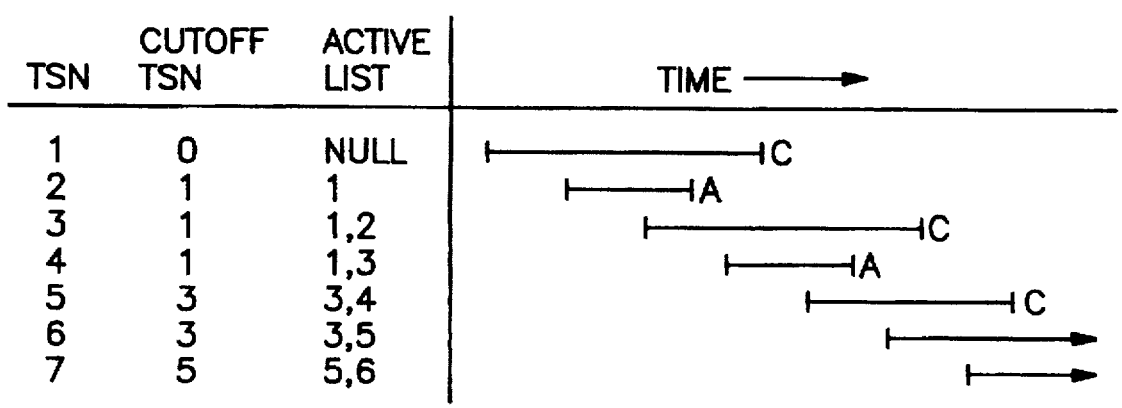
FIG. 22 is a timing diagram that illustrates why snapshots are useful in a transaction processing system.

Turning now to FIG. 22, there is shown a timing diagram for a number of transactions. In this example, which corresponds to the operation of the "Rdb/VMS" (Trademark) operating system, each transaction is assigned a transaction sequence number (TSN) when processing of the transaction begins. For the sake of illustration, a transaction sequence number of zero is assigned to the initial state of the state memory.

In order to define an unambiguous version to be read by any read-only transaction, it will be assumed that a read-only transaction with TSN=Y performing a read operation upon state memory for a resource X will view the results having been last committed to resource X at the time that processing of the transaction Y begins. Moreover, it will be assumed that the snapshot mechanism may be called upon at any time during the processing of transaction Y to return this particular version of the resource X. In the "Rdb/VMS" (Trademark) system, this particular version of the resource X might exist in either a "live" record in volatile memory, a snapshot record in volatile memory, a "live" record in non-volatile memory, or a snapshot record in non-volatile memory. In this context, a "live" record is a record that is accessible by a read-write transaction, and that is no older than the last committed version. It will also be assumed that each unlocked live record and each snapshot record will be tagged with a "record transaction sequence number" indicating the transaction that committed (C in FIG. 22) the version of the record. Moreover, it will be assumed that when a lock is placed on a live record X by a transaction Z, a snapshot copy of the record X is made, a copy of the record is written to a "before-image" log in non-volatile memory in order to facilitate the handling of possible aborts, and the locked record may be tagged with the TSN=Z, but if the transaction Z aborts (A in FIG. 22), the before-image copy from the before-image log will be copied back to the live record (which will restore the TSN of the live record to the TSN of the before-image) and the live record will be unlocked.

With these assumptions, it follows that when the read-only transaction TSN=Y is scheduled to begin, a list of the other transactions active at that time should be compiled and assigned to the transaction Y, as illustrated in FIG. 22. The desired version of the record X to be read by the read-only transaction Y is the live record X so long as the live record X has a transaction sequence number that is neither greater than Y nor in transaction Y's active list. Otherwise, the desired record will be found in the most recent snapshot of record X that has a transaction sequence number that is neither greater than Y nor in transaction Y's active list.

With the above assumptions, it follows that it is not necessary to keep any snapshot record having a snapshot transaction sequence number less than a certain "cutoff TSN." The "cutoff TSN" is the transaction sequence number of the earliest active transaction (i.e., the active transaction having the smallest transaction sequence number). Shown in FIG. 22, for example, is the cutoff TSN at the time that each of transactions 1 to 7 begins. For identifying snapshot records to be discarded, it is desirable to determine the cutoff-TSN and assign it to each transaction when each transaction is scheduled to begin. A transaction, for example, may seize the volatile memory space of a snapshot record for re-use whenever the snapshot TSN of the snapshot record is less than the cutoff TSN of the transaction. The snapshot TSN of the snapshot record is the transaction sequence number of the transaction that copied the committed version from the live record to the snapshot record. The snapshot TSN is different from the TSN of the transaction that committed the version of the snapshot. In short, the snapshot TSN is used for garbage collection, whereas the TSN of the transaction that committed the version of the snapshot is used for determining whether a read-only transaction may view the snapshot.

Figure 23:
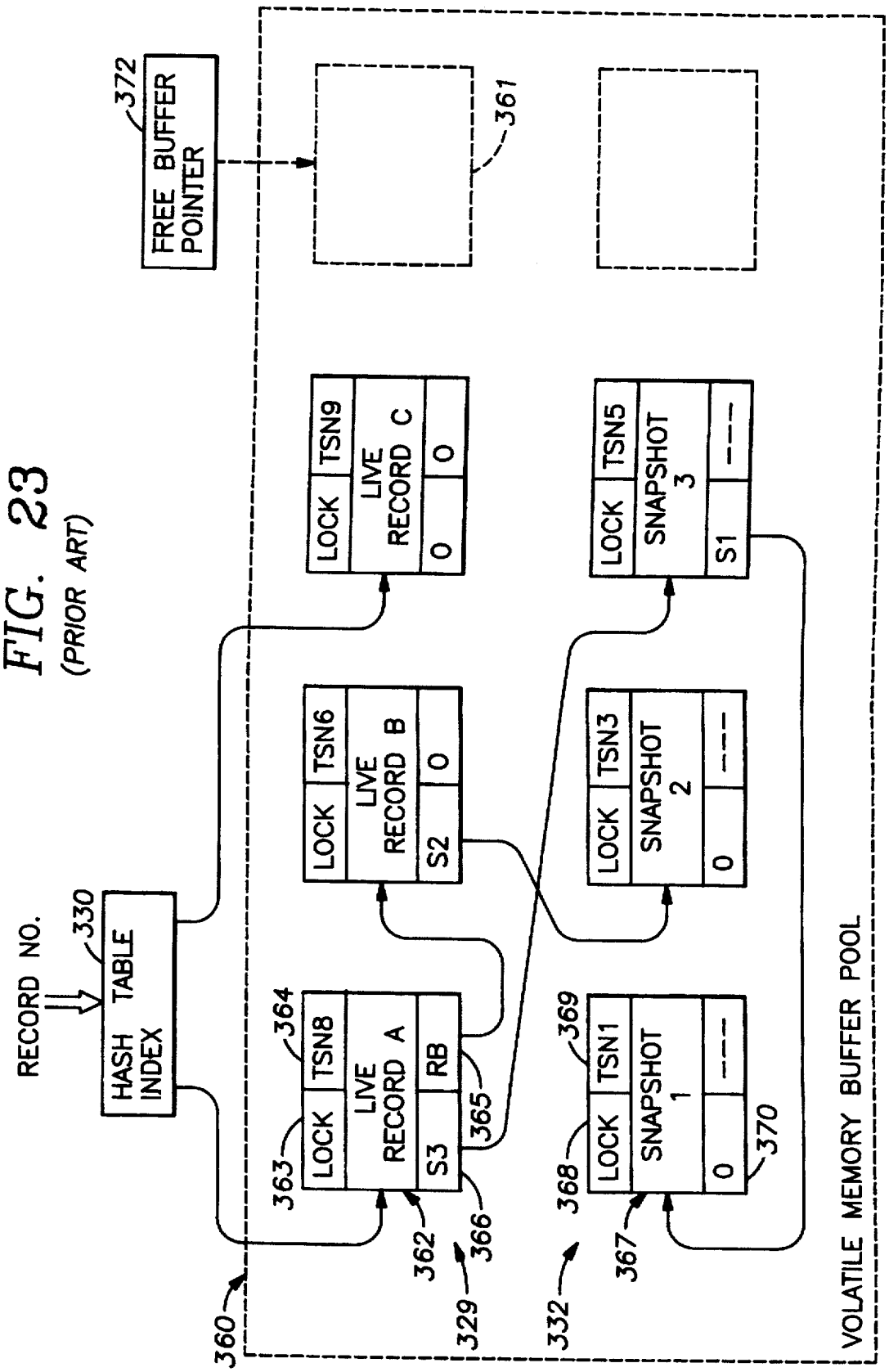
FIG. 23 is a diagram illustrating a data structure using pointers to link volatile state memory records and volatile snapshot records to a hash table to enable a specified record to be found in volatile memory.

Turning now to FIG. 23, there is shown a data structure used by the "Rdb/VMS" (Trademark) operating system for catching live records and snapshot records in a volatile memory buffer pool 360. Pointers are used to link volatile snapshot records to their corresponding live records.

Each live record (such as the live record 362) includes a header having a lock flag 363 and a record transaction sequence number 364, and a trailer having a pointer 365 which is zero or points to another live record in the volatile memory buffer pool, and a pointer 366 which is either zero or points to the most recent snapshot of the record. The format of the snapshot records (such as the snapshot record 367) is similar in that it has a lock 368, record transaction sequence number 369, and a pointer 370 which is either zero or points to an earlier snapshot of the record.

To update a specified record X, a hash index table 330 is indexed with the record number X to search for a live version of the record X in the state memory cache. The hash table index 330, however, does not index each and every live record 329 in the volatile memory buffer pool 360. In other words, the hash table index 330 is not indexed by the complete record number. Instead, the hash table index is indexed by only a least significant portion of the record number. For any given record number, indexing of the hash table index 330 in this fashion may return either zero, indicating that the desired live record is not in the state memory cache 329, or a pointer that may point to the desired record or may point to a list of live records including the desired live record. As shown in FIG. 23, when addressed with the record number "B", the hash table index returns a pointer to record A, which includes a record pointer RB to the desired record B.

When a read-only transaction desires to read a record, however, further searching may be required to find the proper version of the record. The live record is inspected first, and then the snapshot records are inspected in sequence beginning with the most recent snapshot, until a record is found having a record transaction sequence number that is neither greater than the transaction sequence number of the current transaction nor included in the active list for the current transaction. If a read-only transaction desires to read record B, for example, the transaction sequence number of the live record B (which is TSN6 in this case) is compared to the transaction sequence number of the read-only transaction. If the live record B is not a proper version, then the snapshot pointer (which is S2 in this case) of live record B is inspected to determine whether the volatile memory buffer pool (360 in FIG. 23) includes any snapshots of record B. If so, then the record transaction sequence numbers of the snapshots are inspected in the chain of snapshots, until a proper version of record B is found. If a proper version of the record B is not found, then the non-volatile memory (23 in FIG. 1) must be accessed to find the proper version of the record. In the example of FIG. 23, for example, snapshot 1 is an early snapshot of the live record A, and the snapshot 3 is a later snapshot of the live record A.

Figure 24A:
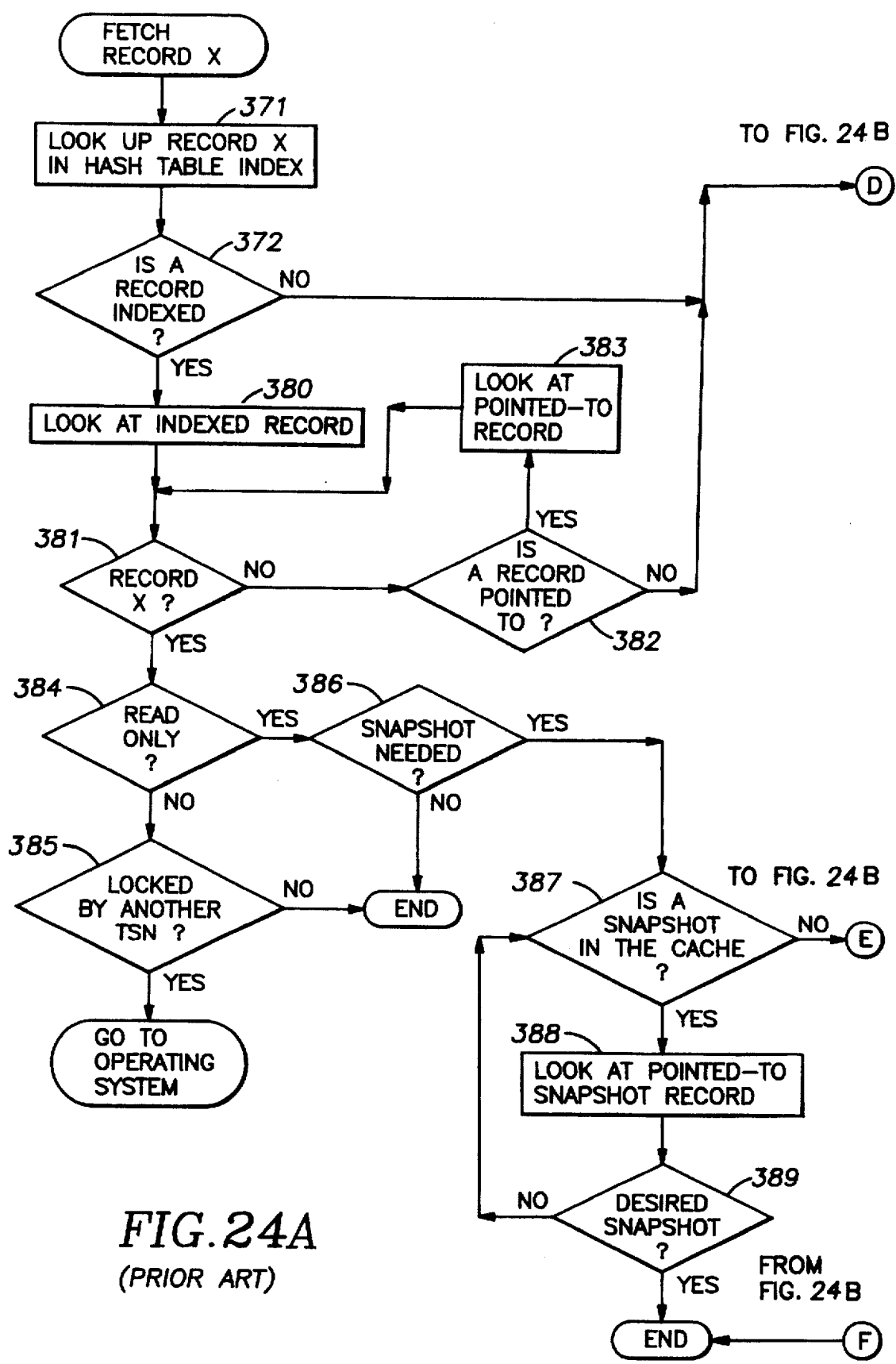
FIGS. 24A and 24B together comprise a flowchart of a procedure for fetching a desired record using the pointers of the data structure of FIG. 4.
Figure 24B:
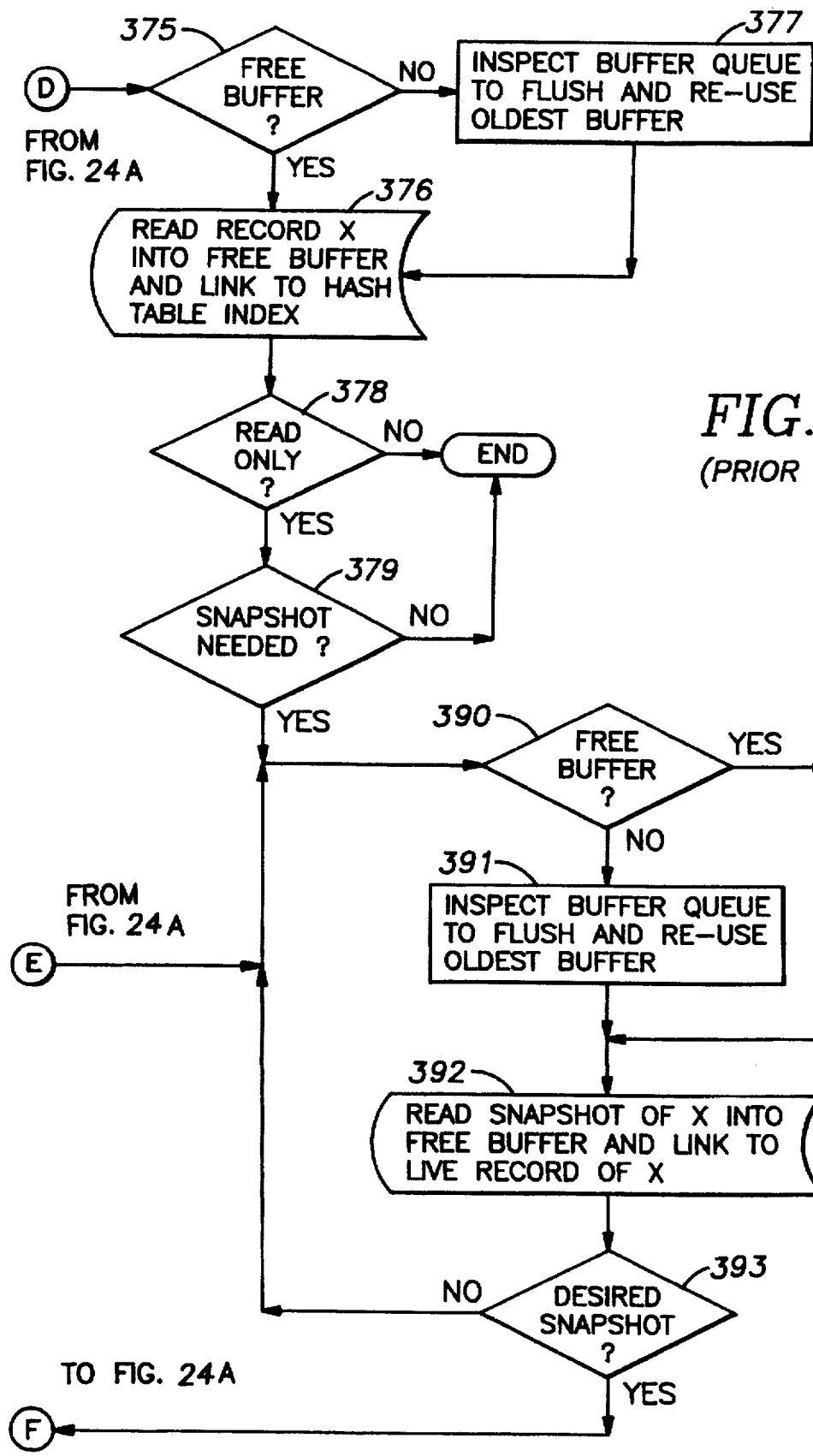

The process for fetching a desired record is illustrated in further detail in the flow chart of FIGS. 24A and 24B. In a first step 371, the hash table index (330 in FIG. 23) is indexed with a least significant portion of the record number. Then in step 372 the indexed entry in the hash table index is inspected to determine whether it is zero, or a pointer to a buffer in the volatile memory buffer pool (360 in FIG. 23). If the entry is zero, then the desired record is not indexed, and the desired record must be fetched from the non-volatile memory (23 in FIG. 1). Therefore, in step 375 of FIG. 24B, the value of a free buffer pointer (372 in FIG. 23) is compared to the limit of the volatile memory buffer pool (360 in FIG. 23) to determine whether there is a free buffer. If so, then in step 376, the desired record is read from the non-volatile memory (23 in FIG. 1) and written into the free buffer. Moreover, the free buffer is linked to the hash table index. Assuming that the record was not previously indexed, a pointer to the free buffer is placed in the hash table index. Otherwise, if the record was previously indexed, then the free buffer is linked to the chain of indexed records in the volatile memory buffer pool (360 in FIG. 23).

If a free buffer was not found in step 375, then in step 377 a list of buffers used by the current process (a buffer queue) is inspected to find the oldest buffer, which is flushed and reused in step 376.

In the prior-art "Rdb DBMS" and "VAX DBMS" (Trademark) systems, for example, a list of records read from non-volatile state memory is kept. When a live record is updated and a snapshot is made, the updated and snapshot records are marked in the list. When each transaction commits, the marked records are flushed to non-volatile memory and the list is cleared.

In step 378, the record read into the free buffer in step 376 is the desired record when the transaction fetching the record X is a "read-write" transaction. If the transaction is a "read only" transaction, however, then in step 379 the record transaction sequence number is inspected to determine whether the live record is a proper version for the read only transaction. A snapshot version is required, for example, if the transaction sequence number of the live record is greater than the transaction sequence number of the transaction, or if the transaction sequence number of the live record is found in the active list for the transaction. If a snapshot is needed, then the most recent snapshot must be fetched from non-volatile snapshot memory. In step 390 the value of the free buffer pointer (372 in FIG. 23) is compared to the limit of the volatile memory buffer pool (360 in FIG. 23) to determine whether there is a free buffer. If so, then in step 392, the most recent snapshot of record X is read from the non-volatile memory (23 in FIG. 1) and written into the free buffer. Moreover, the free buffer is linked to the hash table index (330 in FIG. 23) via the live record X. If a free buffer was not found in step 390, then in step 391 the buffer queue is inspected to find the oldest buffer, which is flushed and then reused in step 392.

In step 393, the snapshot read from non-volatile memory in step 392 is inspected to determine whether the snapshot is a proper version for the read-only transaction. If not, then execution loops back to step 390 to fetch the next most recent snapshot from the non-volatile snapshot memory, and the process iterates until a proper version is obtained for the "read-only" transaction.

If in step 372 of FIG. 24A it is found that the record is indexed in the hash table index, then in step 380 of FIG. 24A, the indexed record is inspected to decide in step 381 whether the indexed record is the desired record. If not, then in step 382 the record pointer area of the record is inspected to see whether the indexed record points to a record other than the desired record. If not, execution branches to step 375 of FIG. 24B to obtain the desired record from non-volatile memory. If the record pointer area includes a pointer to another record, then in step 383 the pointed-to record is inspected and execution loops back to step 381 to search through the entire chain of live records until either the end of the chain is found in step 382 or the desired record is found in step 381.

If the desired record is found in step 381, then in step 384 execution branches depending upon whether the record is needed for a read only operation. If not, then the record can be used so long as it is not locked by another transaction, as tested in step 385. If the record is locked by another transaction, then execution branches to the operating system. If the transaction is a local read-write transaction, then the current transaction is stalled, and execution is transferred to another transaction, such as the transaction having locked the record. If the transaction is a global read-write transaction, then the lock need not be respected when global commitment ordering is insured by selectively aborting transactions as described above with respect to FIGS. 9 and 10.

If step 384 determines that the transaction is a read only transaction, then in step 386 the live record is inspected to determine whether the live version of the record is a proper version. A snapshot version is required, for example, if the transaction sequence number of the live record is greater than the transaction sequence number of the transaction, or if the transaction sequence number of the live record is found in the active list for the transaction. If a snapshot is needed, then in step 387 the snapshot pointer is obtained from the snapshot pointer area of the live record, and the snapshot pointer is used to determine whether a snapshot record is in the snapshot memory cache. If not, then in steps 390 to 393 of FIG. 24B, the proper version of the record is read from non-volatile snapshot memory. Otherwise, when a snapshot record is pointed to, then in step 388 the pointed-to snapshot record is inspected to determine in step 389 whether it is a proper version of the record. If not, then execution branches back to step 387 until either the end of the chain of snapshots is reached and a proper version of the record is read from non-volatile memory in step 392 in FIG. 24B, or the proper version of the record is found in step 389.

Figure 25:
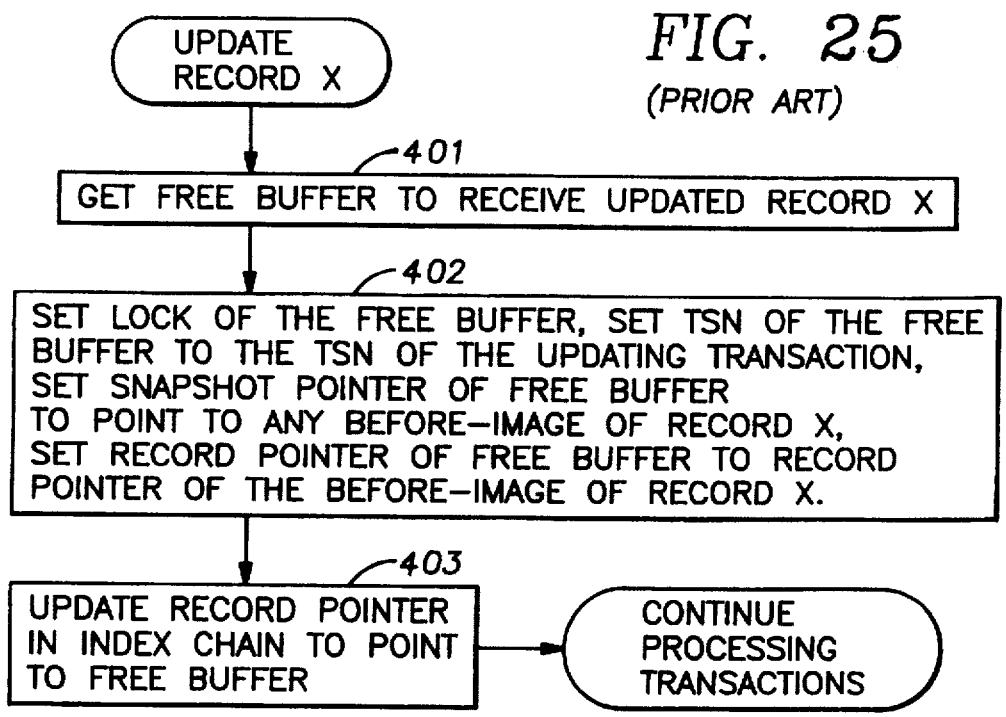
FIG. 25 is a flowchart of a procedure for creating snapshot records from state memory records when the state memory records are updated by a transaction.

Turning now to FIG. 25, there is shown a flow chart of a procedure for updating a record while maintaining the data structure shown in FIG. 23. In the first step 401, a free buffer is obtained to receive the updated record, in the fashion described above for steps 375 and 377 in FIG. 24B. Next in step 402 the lock of the free buffer is set, the transaction sequence number of the free buffer is set to the transaction sequence number of the updating transaction, the snapshot pointer of the free buffer is set to point to the before-image of the record X, and the record pointer of the free buffer is set to the record pointer of the before-image of the record X. Finally, in step 403, a record pointer pointing to the free buffer is inserted in the chain of records from the hash table index. The procedure of FIG. 25 is used by a read-write transaction, for example, after an attempt is made to fetch the record using the procedure of FIGS. 24A and 24B, and for a local read-write transaction, after finding in step 385 of FIG. 24A that the record X is not locked by another transaction sequence number. In this case, the record fetched by the procedure of FIG. 5 is the "before-image" of record X. In other words, in step 403, the pointer to the before-image of record X is changed to point to the updated record.

Figure 26:
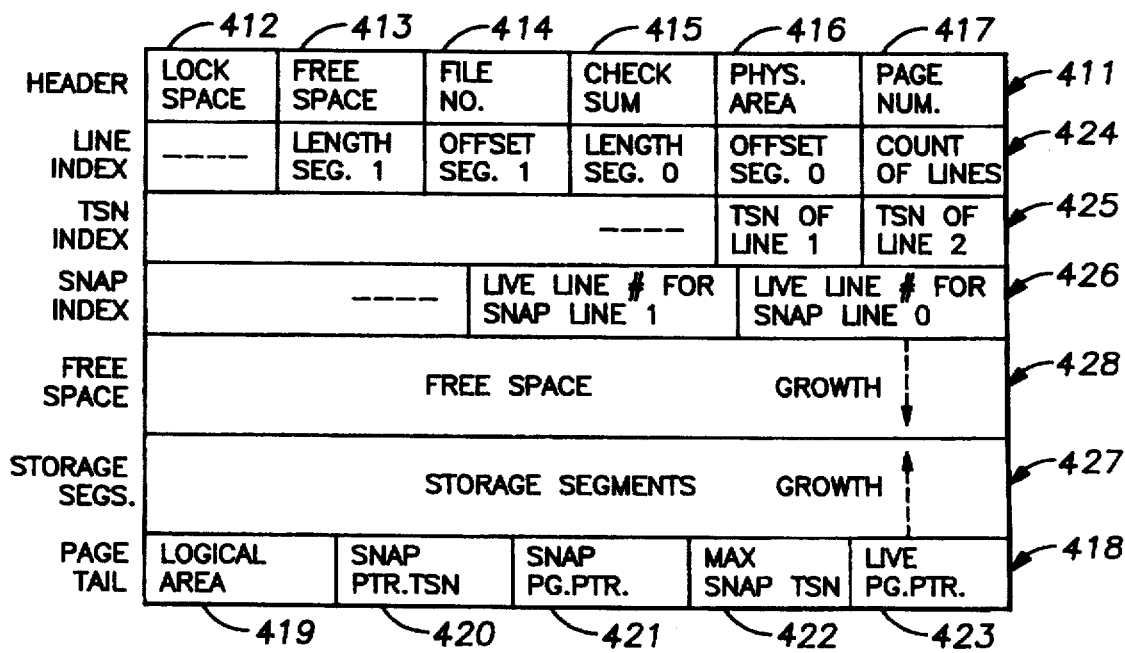
FIG. 26 is a diagram showing the preferred record organization as a page including variable-length segments.

In the example of FIG. 23, it is assumed that the records were of fixed size, and a record transaction sequence number was associated with each record. In the preferred embodiment, however, it is desirable to use an "Rdb/VMS" (Trademark) record organization as shown in FIG. 26 in which pages are chained together as shown in FIG. 23 but a page may include a number of variable length segments, each of which has an associated record transaction sequence number. This specific organization has the advantage that each snapshot page may include a number of different versions of the same segment. As shown in FIG. 26, a snapshot page 410 includes a standard page header 411 having lock space 412, free space 413, a file number 414, a check sum 415, a physical area 416, and a page number 417. When using the record format of FIG. 26, for example, a transaction addresses state memory by the combination of a file number and a page number. The page 410 also includes a trailer or page tail 418 having a logical area 419, a record transaction sequence number of a pointed to snapshot page 420, a snapshot page pointer 421, a maximum record transaction sequence number 422 of the writers to the snapshot page, and a live page pointer 423 pointing to the corresponding live page.

The snapshot page 410 further includes a line index 424 that is a directory to all storage segments on the page. It contains the offset from the top of the page and the length of each storage segment which is on the page. Next the snapshot page 410 includes a transaction sequence number index 425 that identifies the transaction sequence number of the transaction that originally created the version of the record that is now stored on the snapshot page. Moreover, the snapshot page 410 includes a snap index 426 that maps each snapshot line entry with a live page line number. The snap index permits several snapshot versions of one live record to be included on the same snapshot page. In practical terms, the use of the snapshot index assures that in the typical case, there will be one and only one snapshot page for each live page, although in some cases there will be two snapshot pages for each live page, and in less frequent cases more than two snapshot pages for each live page. The remainder of the snapshot page 410 includes storage segments 427 at the bottom of the page and free space 428 in the middle of the page for growth of the indices in a downward direction and a growth of the storage segments in an upward direction.

The snapshot pages 410 have a format similar to live pages. Preferably each snapshot page is stored in a snapshot file that is different from the file in which the corresponding live page is stored. Therefore, the hash table index in this case includes entries for the snapshot pages in the snapshot memory cache that are different from the hash table index entries for the live pages, and the concatenation of the file and page number corresponds to the record number used in FIG. 23 for indexing the hash table index 330. Moreover, when the page format of FIG. 26 is used, the updating of a record proceeds as shown in FIGS. 23A, 23B, and FIG. 24, although instead of using a free buffer to receive an updated page, it is somewhat more efficient to fetch a free buffer and copy the before-image page into the free buffer. The before-image of the page is then locked for updating, and the copy in the free buffer is used as a snapshot copy. In almost every case copying is required because in the usual case a transaction will not update all of the segments on a page.

As described As described above, with respect to FIG. 3, the computer 20 processes transactions using an "undo" recovery mechanism that provides very fast recovery because only the effects of failed transactions must be undone. A considerable amount of processing time, however, is spent flushing updated records to non-volatile state memory and updating the non-volatile snapshot memory when each transaction is committed. But in a stable environment where system crashes are very infrequent, fast recovery is not particularly important. For transactions that update the same records for multiple transactions, and transactions that are short and do not update many pages, a considerable fraction of the processing time is wasted by flushing the updated records to state memory at the end of every transaction.

In an alternative "redo" recovery mechanism, updated records are not flushed to state memory after every transaction. Instead, updated records are written sequentially to an after-image log, and all of the updated records are flushed to state memory only when certain "check-points" occur. The check-points occur, for example, after a specified number of transactions are committed, or after a predetermined number of bytes have been written to the after-image log since the last checkpoint. The "redo" recovery mechanism therefore allows updated, committed records to remain in volatile memory. When a system crash occurs, the volatile state memory existing at the end of the last committed transaction is reconstructed by reading from the non-volatile memory the state memory records existing at the time of the last check-point, and re-doing the modifications recorded in the after-image log. The after-image log, for example, is read sequentially while re-doing the modifications.

In the alternative redo recovery mechanism, snapshot records are stored in volatile memory along with volatile state memory records, and modifications to the volatile state memory records by the transactions are logged to an after-image log in non-volatile memory for recovery of the volatile state memory records. Updates to the volatile snapshot records as well as updates to the volatile state memory records are flushed to nonvolatile memory at the checkpoints. In addition, flushing of selected records is permitted between the checkpoints, without requiring a flush of all the updated records at that time. Moreover, updates to snapshots need not be logged to the after-image log. These advantages are achieved by flushing all of the updated snapshots of the selected record to non-volatile memory before the selected state memory record is flushed to non-volatile memory.

An additional advantage is that the conventional state memory and snapshot memory caching facility can be used for maintaining the state memory cache and snapshot memory cache, and a conventional after image journaling facility can be used for maintaining the after-image log. A specific embodiment using these conventional facilities with the digital computer 20 of FIG. 1 will now be described with reference to FIG. 27.

Figure 27:
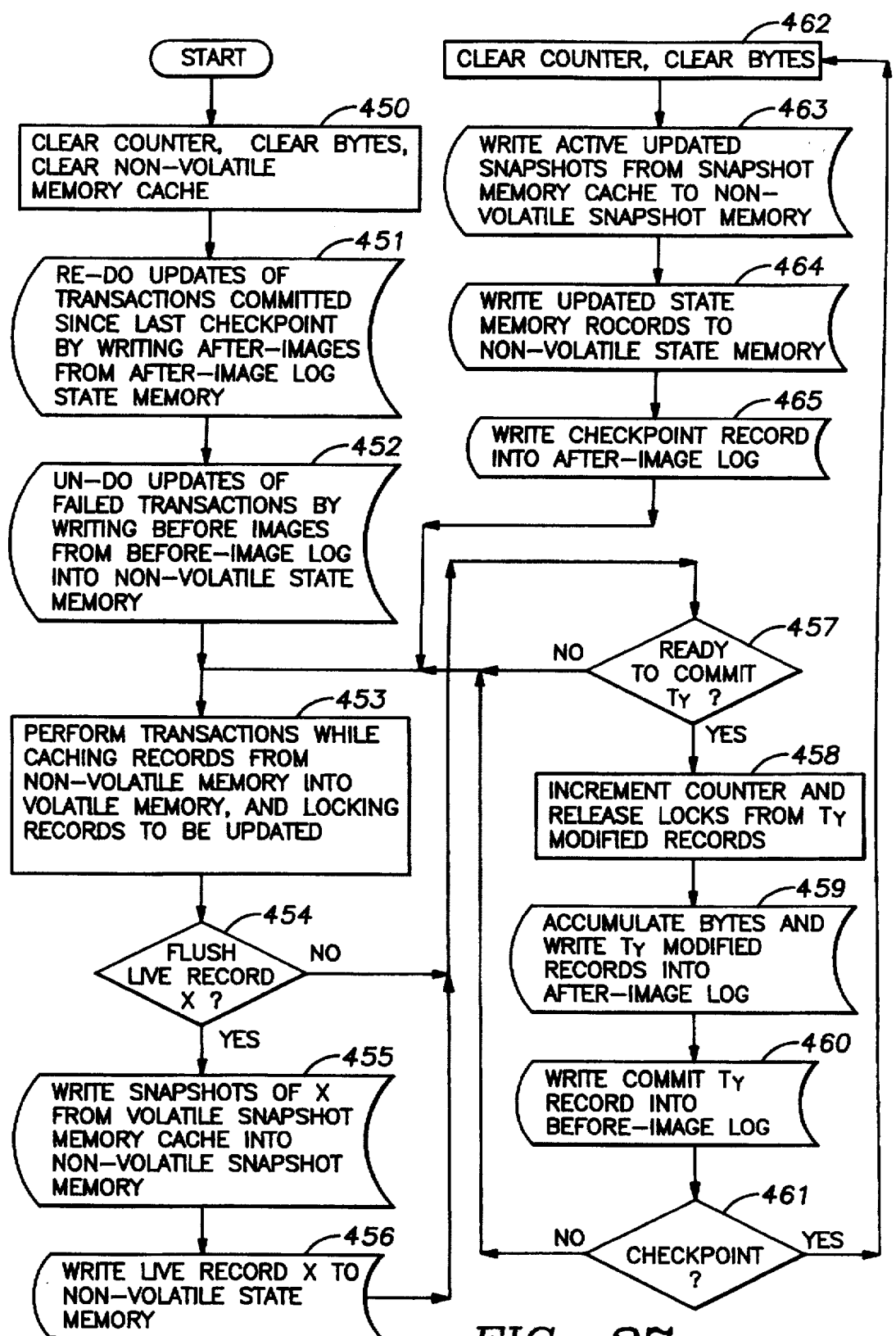
FIG. 27 is a flowchart of the preferred procedure for logging state information for ensuring recovery in a digital computer of a multi-version transaction processing system in accordance with the invention.

Turning now to FIG. 27, there is shown a flowchart illustrating the operation of the digital computer (20 in FIG. 1) in accordance with the alternative recovery mechanism. For recoverability, this procedure maintains back-up copies of records in both a "before image" log file in non-volatile memory, and an "after image" log file in non-volatile memory. The operation of the digital computer begins in step 450, for example, upon applying power to the computer after a power failure. In step 450 a counter (COUNTER) for counting transactions committed since the last checkpoint is cleared, a variable (BYTES) for accumulating the number of bytes logged to an after-image log file is cleared, and the volatile memory buffer pool (360 in FIG. 23) is cleared by clearing the hash table index (330 in FIG. 23).

Next in step 451 the after-image log is used to "roll forward" the state memory to include the updates in the after-image log following the last checkpoint. This could be done by scanning the after-image log in either a forward or reverse direction, although the conventional after-image journaling facility of the "Rdb/VMS" and "VAX DBMS" (Trademark) system scans the after-image log in a forward direction, beginning at the last checkpoint. A pointer to the last checkpoint, for example, is read from a header record of the after-image log, or preferably from a "root file" or system catalog in the non-volatile memory.

In step 452, the before-image log is scanned to un-do the effects of "failed" transactions by writing before images from the before-image log into the non-volatile memory. "Failed" transactions are transactions that had begun but had not yet committed at the time the failure interrupted the processing of the transactions. In step 452, the end of the before-image file is found, and while reading the before-image file in reverse chronological order, the before-images of the updated records are copied to the non-volatile memory.

It is possible to log the before images of a number of different transactions in the same before-image log file. In this case, for example, the before-images of the updated records are copied to the non-volatile state memory until a "commit" record is found. The commit record, for example, identifies a transaction that committed, and also includes an "active" list of transactions that were uncommitted at that time. This list is saved, and while continuing to read the before-image file in reverse chronological order, only the updates of the uncommitted transactions need be copied to the non-volatile state memory. Moreover, the beginning of a transaction could be logged in the before-image log by a "begin transaction" record. Upon reaching a "begin transaction" record in the before-image log, the transaction for which preparation began is removed from the "active" list, and when the "active" list becomes empty, step 452 is finished.

Preferably, however, a separate before-image file is allocated to each process in a multi-processing system, and the file for each process contains before-images for the currently active transaction of the process. After the transaction commits, its log of before-images is no longer needed, and the before-image log file is truncated for re-use by the next transaction of the process. No "commit record" is needed, because the before-image log file will be empty until the file is re-used by another transaction. This permits the recovery of a single process that fails in a multi-processing system. In this case, the entire before-image log file for the failed process is scanned backwards to recover and un-do the effects of a failed transaction for the failed process. To recover from all interrupted processes in the case of a power failure, the operating system maintains in non-volatile memory a list of active processes. Therefore, upon recovery from a power failure, this list of processes that were active is accessed to find the interrupted processes, and then the before-image log file of each interrupted process is scanned to un-do the effects of each failed transaction.

Processing of transactions is resumed in step 453 (under the control of the operating system) while caching records from non-volatile memory into volatile memory, and locking records to be updated, as described above with reference to steps 75 to 81 of FIG. 3 and with respect to FIGS. 24A, 24B and 25. Moreover, selected live records are flushed to non-volatile state memory between checkpoints at which all of the updated records are flushed to non-volatile memory. A selected live record is flushed to non-volatile state memory, for example, to provide a free buffer in the buffer pool, corresponding to steps 377 and 391 in FIG. 24B. A selected live memory record may also be flushed to non-volatile memory in order to insure data consistency in multi-processing or multi-processor systems when another process desires to access the selected record.

When a selected (unlocked) live record is to be flushed to state memory, as determined in step 454, then in step 456 the volatile live record is flushed to non-volatile state memory. This flush involves first flushing in step 455 all of the active snapshots of the live records from volatile snapshot memory to non-volatile snapshot memory before flushing the volatile live record to non-volatile state memory.

In step 457, execution branches to step 467 when a transaction Ty is ready to commit. In step 458, the transaction Ty is committed by incrementing the counter (COUNTER) and releasing the locks from its updated records, and then in step 459 by increasing the number of bytes (BYTES) by the number of bytes in its updated records and writing its updated records to the after-image log file. Next, in step 460, a "commit Ty" record is written to the before-image log for the case in which a single before image log file is used, or else for a preferred case in which a separate before-image log file is used for each process, the before-image log file for the process of the Ty transaction is truncated. Finally, in step 461, execution branches depending on whether a checkpoint is reached. For this purpose, the number of transactions committed in steps 458 to 460 since the last checkpoint (COUNTER) is compared to a predetermined limit value, and also the number of bytes (BYTES) logged in the after-image log file is also compared to a predetermined limit value. When neither of the limit values is exceeded, execution branches to step 453 to continue processing transactions; otherwise, execution branches to step 462 to begin a checkpoint flush in which the snapshot records are flushed before their respective live records are flushed.

In step 462, the counter (COUNTER) and byte accumulator (BYTES) are cleared. Then in step 463, the active snapshot records in the snapshot memory cache updated since the last checkpoint are written to non-volatile snapshot memory. (A snapshot record is active if its record transaction sequence number is greater or equal to the cutoff transaction sequence number of the current transaction.) Then in step 464, the updated state memory cache records are written to non-volatile state memory. Finally, in step 465, a checkpoint record is logged in the after-image log, and the location of the checkpoint record is also written in the header of the after-image log or into the "root file."

As described above, it was assumed that the log files were updated using atomic write operations. It should be noted that an atomic operation is needed for doing a write of the updates in cache memory at a checkpoint in step 463 in FIG. 27 only in a system where the after-image log includes the changes (such as segments) to only portions of the records that are written to cache memory in step 163. In this case only the changed portions, and not necessarily the unchanged portions, can be reconstructed in step 151, unless the reconstruction starts from uncorrupted copies of complete records. In any event, an atomic write is not required in steps 155 or 162 for flushing snapshot records to the non-volatile snapshot memory. For most computer systems, however, these considerations are inconsequential because for most computers individual records are always written atomically to non-volatile memory.

As described above, a transaction processing system: (1) insures the serializability of a local schedule of local read-write transactions by using write locks; (2) insures the serializability of a local schedule of local read-only transactions by a snapshot mechanism; and (3) insures the serializability of global transactions by enforcing a global commitment ordering. Because the snapshot mechanism prevents all conflict between the read-only transactions and the read-write transactions, the read-only transactions do not appear in the global transaction commitment order serializability graph (94 in FIG. 5A). Moreover, by simply designating that all read-write transactions are global, then the serializability of all read-write transactions is insured by commitment ordering without blocking. In this case, none of the read-write transactions need be affected by the locks placed on records being updated; these locks are then used only to prevent the read-only transactions from reading possibly updated records instead of snapshots.

It is also possible to insure the serializability of "global" read-only transactions by use of the snapshot mechanism. In this case, however, it is more difficult to identify the proper versions to be read in multiple digital computers in a multiprocessor system such as the system in FIG. 5B, because at any give time, the last committed versions might be inconsistent. This may occur whenever one of the digital computers 591, 592, 593 has signalled, via the atomic commit protocol, that it is ready to commit a global transaction, but it has not yet responded to a corresponding commit message for the transaction. In this situation, another one of the computers 591, 592, 593 may have responded to the corresponding commit message for the transaction. To obtain "update consistency" for a global read-write transaction, the dispatch of commitment commands to the multiple computers having the desired state information can be synchronized so that the last committed version of the state memory of the computers will be consistent at the time that the computers begin processing of the read-only transaction.

Figure 28:
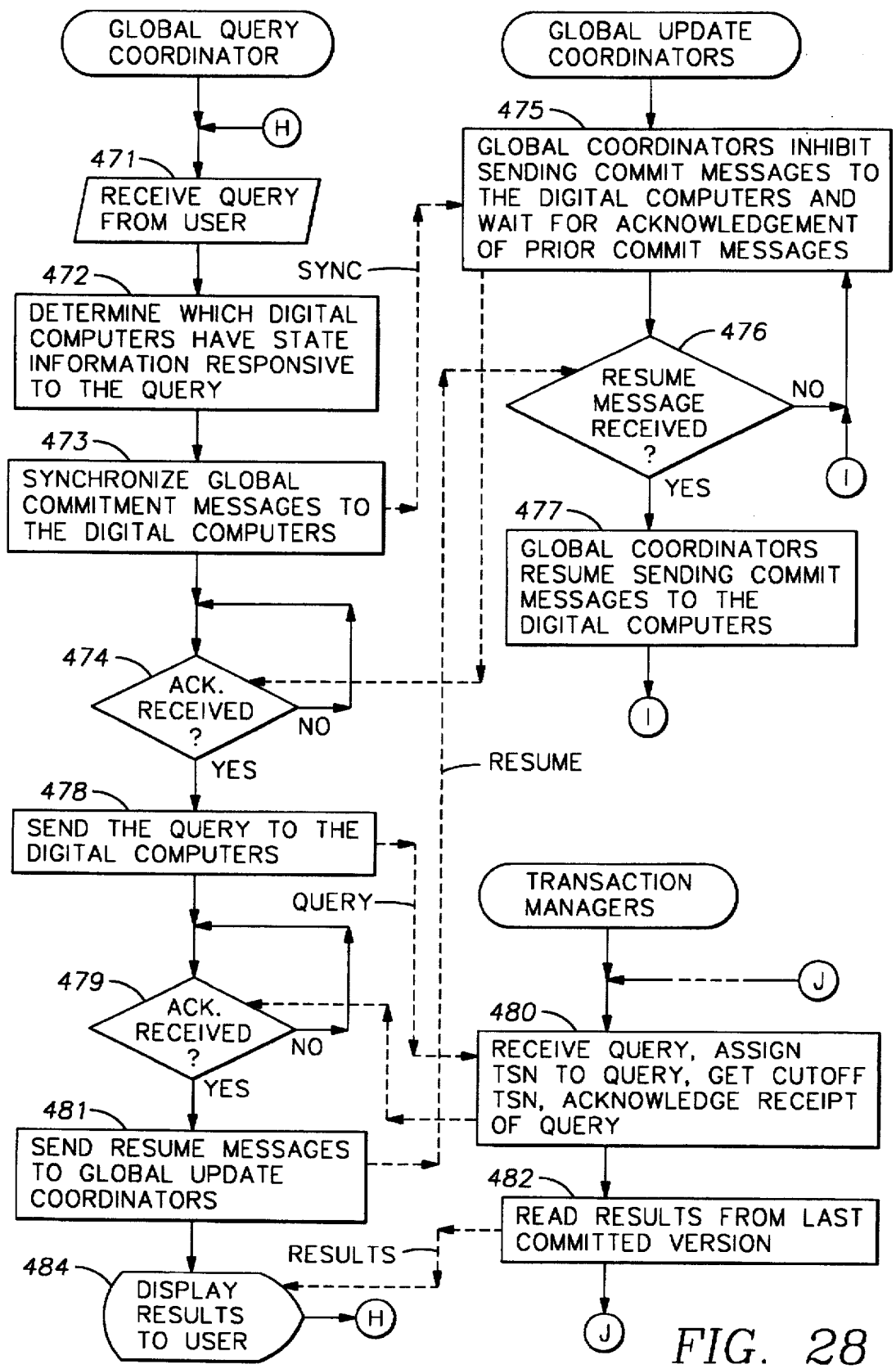
FIG. 28 is a flowchart illustrating a method of synchronizing the initiation of each global read-only transaction with commitment of any global read-write transactions that consistently update the resources to be read by the global read-only transaction, so that "update consistency" is achieved for the global read-only transaction.

Shown in FIG. 28, for example, is a flowchart followed by such a multi-processor system to obtain "update consistency" when responding to a query from a user. It is assumed that the query is processed as a global "read-only" transaction that references snapshot records as described above with reference to FIGS. 22, 23, 24A and 24B. In a first step 471, a global query coordinator receives a query from a user. The global query coordinator, for example, is one of the transaction managers (TM 595, 596, 597) in the multi-processor system of FIG. 5b. Alternatively, the global query coordinator is a dedicated processor that services a video display terminal (not shown). The user, for example, is the operator of the video display terminal (not shown), and the query is a request to display the contents of specified records, including records stored in the memory of different digital computers that are geographically distributed. In step 472, the global query coordinator determines which digital computers in the multi-processor system have state information responsive to the query. The query cannot merely be transmitted to all of these digital computers, because at any given time, the last committed versions of specified records might not be consistent, even though consistency is achieved "before" and "after" every read-write transaction that updates a set of databases including the databases to be read by the query.

The records, for example, may include an inventory of a particular component part at a number of manufacturing and warehouse locations, and each location may have a separate database of the parts on site. Then a temporary inconsistency may occur during the commit-phase of a read-write transaction representing a transfer of parts between the manufacturing and warehouse locations. During this commit phase, a record in the state memory of one digital computer is changed to indicate an increase in the number of parts on site, and a record in the state memory of another digital computer is changed to indicate a decrease in the number of parts on site. As a result of the read-write transaction, the total number of parts does not change. But unless the processing of the query at the various sites is somehow synchronized with the commit phase of the read-write transaction, it is possible that the query will read an inconsistent set of records and erroneously indicate a change in the number of parts. The query, for example, will read an inconsistent set of records if a set of records is read at one digital computer for a version existing prior to the read-write transaction, and a set of records is read at another digital computer for a version existing after the read-write transaction.

In step 473 of FIG. 28, the global query coordinator initiates the synchronization of global commitment messages to the digital computers that have state information responsive to the query. In FIG. 28, this is done by the global query coordinator sending a synchronization command to all of the global update coordinators in the system. A global update coordinator is a transaction manager or dedicated processor that may coordinate global read-write transactions. In the multi-processor system of FIG. 5B, for example, each of the transaction managers (TM 595, 596, 597) may coordinate global read-write transactions. In step 474 of FIG. 28, the global query coordinator waits for an acknowledgement of synchronization from each global update coordinator. In step 475, the global update coordinators inhibit sending any and all commit messages that are each directed to a set of digital computers that includes more than one of the digital computers that have state information responsive to the query, and wait for acknowledgement of any outstanding commit messages that were previously sent to the digital computers that have state information responsive to the query. Such commit messages are inhibited until, in step 474, the global update coordinators receive a "RESUME" message from the global query coordinator. Upon receipt of such a "RESUME" message, in step 477 the global coordinators resume sending commit messages to the digital computers.

Once the global update coordinators acknowledge that synchronization has been achieved, the global query coordinator continues in step 478. In step 478, the global query coordinator sends the query to the digital computers that have state information responsive to the query. The global query coordinator then waits in step 479 for acknowledgement that the digital computers have received the query. In step 480, for example, the transaction managers of the digital computers receive the query, assign a transaction sequence number to the query and determine the cutoff transaction sequence number for the query, and acknowledge receipt of the query. When the global query coordinator obtains acknowledgement from all of the digital computers that have state information responsive to the query, then in step 481 the global query coordinator sends RESUME messages to the global update coordinators. During this time the transaction managers process the query in step 482 by reading results from the last committed version, which is found using the transaction sequence number of the query and the "active list" for the query. The transaction managers transmit the results back to the global query coordinator so that in step 484 the global query coordinator displays the results to the user.

In a multi-processor or multi-processing system having more than one global query coordinator or having a single global query coordinator that processes a number of queries simultaneously, it is possible that "update consistency" will provide globally inconsistent results due to apparent conflicts between the results of the individual queries. In particular, it is natural for a user to assume that the order in which results are displayed corresponds to a history of the state of the system. Such a condition is known as "strict consistency." A query is said to see "strict consistency" if it is serializable with respect to all transactions, and it observes a serial order of update transactions which agrees with the order in which they committed. A somewhat more precise statement of the proper correctness requirement for the global serializability problem of a multi-version system is known as "one-copy serializability." The definition and implications of "one-copy serializability" are set out in Appendix II to the present specification. In either case, to remove all possible apparent inconsistencies for distributed queries, it is necessary to achieve a high degree of synchronization or serialization of queries and the committing of the results of read-write transactions. It is necessary for both read-write transactions and read-only transactions in a multi-version environment to obey a certain multi-version commitment ordering principle in which the order of transaction commitment corresponds to an order of conflicts among the transactions. It is also necessary that no committed version older than the last committed version is read by a read-write transaction. However, uncommitted versions may be read by a read-write transaction without any restriction. These principles and conditions are set out in detail in Appendix II to the present specification.

Figure 29:
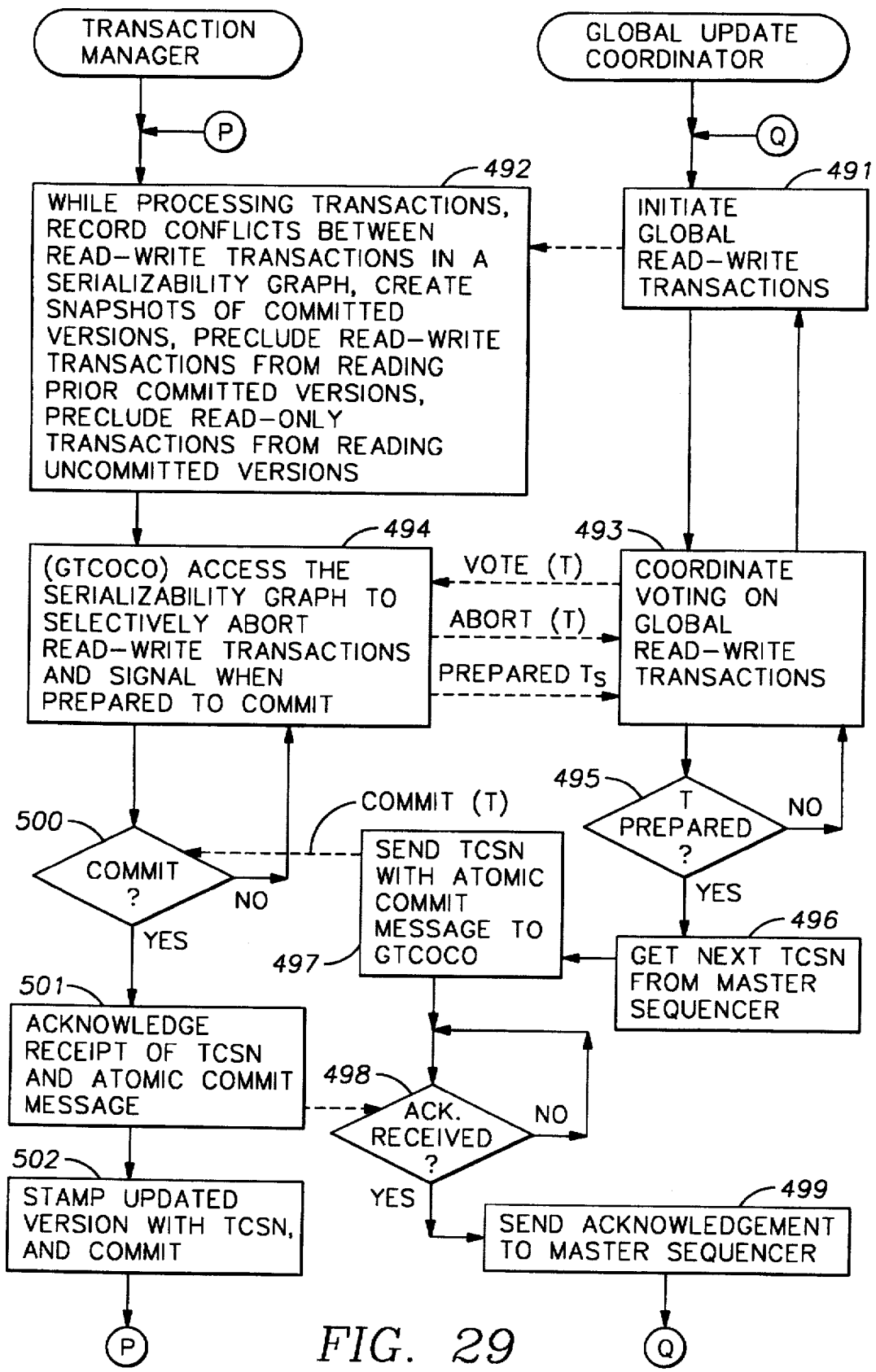
FIG. 29 is a flowchart illustrating a method of serializing global atomic commit messages in order to achieve "strict consistency" for global read-only transactions.
Figure 30:
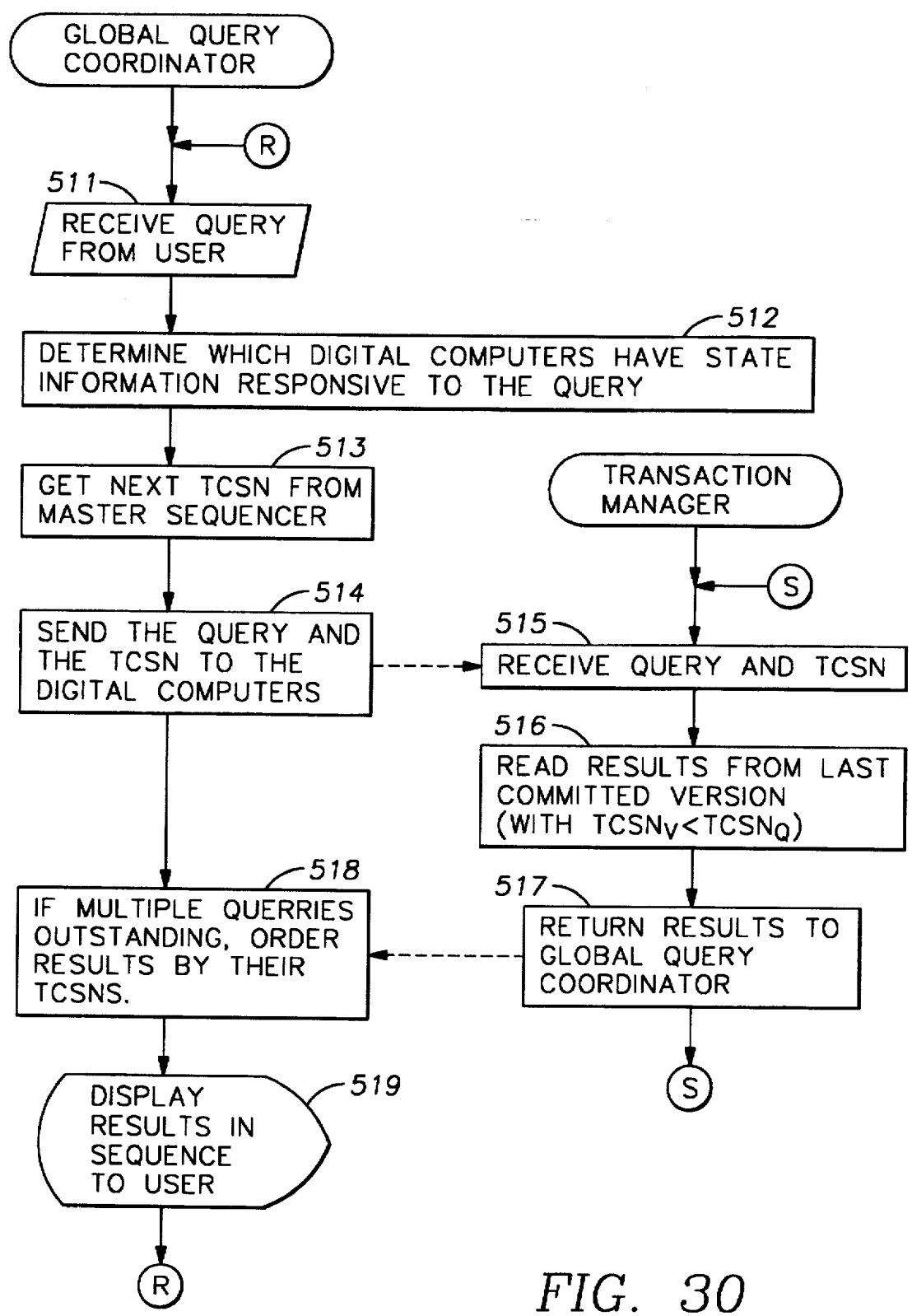
FIG. 30 is a flowchart illustrating a method of processing global read-only transactions to achieve "strict consistency" in a transaction processing system that serializes global atomic commitment messages in accordance with FIG. 29.

In general, the synchronization scheme shown in FIG. 28 is not preferred for achieving the system-wide synchronization needed for insuring "strict consistency" or "one-copy serializability." In a system having a fair percentage of read-only transactions, for example, the synchronization scheme in FIG. 28 unduly inhibits global update coordinators from sending commitment messages. A preferred scheme for achieving system-wide synchronization is shown in FIGS. 29 and 30. In addition to achieving "update consistency" by synchronizing read-write transactions with read-only transactions, the system shown in FIGS. 29 and 30 serializes the queries by assigning a transaction commitment sequence number (TCSN) to both read-write transactions and read-only transactions. By comparing the transaction commitment sequence numbers of various queries, for example, it is possible for a global query coordinator to easily display the results of multiple queries to a user in the order in which the queries were committed. Moreover, the proper versions to be read by each query is easily determined by comparing the transaction commitment sequence number of the query to transaction commitment sequence numbers of the read-only transactions that committed the various versions. Therefore the "commit time" of a query referencing snapshots is defined as a time just following the "last committed versions" that are read by the query. In particular, in a direct implementation of the method of FIGS. 29 and 30, when a read-write transaction commits a version, the committed version is "time-stamped" with the transaction commitment sequence number of the read-write transaction. The query reads the committed version having the youngest (e.g., largest) transaction commitment sequence number that is older (e.g., smaller) than the transaction commitment sequence number of the query. Snapshots can be garbage collected when they have a "snapshot TCSN" that is older (e.g., smaller) than the transaction sequence number of the oldest query being processed by the processor. The "snapshot TCSN" is the transaction commitment sequence number of the transaction that copied the committed version to the snapshot. The "snapshot TCSN" is different from the TCSN of the transaction that committed the version of the snapshot. In contrast, as described above with respect to FIG. 22 and as used in the "Rdb/VMS" (Trademark) system, the transaction sequence numbers (TSNs) are assigned to the transactions when the transactions are initiated, and therefore the TSNs do not indicate the transaction commitment sequence and cannot be used in the same fashion as the TCSNs. As described below with reference to FIGS. 31 to 33, however, it is possible to use a "commit history buffer" to determine, at each processor, the "active list" corresponding to the transaction commit sequence number of the query. Therefore, the "Rdb/VMS" (Trademark) snapshot mechanism of FIGS. 22 to 26 may be used in the procedure of FIGS. 29 and 30 without time-stamping the snapshot records with the transaction commitment sequence numbers of the read-write transactions having committed the versions of the snapshots.

Turning now to FIG. 29, in a first step 491, a global update coordinator initiates global read-write transactions, which are processed by various transaction managers. As shown in step 492, while processing transactions, the transaction manager records conflicts between read-write transactions in a serializability graph, as described above with respect to FIGS. 15 and 16. While processing transactions, the transaction manager also creates snapshots of committed versions, precludes read-write transactions from reading prior-committed versions, and precludes read-only transactions from reading uncommitted versions, as described above with reference to FIGS. 23, 24A–B, and 25.

In step 493 of FIG. 29, the global update coordinator coordinates voting on global read-write transactions, as described above with respect to FIGS. 12A and 12B. In response to a vote request from the global update coordinator, in step 494 the global transaction commitment order coordinator (GTCOCO) associated with the transaction manager accesses the global transaction commitment order serializability graph to selectively abort read-write transactions and signal when it is prepared to commit a sub-transaction of the global transaction. Once all of the sub-transactions are prepared for the global transaction, the global update coordinator determines in step 495 that the transaction is prepared. Then in step 496 the global update coordinator gets the next transaction commitment sequence number from a master sequencer. The master sequencer, for example, is one digital computer in the system that is assigned the task of generating a unique transaction commitment sequence number for each committed read-write transaction and for each query.

The transaction commitment numbers could be generated serially, for example, by incrementing a number each time that the master sequencer assigns a transaction commitment sequence number. Alternatively, the transaction commitment sequence number could be the real time, as determined by a real time clock, when the master sequencer receives a request for assigning a transaction commitment sequence number. It is only necessary that the transaction commitment sequence numbers indicate the order in which the transactions are committed. In this regard, a read-write transaction is considered committed during the "commit phase" of the atomic commitment protocol followed by each global update coordinator. The "commitment order" of a read-only transaction, however, is established when it is assigned a transaction commitment sequence number to determine a proper version of each resource to be read by the read-only transaction.

In step 497 of FIG. 29, the transaction commitment sequence number is sent with the atomic commit message to the global transaction commitment order coordinator (GTCOCO). The global update coordinator then waits in step 498 for an acknowledgement from the global transaction commitment order coordinator. When an acknowledgement is received, then in step 499 an acknowledgement is sent to the master sequencer. The acknowledgement could be used by the master sequencer to insure that the commitment order does not deviate from the sequence of issuance of the transaction commitment sequence numbers. For example, the master sequencer could wait until receiving an acknowledgement before issuing another transaction commitment sequence number.

In step 499 the global transaction commitment order coordinator recognizes the commit message and sequences to step 501. In step 501 the global transaction commitment order coordinator acknowledges receipt of the transaction commitment sequence number and the atomic commit message. In step 502, the updated version of the resources to be committed by the transaction are time-stamped with the transaction commitment sequence number, and committed.

Turning now to FIG. 30, there is shown a flow chart of the procedure followed by the global query coordinator and that uses the transaction commitment sequence numbers for serializing the queries. In step 511 the global query coordinator receives a query from the user. In step 512 the global query coordinator determines which digital computers have state information responsive to the query. Then, in step 513, the global query coordinator obtains a next transaction commitment sequence number from the master sequencer. Next, in step 514, the global query coordinator sends the query and the transaction commitment sequence number to the digital computers. In step 515, the transaction manager of each of the digital computers receives the query and its associated transaction commitment sequence number. In step 516 the query is processed by reading results from the last committed version prior to the query. The last committed version, for example, is identified as the version having the largest transaction commitment sequence number that is less than the transaction commitment sequence number assigned to the query. In step 517 the results are returned to the global query coordinator. In step 518, the global query coordinator orders the results by their transaction commitment sequence numbers, so that in step 518 the results are displayed to the user in the "commitment order" of the queries when the global query coordinator has multiple outstanding queries and receives results for the queries in a sequence different from the sequence of transactions commitment sequence numbers assigned to the queries. Therefore, there are no inconsistencies in the results of each query because query processing is synchronized to the commitment of global read-write transactions, and there are no apparent inconsistencies among the results of the queries because the results are displayed in the "commitment order" of the queries.

Figure 31:
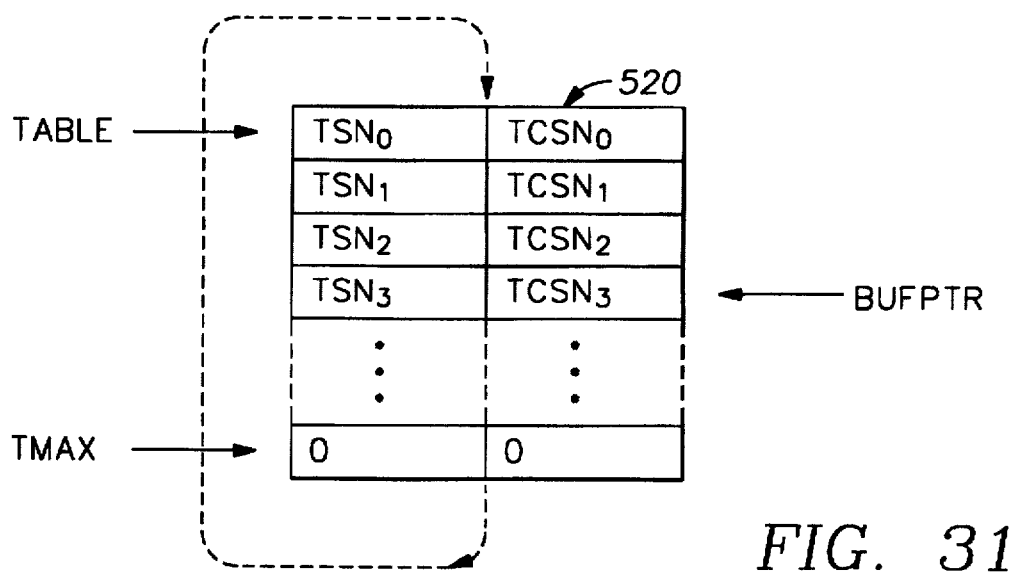
FIG. 31 is a block diagram of a "commit history buffer" that can be used to adjust a list of active transactions for a global read-only transaction in order to permit the procedure of FIG. 30 to use snapshot mechanism of FIGS. 22 to 26 without modification in a multi-processor system having significant skews in message transmission time between processors.
Figure 32:
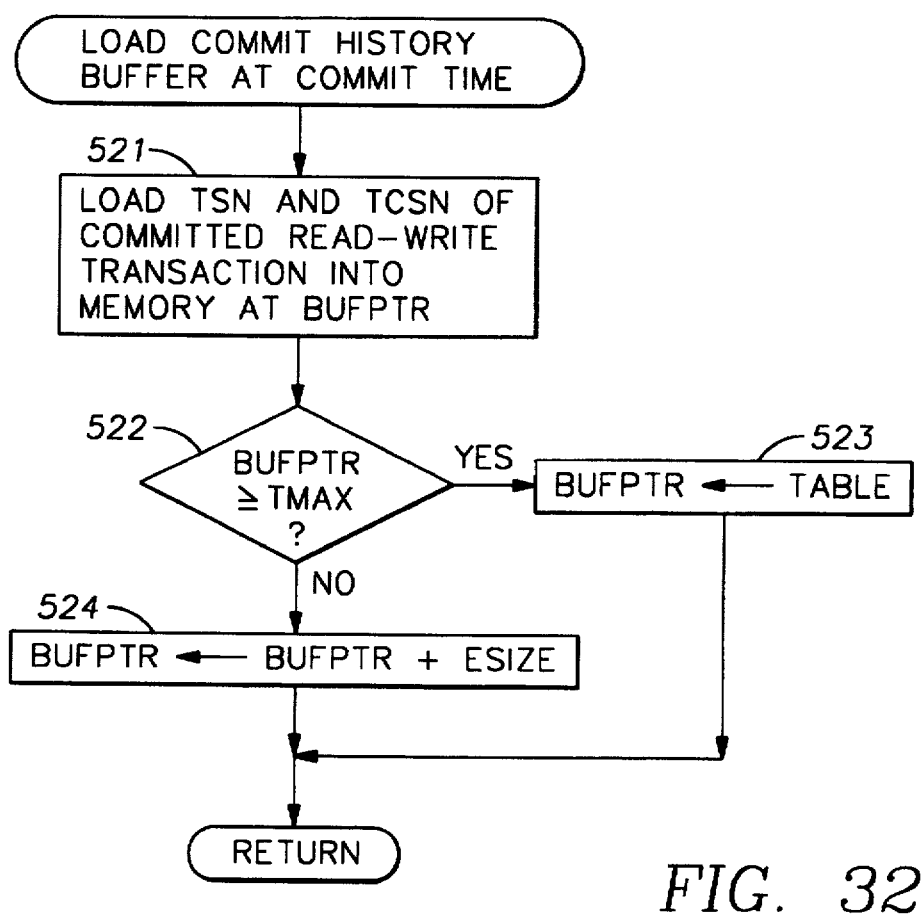
FIG. 32 is flowchart of a procedure for writing information into the commit history buffer of FIG. 31 when a read-write transaction is committed in the procedure of FIG. 29.
Figure 33:
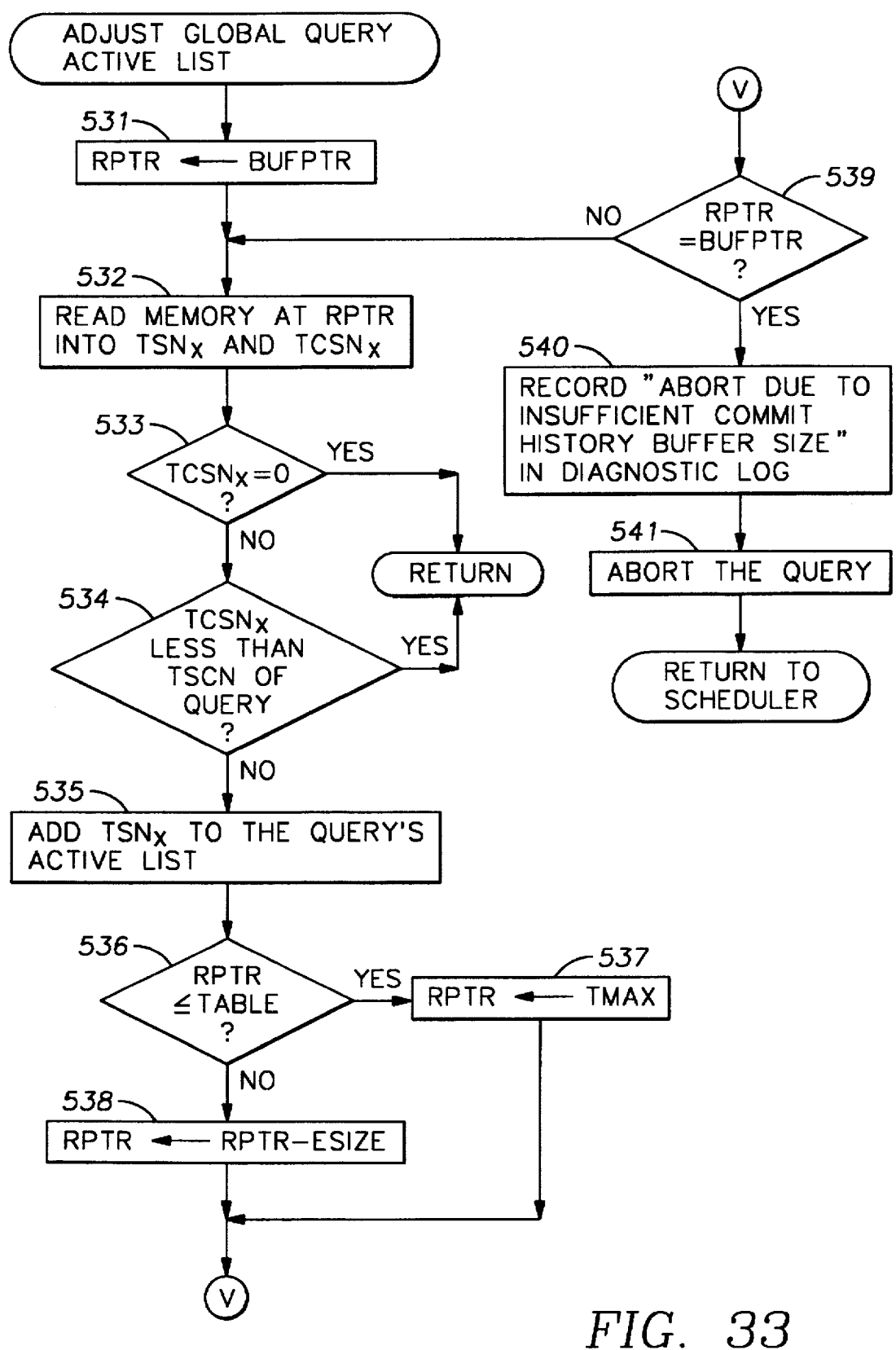
FIG. 33 is a flowchart of a procedure for reading the commit history buffer and adjusting a list of active transactions for a global read-only transaction when processing of a global read-only subtransaction is initiated in the procedure of FIG. 30.

Turning now to FIG. 31, there is shown a block diagram of a "commit history buffer" 512 that can be used to determine, at each processor, the proper "active list" corresponding to the transaction commit sequence number of the query. Therefore, the "Rdb/VMS" (Trademark) snapshot mechanism of FIGS. 22 to 26 may be used in the procedure of FIGS. 29 and 30 without time-stamping the snapshot records with the transaction commitment sequence numbers of the read-write transactions having committed the versions of the snapshots. In particular, during the commit phase in step 502 of FIG. 29, instead of time-stamping the updated version with the TCSN of the global read-write transaction, the subroutine of FIG. 32 is used to load the TSN and the TCSN of the transaction into the commit history buffer 520 of FIG. 31, and then the updated version is stamped with the TSN of the global read-write transaction. In step 515 of FIG. 30, the transaction manager assigns a TSN and an "active list" to the query when it is received from the global query coordinator. Then the subroutine of FIG. 33 is called to adjust the "active list" by reading the commitment history buffer 520 to add to the active list the TSN's of any recently committed transactions having TCSNs assigned between the time that the TCSN of the query was assigned and the time that the query was received and recognized by the transaction manager. Once the active list is adjusted, in step 516 the active list is used with the TSN of the query to read the results from the last committed version using the procedure of FIGS. 24A and 24B.

As shown in FIG. 31, the commit history buffer 520 is a table of entries in memory, and each entry includes a slot for a transaction sequence number (TSN) and a slot for a corresponding transaction commitment sequence number (TCSN). The table has a first entry with a minimum address, which is the address (TABLE) of the table. The table has a last entry with a maximum address (TMAX). Initially, at the start of transaction processing by the transaction manager, the table is flushed or cleared, for example, by setting each TCSN slot to zero, and a buffer pointer (BUFPTR) is set to the table address (TABLE). When read-write transactions are committed, the buffer is written to, in a circular fashion, by incrementing the buffer pointer, and resetting the buffer pointer when the buffer pointer reaches the end of the table.

Turning now to FIG. 32, there is shown a flowchart of the subroutine for writing the TSN and the TCSN of a read-write transaction into the commit history buffer. In a first step 521, the TSN and the TCSN are written into memory at the entry specified by the buffer pointer (BUFPTR). Then, in step 522, the buffer pointer is compared to the address (TMAX) of the last entry in the buffer table. When the buffer pointer is greater or equal to the address of the last entry in the buffer table, then in step 523 the buffer pointer is assigned the value of the table address (TABLE) so that the buffer pointer is reset to point to the first entry in the buffer table, and execution returns. Otherwise, in step 524, the buffer pointer is incremented by the size (ESIZE) of each entry in the table, so that the buffer pointer is advanced to point to the next entry in the buffer table.

Turning now to FIG. 33, there is shown a flowchart of a subroutine for adjusting the "active list" of a query by reading the commitment history buffer 520 and adding to the active list the TSN's of any recently committed transactions having TCSNs assigned between the time that the TCSN of the query was assigned and the time that the query was received and recognized by the transaction manager. In a first step 531, a read pointer (RPTR) is assigned the value of the buffer pointer (BUFPTR) of the commit history buffer (520 in FIG. 31). Next, in step 532 of FIG. 33, the memory including the buffer table is read at an address specified by the read pointer (RPTR) to obtain any transaction sequence number ($TSN_x$) and any transaction commitment sequence number ($TCSN_x$) in the entry pointed to by the read pointer.

In step 533, the value of $TCSN_x$ is compared to zero to determine whether a valid entry has been read. If the value of $TCSN_x$ is zero, then the entry is empty, and execution returns. Otherwise, in step 534, the value of $TCSN_x$ is compared to the TCSN of the query to determine whether the value of $TCSN_x$ is for a committed read-write transaction following the query in the commitment ordering specified by the transaction commitment sequence numbers. If not, then execution returns. Otherwise, in step 535, the corresponding value of $TSN_x$ is added to the "active list" for the query.

In steps 536 to 538, the read pointer (RPTR) is advanced to the next oldest entry in the history buffer. In particular, in step 536 the value of the read pointer (RPTR) is compared to the address (TABLE) of the first entry in the buffer table. If the value of the read pointer is less than or equal to the address of the first entry in the buffer table, then in step 537, the read pointer is assigned the address (TMAX) of the last entry in the buffer table. Otherwise, in step 538, the read pointer (RPTR) is decremented by the size (ESIZE) of each entry in the table buffer.

The required number of entries in the commit history buffer is determined by message transmission skew in the multi-processor system. The processors could be sufficiently close together such that a global query is always received and recognized by a transaction processor before commitment of any read-write transaction following the query in the commitment order specified by the transaction commitment sequence numbers. In such a system the commitment history buffer is not needed. Fortunately, the subroutine of FIG. 33 can easily detect when the commitment history buffer has an insufficient number of entries. In step 539, value of the read pointer (RPTR) is compared to the value of the buffer pointer (BUFPTR). If they are not equal, execution continues in step 532. Otherwise, when the read pointer is found to be equal the buffer pointer, the commitment history buffer has an insufficient number of entries. In step 540, an error message is recorded in a diagnostic log. Then in step 541, the query is aborted, for example by sending an error message to the global query coordinator having initiated the query, and returning execution to the scheduler of the transaction processor to continue processing of another transaction.

In accordance with a further aspect of the present invention, a read-write transaction may read the last committed version of state memory or any existing uncommitted version in the multi-version transaction processing system. The conflicts between the read-write transactions will depend upon the particular versions accessed by the transactions. In contrast, in a single-version system, once a first transaction places a "write lock" on a resource, a second transaction cannot read that resource until the write lock is released when the first transaction is finished using the resource. When the first transaction is finished using the resource, the resource becomes a new uncommitted version of the resource. Therefore, the single-version system may be said to follow a "read last version" strategy. Other strategies, however, are possible in a multi-version system for selecting the version of state memory to be read or updated by a read-write transaction. One simple but rather effective strategy is the "avoids cascading aborts" strategy. In a single version system that avoids cascading aborts, a transaction must respect the write locks, but not the read locks, of other transactions, and must not read the prepared results of uncommitted transactions that are ready to commit. In a multi-version system, however, all read-write transactions may simply read the last committed version, and thereby avoid all write locks. If another transaction, for example, has placed a write lock on a live record, then the last committed version of the record will be found in a "snapshot" or in non-volatile state memory.

In accordance with a more general embodiment, there may exist at any time multiple versions of state memory, including: committed versions, each associated with a single transaction; unlocked uncommitted versions, each associated with an ordered list of transactions following the last committed version; and write-locked versions being updated by a single transaction and each associated with an ordered list of transactions following the last committed version. There may also exit snapshots of prior committed versions, which can be accessed only by read-only transactions. The list of transactions associated with each uncommitted version corresponds to a possible commitment order that would occur if the associated version were committed. A transaction may select the last committed version of state memory or any unlocked uncommitted version having a transaction list excluding the transaction, and read the selected version or copy the selected version to create a write-locked version to be updated. The write-lock should be released as soon as the transaction has finished updating the locked version. In this more general embodiment, the conflicts occur between the various versions. In other words, in the serializability graph, the nodes may represent possible transaction commitment orders. Any "unlocked" or ready node following the last committed version may be selected for commitment.

Turning now to FIGS. 34–38, there are shown a set of possible serializability graphs for two conflicting transactions in a multi-version transaction processing system. Shown in FIG. 34, for example, is a case of mutual conflicts between a first transaction $T_1$ and a second transaction $T_2$, which both write to the same resource of the last committed version. In this case, there is a cycle in the serializability graph. Such a cycle is permitted in a multi-version system, but is precluded in a single-version system. In the multi-version system, each of the transactions $T_1$ and $T_2$ can create a new uncommitted version. The two uncommitted versions are mutually exclusive. When one of the transactions is committed, the other transaction must be aborted.

Figure 35:
FIG. 35 is a seriatizability graph for a case in which a first read-write transaction reads a resource in the last committed version and a second read-write transaction writes to the same resource in the last committed version.

Shown in FIG. 35 is a serializability graph for the case where transaction $T_1$ reads the last committed version of a resource, and the transaction $T_2$ writes to the last committed version of the same resource. In this case, if $T_2$ is committed, then transaction $T_1$ must be aborted. However, both $T_1$ and $T_2$ can be committed if transaction $T_1$ is committed before transaction $T_2$.

Figure 36:
FIG. 36 is a serializability graph for a case in which a first read-write transaction writes to a resource in the last committed version and a second read-write transaction reads the same resource in the last committed version.

Shown in FIG. 36 is a similar case, in which the transaction $T_1$ writes to the last committed version of a resource, and the transaction $T_2$ reads the last committed version of the same resource. In this case, if transaction $T_1$ is first selected to be committed, then transaction $T_2$ must be aborted. However, both transaction $T_1$ and $T_2$ can be committed if transaction $T_2$ is committed before transaction $T_2$.

Figure 34:
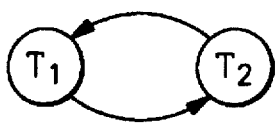
FIG. 34 is a serializability graph for a case in which both a first read-write transaction and a second read-write transaction write to the same resource in the last committed version in a multi-version transaction processing system.

The conflicts in each of the cases of FIGS. 34, 35, and 36 are indicated by single-line arrows. A single-line arrow will be used to represent any conflict (wr, rw, or ww) between two transaction instances that access the same version of the same resource not "written by" either of the transaction instances. When a transaction instance pointed to by the arrow is committed, the transaction instance from which the arrow originates must be aborted.

Figure 37:
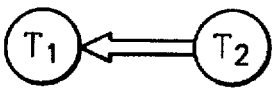
FIG. 37 is a serializability graph for a case in which a first read-write transaction reads or writes to a resource in an uncommitted but ready version written by a second read-write transaction.
Figure 38:
FIG. 38 is a serializability graph for a case in which a second read-write transaction reads or writes to a resource in an uncommitted but ready version written by a first read-write transaction.

Turning now to FIG. 37, there is shown a serializability graph for the case where the transaction $T_1$ reads or writes to an uncommitted but ready version of a resource written by transaction $T_2$. The conflict is indicated by a double line arrow, because it includes the "write-read" case considered with respect to FIG. 16, although it further includes a "write-write" case different from the "write-write" case of FIG. 34. In either case, the transaction $T_1$ must be committed after transaction $T_2$ is committed. Moreover, if transaction $T_2$ is aborted, then transaction $T_1$ must also be aborted. Similarly, as shown in FIG. 38, a transaction $T_2$ may read or write to an uncommitted but ready version of a resource written by transaction $T_1$. In this case, the transaction $T_2$ must be committed after transaction $T_1$ is committed. Moreover, if transaction $T_1$ is aborted, transaction $T_2$ must also be aborted.

The conflicts in both of the cases of FIGS. 37 and 38 are indicated by double-line arrows. A double-line arrow will be used to represent any conflict (rw or ww) between two transaction instances that access the same version of the same resource "written by" one of the transaction instances. When a transaction instance pointed to by the double-line arrow is committed, the transaction instance from which the arrow originates must have been previously committed. Moreover, when the transaction instance from which the double-line arrow originates is aborted, the transaction instance pointed to by the double arrow must be aborted, causing "cascading" aborts.

Figure 39:
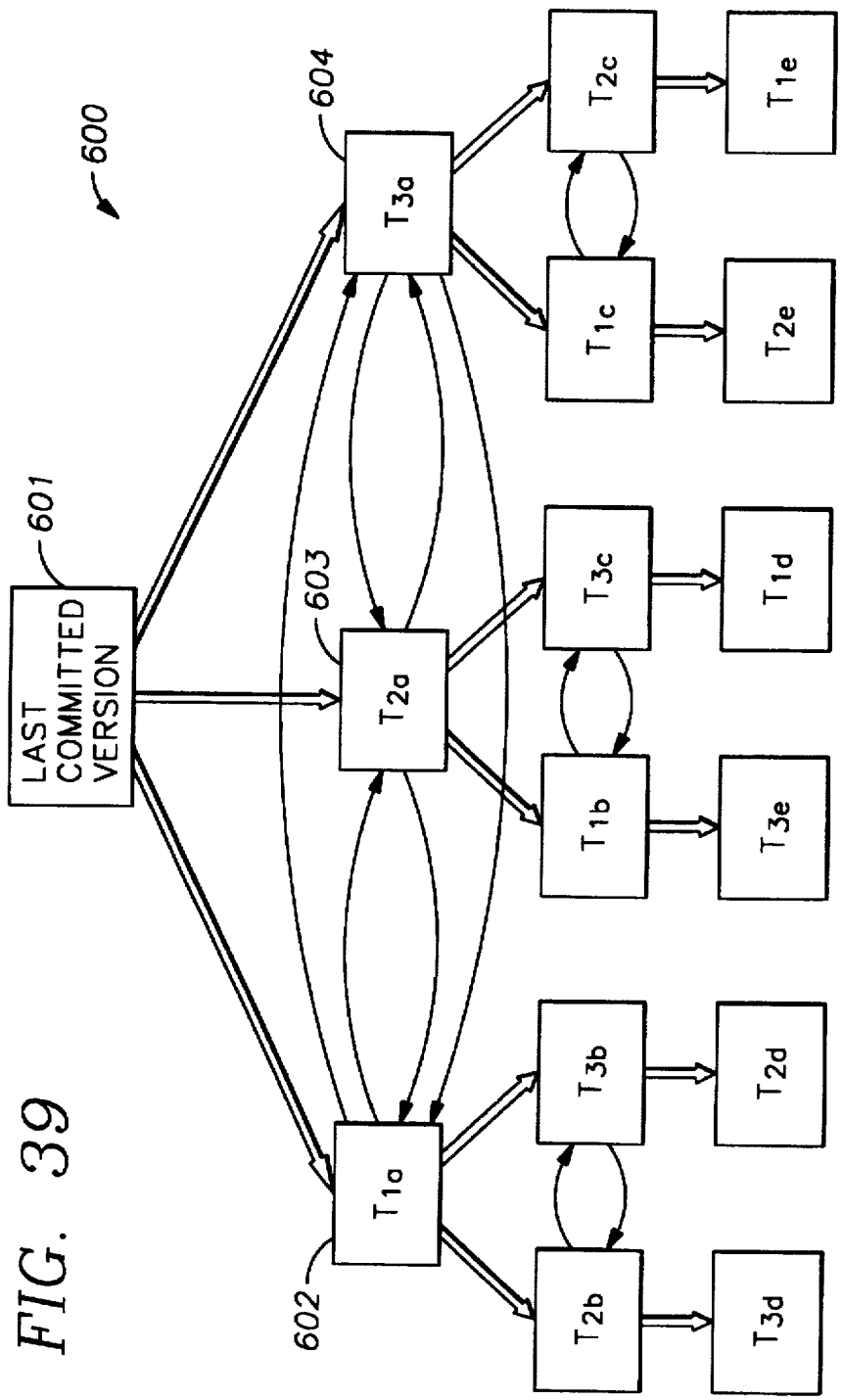
FIG. 39 is a serializability graph showing all possible instances of three mutually conflicting read-write transactions in a multi-version transaction processing system, and showing the hierarchical nature of the conflicts resulting when transactions read or write to resources in uncommitted but ready versions written by other transactions.

Turning now to FIG. 39, there is shown a version hierarchy or serializability graph 600 for a multi-version transaction processing system that permits plural instances of each transaction to be active at the same time. The conflicts indicated by the double-line arrows define a hierarchy or tree depending from a root 601 representing the last committed version. The version hierarchy of FIG. 39 represents all possible distinct instances of three different transactions $T_1$, $T_2$, and $T_3$ when no other transactions are active. Each non-root node in the version hierarchy is labeled to indicate a transaction and an additional alphabetic subscript indicating a particular instance of the transaction. The nodes 602, 603 and 604, for example, are the "children" of the root node 601.

The paths depending from the last committed version to the "leaf nodes" in the tree 600 represent possible commitment orders for the transactions. Each of these paths has at most one instance of each transaction. Moreover, to avoid redundant paths in the tree, the children of each node should have only one instance of each transaction. Therefore, as shown in FIG. 39, for the case of three different transactions, there are six possible paths, and fifteen different uncommitted versions. Moreover, the possible versions will be distinct so long as for each child instance of a transaction, the parent of the child instance conflicts with a sibling of the same transaction. For example, assuming that the version hierarchy of FIG. 39 is constructed in a top-down fashion beginning with the last committed version, then the detection of a conflict between instance $T_{1a}$ with transaction $T_{2a}$, such that $T_{2a}$ is in abort set of $T_{1a}$ (i.e., $T_{2a} \rightarrow T_{1a}$) results in the creation of the instance $T_{2b}$ as a child instance of $T_{1a}$. Therefore, if transaction $T_1$ is committed before transaction $T_2$, an active instance $T_{2a}$ of transaction $T_2$ will survive after $T_1$ is committed.

The version hierarchy in FIG. 39 suggests that the various conflicts between the transaction instances should be represented in different ways in the data structure for the version hierarchy. The mutual conflicts between plural instances of the same transaction can be implied and are therefore determined from lists of instances for each transaction. The "double line" conflicts, which cause cascading aborts and represent conflicts between two transactions, one of which access a resource "written by" the other of the two transactions, are encoded as the parent-child relationships in the hierarchy. As will be described further below with reference to FIG. 43, the parent-child relationships are also used when a transaction instance fetches a record. The other conflicts which occur when two transactions access the same version of the same resource not "written by" either of the transactions, which are indicated by the single lines in FIG. 39, are conveniently encoded as an abort list in the data structure for each transaction instance. Although these single line conflicts are shown in FIG. 39 only between sibling instances, they may also occur between transaction instances that are not related by direct descent, so that the transaction instances are related as cousins, aunts, uncles, nieces and nephews.

Certain inherited conflicts may exist between transaction instances but those inherited conflicts need not be checked for or represented in the version hierarchy 600. For example, a child instance may conflict with any other transaction instance that also conflicts with the child's parent instance such that the parent instance must be aborted when the other transaction instance is committed or aborted, but in either case, there is no need to detect or record such a conflict with the child instance, because the child instance will be aborted by reason of the parent-child relationship whenever the parent instance is aborted. Because there is no need to check for such inherited conflicts, any transaction instance that accesses a resource written by a ready but uncommitted predecessor of the transaction instance need not check for conflicts with any other transaction instance that has or may access any prior version of the resource.

Turning now to FIG. 40, there is shown a data structure 610 for representing each transaction instance in the version hierarchy of FIG. 39. The data structure 610 includes, for example, a transaction sequence number (TSN), a pointer to any next younger instance of the same transaction, a pointer to a parent instance, a pointer to a younger sibling, a pointer to an older sibling, and a pointer to a first child, a read-record list of records read by the transaction instance, a write-record list of records written to by the transaction instance, an abort list of transactions that must be aborted when the transaction instance is committed, and a ready flag indicating that the transaction instance is ready to be committed. The ready flag also serves as a kind of "write lock" upon records "written by" the transaction instance.

Turning now to FIG. 41, there is shown a format for a data record 620 in the multi-version transaction processing system. The data record includes a record identification number serving as a unique address of the data record. The record includes a pointer to a prior version of the record. The record includes a read transaction list of the transaction instances which read the record. The record also includes a write transaction list of transaction instances that copied the record for creating a new version of the record. Finally, the record includes the data having been last written to the record. The data structure for the record may include additional fields, for example, the transaction sequence number that committed the data in the record (i.e., the "record" TSN), and any transaction sequence number that did not commit but copied the data to the record (i.e., the "snapshot" TSN). These additional fields may be used in a snapshot mechanism, as was described above in connection with FIGS. 23–24B. The following discussion, however, will be limited to the processing of records by read-write transactions in a multi-version transaction processing system using the version hierarchy of FIG. 39 and the data structures as shown in FIG. 40 and 41.

Figure 42:
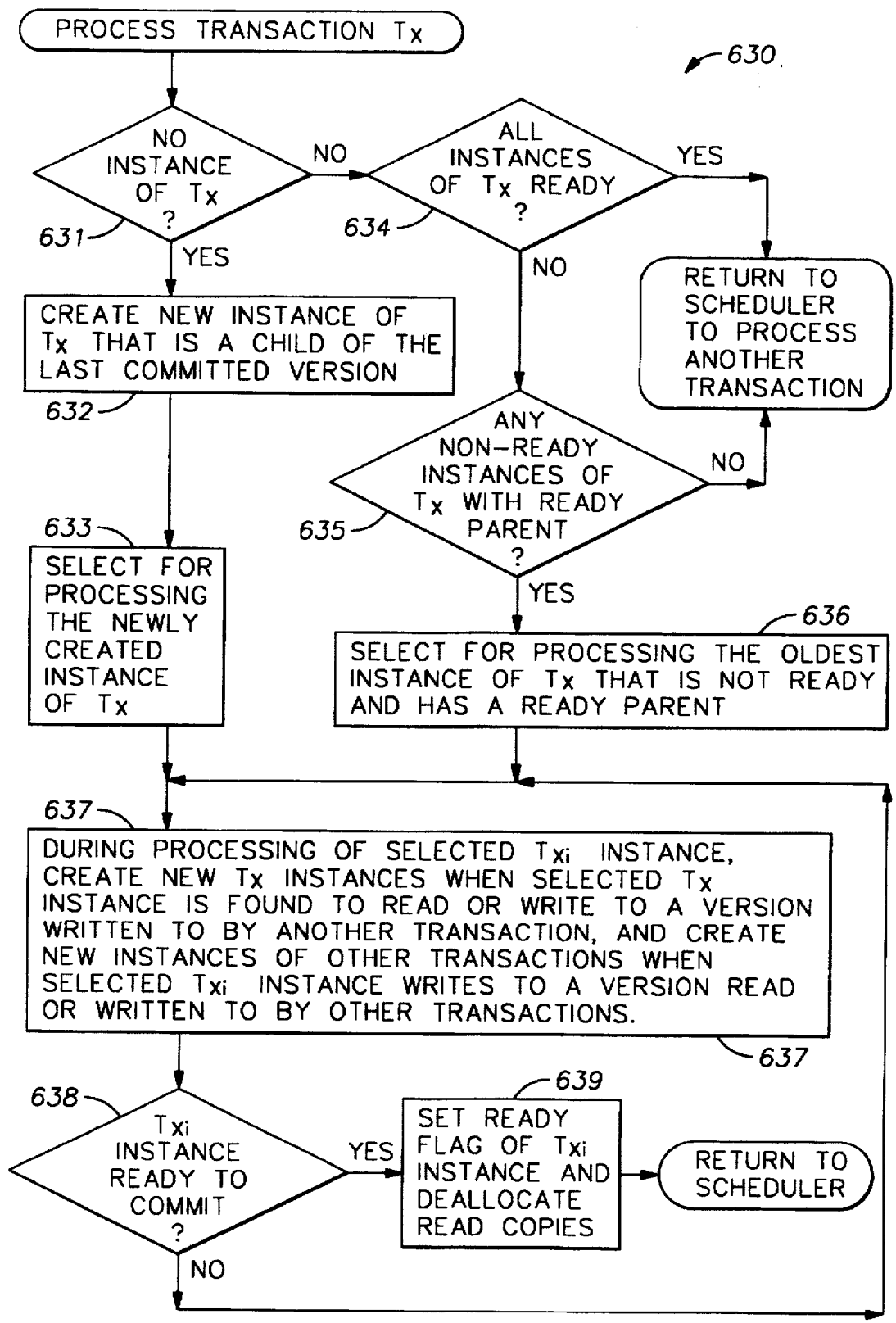
FIG. 42 is a flowchart of a procedure for processing a transaction by referencing the serializability graph of FIG. 39.

Turning now to FIG. 42, there is shown a flowchart for a procedure for processing a transaction in a multi-version transaction processing system using the version hierarchy of FIG. 39. The procedure 630 of FIG. 42, for example, is repetitively called by a transaction scheduler, and each time the procedure is called for a particular transaction selected for processing. In the first step 631 of FIG. 42, execution branches depending on whether there are any instances of the transaction in the version hierarchy. The transaction scheduler, for example, services a transaction queue of entries which include a transaction sequence number and a pointer to any first instance in the hierarchy. If this pointer has a value of zero, then there are no instances of the transaction in the version hierarchy. If the pointer is not zero, then it is an address of a data structure 610 as shown in FIG. 40 storing information for an instance of the transaction. With reference to FIG. 42, when there is not an instance of the transaction, then in step 632, a new instance of the transaction is created that is a child of the last committed version. The "last committed version" in the version hierarchy is represented in the transaction processing system by a memory location having a preassigned address. Initially, this preassigned address has a value of zero. Otherwise, this preassigned memory location stores a pointer to a transaction instance that is the first child of the last committed version. Therefore, step 632 is performed by obtaining a free buffer for the data structure 610 of FIG. 40, clearing this buffer, storing the transaction sequence number of the transaction being processed in the first entry of the buffer, and storing in this buffer, in the "pointer to parent" slot, the address of the memory location representing the "last committed version." In the next step 633, the newly committed version is selected for processing.

Returning to step 631, if there is already an instance of the transaction to be processed, then the list of instances for the transaction is scanned. Starting with the first instance indicated by a pointer in the transaction queue of the scheduler, the list of transaction instances is scanned to determine whether all of the instances are ready. In other words, if the ready flag of the first transaction instance is set, then the "pointer to next younger "TSN" instance is inspected to determine whether it is zero, and, if not, then the next younger transaction instance is inspected, until either a non-ready instance is found, or the pointer to the next younger instance is found to be zero. If all of the instances are ready, then execution returns to the scheduler. Otherwise, when a non-ready instance is found, as tested in step 635, the parent of the instance is checked to determine whether it is ready. If the parent is the "last committed version", then the parent is deemed to be ready. If there are no non-ready instances of the transaction with a ready parent, then execution returns to the scheduler to process another transaction. If there are non-ready instances of the transaction with a ready parent, then in step 636, the oldest instance of the transaction that is not ready and has a ready parent is selected for processing.

Steps 634, 635, and 636 are easily performed by traversing the list of instances of the transaction defined by the "pointer to next younger TSN instance" in the data structure 610 for each transaction instance. Therefore, the oldest instance that is not ready and has a ready parent is selected as soon as an instance is found that does not have its ready flag set and that has a ready parent. If the entire list of instances of the transaction is scanned and the end of the list is found by finding that the "pointer to next younger TSN instance" is zero, then execution returns to the scheduler to process another transaction.

The processing of the selected instance of the transaction is begun in step 637. During processing of the selected transaction instance, new instances of the transaction are created when the selected instance is found to read or write to a version of a record "written-to" by another transaction instance. (The "written-to" conflict is represented by a single-line conflict arrow pointing from the selected instance to the other transaction. The "written to" conflict is different from a "written-by" conflict in which the selected instance is found to read or write to a version of a record "written by" the other transaction. The "written-by" conflict would be represented by a double arrow pointing from the other transaction.) New instances of other transactions are also created when the selected transaction instance writes to a version that is read or "written-to" by other transactions. Such creation of new transaction instances is described further below with reference to FIG. 44.

Processing of the selected transaction continues until it is either interrupted by the scheduler, or until the selected transaction instance is ready to commit, as detected in step 638. When the transaction instance is ready to commit, then in step 639, the ready flag of the transaction instance is set. Also in step 639, the record copies listed in the read list of the transaction instance are de-allocated so that they are returned to the buffer pool and available for use by other transactions. After step 639, execution returns to the scheduler.

Figure 43:
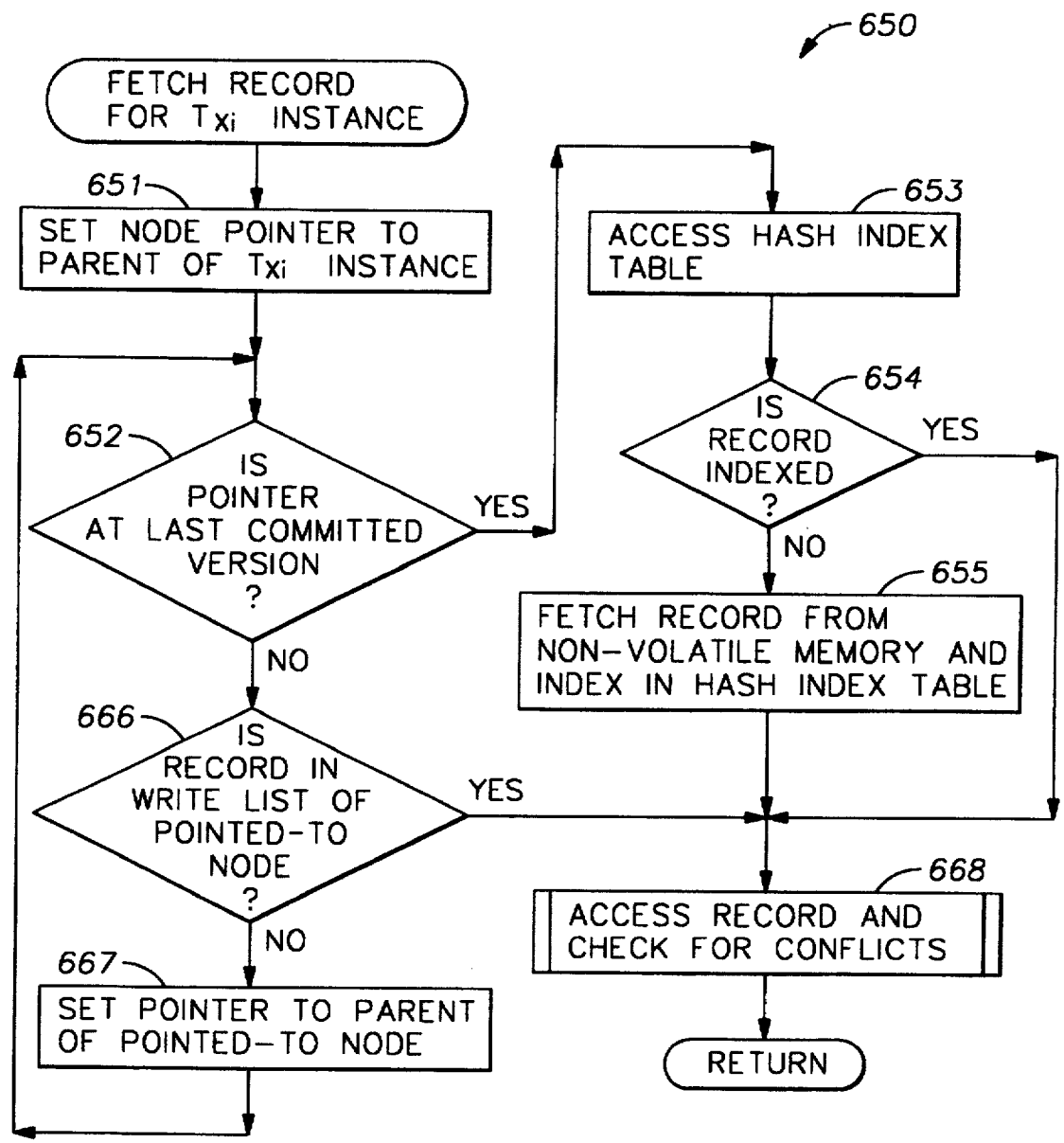
FIG. 43 is a flowchart of a procedure for fetching a record by referencing the serializability graph of FIG. 39.

Turning now to FIG. 43, there is shown a flowchart of a procedure 650 that is used during processing of a transaction instance for fetching a record accessed by the transaction instance. It is assumed that this procedure 650 is used only when a transaction first needs to access a record. If the programming language for the transaction does not require the programmer to specify when records are first fetched, then the write list and then the read list of the transaction instance should first be searched so that the procedure 650 is used only once for fetching each record accessed by each transaction instance. In the first step 651, a node pointer is set to the parent of the transaction instance. In step 652, execution branches if the node pointer is pointing to the last committed version. If so, then in step 653, the hash index table (330 in FIG. 23) is accessed. If the desired record is indexed in the table, then the record is accessed from volatile memory. Otherwise, in step 655, the record is fetched from non-volatile memory and indexed in the hash index table.

If in step 652 the node pointer was not pointing to the last committed version, then it is possible that the desired record is an uncommitted version. In step 666, the write list of the pointed-to node is searched, and if the desired record is in the write list, the desired record is the uncommitted version of the parent. Otherwise, in step 667, the node pointer is set to point to the parent of the pointed-to node, and execution branches back to step 652. In other words, record access searches up through the version hierarchy of FIG. 39 until either the desired record is found in the write list of a predecessor transaction instance, or until the desired record is found to be in the last committed version.

Once the desired record is found, it is accessed in step 668 and conflicts are checked during record access. Execution then returns.

Figure 44:
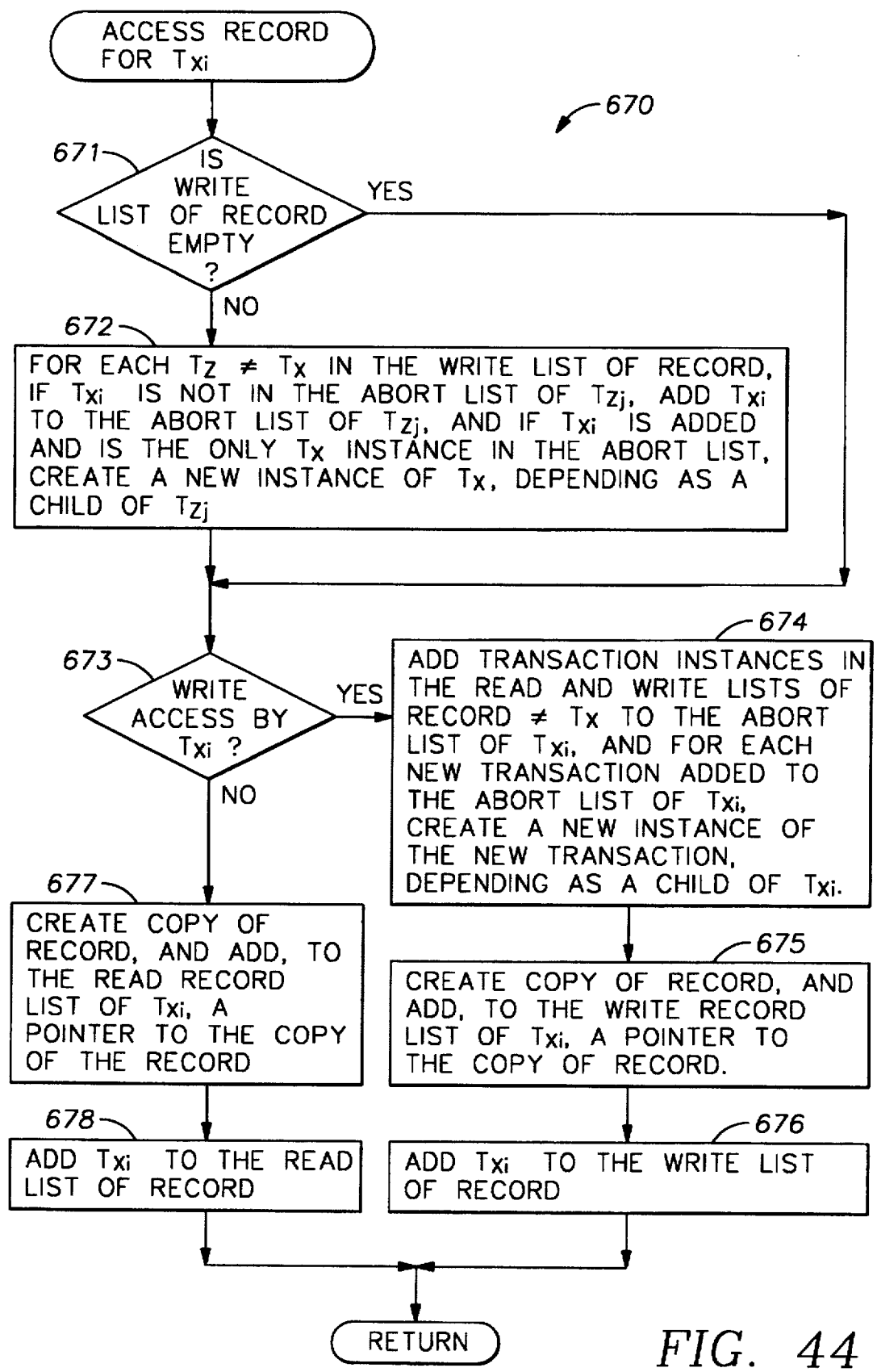
FIG. 44 is a flowchart of a procedure for checking for conflicts and adding new transaction instances to the serializability graph of FIG. 39 when accessing a record.

Turning now to FIG. 44, there is shown a flowchart of a procedure 670 that is used in step 668 of FIG. 43 for accessing the selected record and checking for conflicts. In the first step 671 of FIG. 44, execution branches if the write list of the record is empty. If not, then there is a possible conflict between the current transaction and another transaction. The present transaction instance conflicts with each transaction instance in the write list of the record that is different from the current transaction instance. If the current transaction is not in the abort list of the transaction in the write list of the record, then the current transaction is added to the abort list of the transaction instance in the write list. Moreover, if the current transaction instance is added and it is the only instance of the current transaction in the abort list, then a new instance of the current transaction is created in the version hierarchy depending as a child of the conflicting transaction instance. This new instance of the current transaction is added to the version hierarchy to permit further processing of the current transaction in case the conflicting transaction instance is committed, causing the current instance of the present transaction to be aborted.

In the next step 673, execution branches depending on whether the current transaction instance is performing a write access of the desired record. If so, then the present transaction conflicts with any other transaction that accesses desired record. In step 674, each transaction instance in the read list and the write list of the desired record of a transaction different from the current transaction is added to the abort list of the present instance of the current transaction, and for each new transaction added to the abort list of the present instance of the current transaction, a new instance of the new transaction is created, depending as a child of the instance of the present transaction. Then, in step 675, a copy of the desired record is created for use by the present instance of the current transaction, and a pointer to this copy of the desired record is added to the present instance of the current transaction. Then, in step 676, the present instance of the current transaction is added to the write list of the accessed record (not the copy), and execution returns.

If, in step 673, it was found that the present instance of the current transaction is performing a read access, then in step 677, a copy of the record is created for use by the present instance of the current transaction. Moreover, a pointer to the copy of the record is added to the read record list of the present instance of the current transaction. Then, in step 678, the present instance of the current transaction is added to the read list of the accessed record (not the copy), and execution returns.

Figure 45:
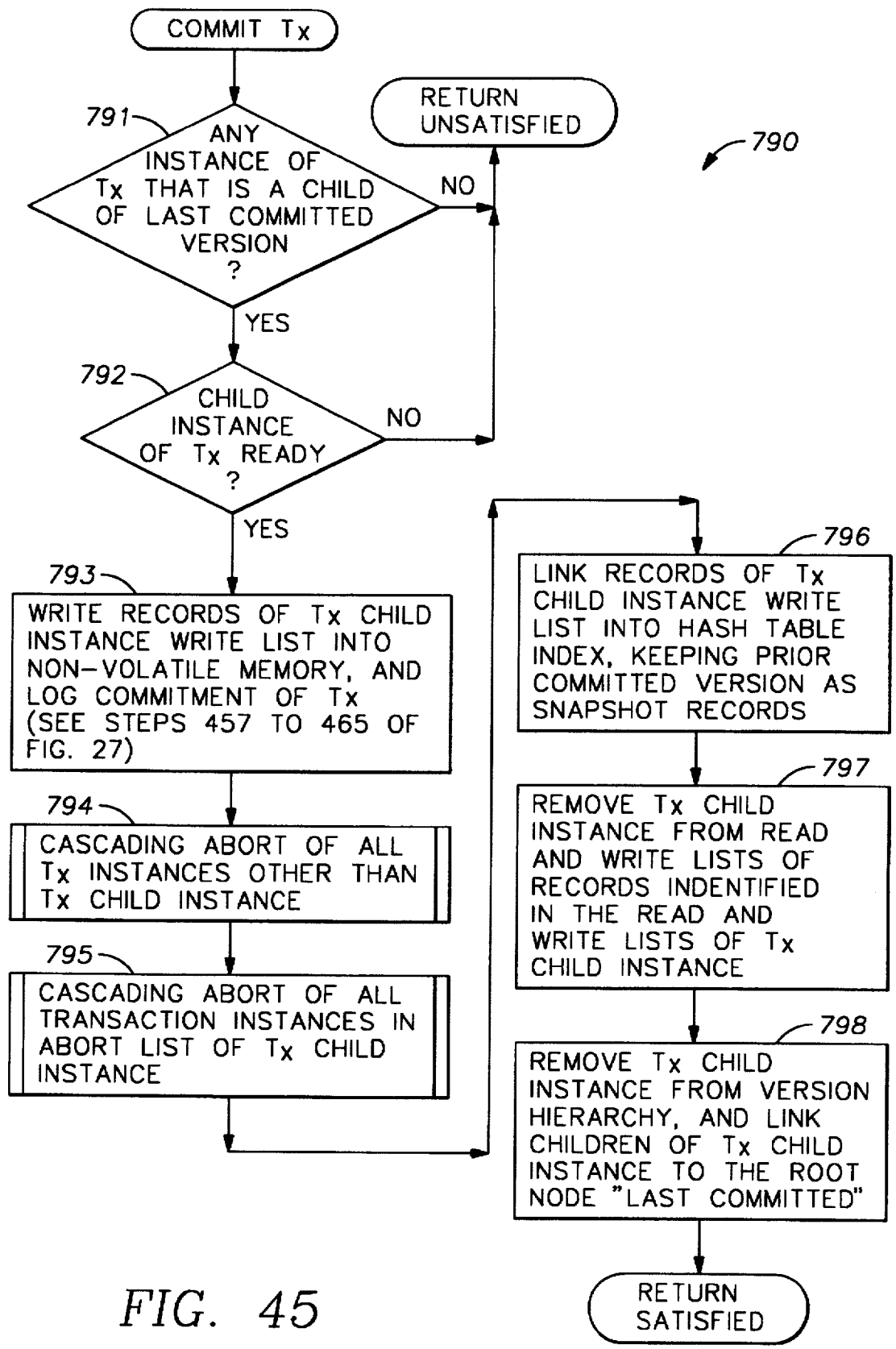
FIG. 45 is a flowchart of a procedure for referencing the serializability graph of FIG. 39 when committing a transaction.

Turning now to FIG. 45, there is shown a flowchart of a procedure 790 for committing a specified transaction. In the first step 791, execution return unsatisfied unless there is an instance of the transaction that is a child of the last committed version. This could be done either by scanning the instance list for the transaction or scanning the list of siblings for the oldest child of the last committed version. If there is an instance of the transaction that is a child of the last committed version, then execution continues to step 792. In step 792, if this child instance of the present transaction is not ready, then execution returns unsatisfied. However, if the child instance of the transaction is ready, then in step 793, this child instance of the transaction is committed by writing records of the write list of the transaction child instance into non-volatile memory, and logging commitment of the transaction, for example, as described above with reference to steps 457 to 465 of FIG. 27. Then, in step 794, a cascading abort is performed of all instances of the transaction other than the transaction child instance. Next, in step 795, a cascading abort is performed upon all transaction instances in the abort list of the child instance of the present transaction. Then, in step 796, the records of the write list of the transaction child instance are linked into the hash table index, and the corresponding records of the prior committed version (which should now have empty read lists and write lists) are kept as snapshot records.

Of course, it is not necessary to keep snapshots, because queries could be treated exactly the same as read-write transactions. The snapshot mechanism, however, permits read-only transactions to be absent from the serializability graph. In an alternative system, read-only transactions are treated the same as read-write transactions, except that the read-only transactions always read the last committed version, and the commitment of any conflicting read-write transactions are delayed until after commitment of the read-only transaction. This alternative eliminates the need for a snapshot mechanism, and also eliminates the need for global timestamps in a multi-processor system.

In step 797 of FIG. 45, the transaction child instance is removed from the read and write lists of records identified in the read and write lists of the transaction child instance. Finally, in step 798, the transaction child instance is removed from the version hierarchy and returned to the buffer pool, and the children of the transaction child instance are linked to the root node representing the "last committed" version.

Figure 46:
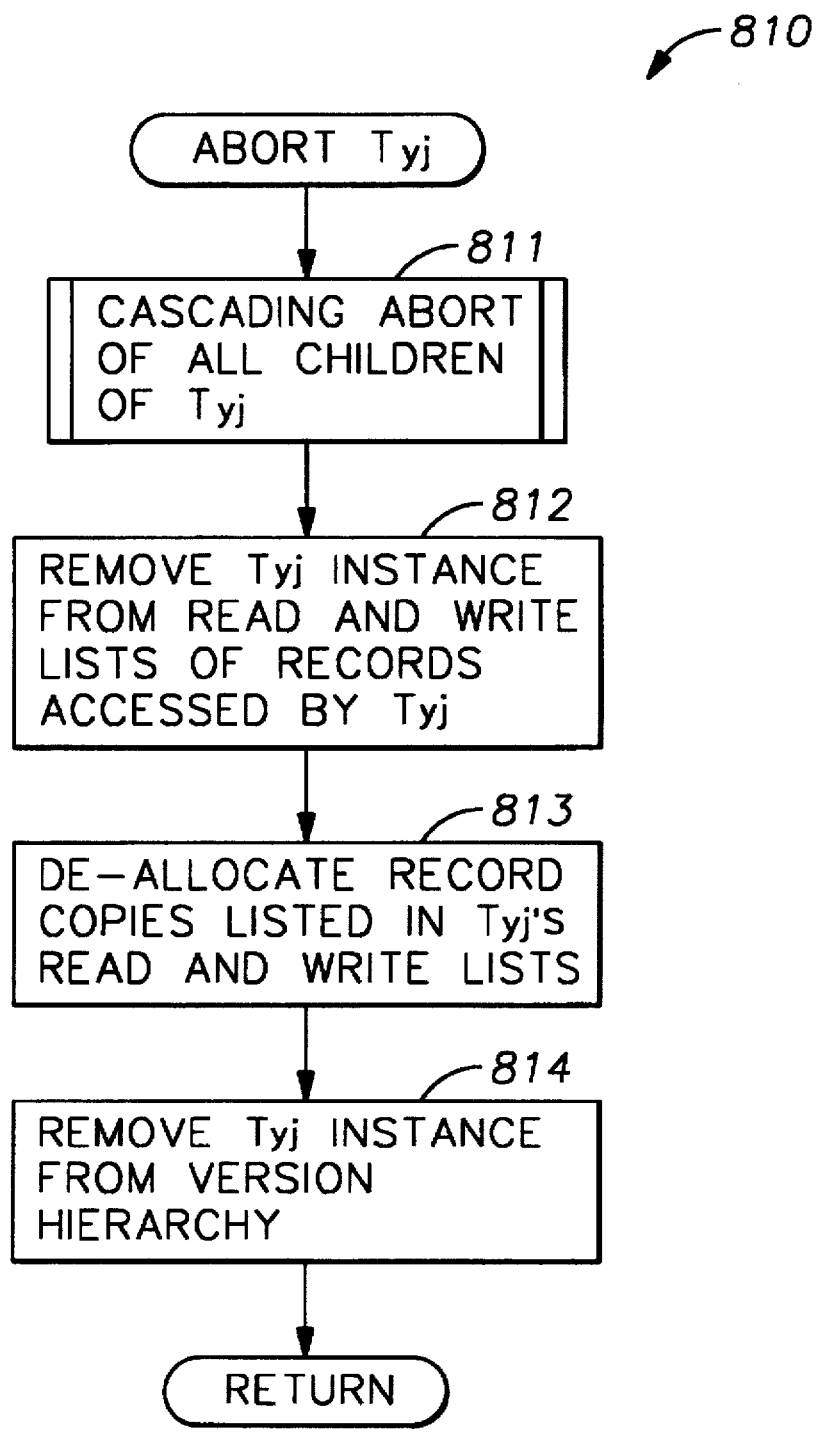
FIG. 46 is a flowchart of a procedure for referencing the serializability graph of FIG. 39 when aborting a transaction.

Turning now to FIG. 46, there is shown a flowchart of a procedure 810 for aborting a specified instance of a specified transaction. In a first step 811, a cascading abort is performed upon all children of the specified instance of the specified transaction. Then, in step 812, the specified instance is removed from the read and write lists of the records accessed by the specified instance of the specified transaction. The records accessed by the specified instance of the specified transaction are listed in the read and write lists of the specified instance of the specified transaction. Then, in step 813, the record copies listed in the specified instance of the specified transactions read and write lists are de-allocated by returning them to the buffer pool for use by other transactions. Finally, in step 814, the specified instance of the specified transaction is removed from the version hierarchy. This is done by unlinking it from the chain of siblings, or if it is an only child, removing the pointer to it in the parent instance.

In view of the above, there has been described a multi-version transaction processing system in which read-write transactions are selectively aborted to enforce an order of commitment of read-write transactions that is the same as an order of conflicts among the read-write transactions, and in which conflicts between read-only transactions and read-write transactions are handled by a snapshot mechanism. Therefore, blocking can be avoided for both read-write transactions and read-only transactions. To achieve update consistency for global read-only transactions in a multi-processing or multi-processor system, the initiation of read-only transactions for each process or processor is synchronized to the commitment of read-write transactions that consistently update resources to be read by the global read-only transaction.

To achieve the highest degree of global consistency, read-write transactions are prevented from reading the results of prior committed read-write transactions, and all transactions have an order of commitment that is the same order as the order of conflicting operations. Preferably this is done by serializing the initiation and processing of global read-only transactions with the commitment of global read-write transactions. Moreover, it has been shown that the commitment ordering of global read-write transactions can be insured without blocking by either global or local read-write transactions, and the initiation and processing of global read-only transactions can be serialized with the commitment ordering of the global read-write transactions, in a system in which the local read-write transactions employ write-locks for consistency and the read-only transactions employ a snapshot mechanism based on the order in which transactions are locally initiated.

It has been further shown how to permit read-write transactions to access multiple versions of resources, and a particular strategy has been described for selecting either the last committed version or a ready but uncommitted version in such a way as to maximize the likelihood that transactions will be prepared for any possible commitment order and to minimize the aborting of results of transactions. Moreover, a general embodiment has been described in FIGS. 39 to 46 that permits a transaction to have plural active instances so as to prepare for various possible commitment orders of the transaction with respect to other conflicting transactions. In this general case, the processing of a new instance of an active read-write transaction can be started when the previous instance has a conflict, without waiting for that conflict to be resolved by possibly aborting all of the results of the prior instance of the read-write transaction.

APPENDIX I

Definitions and Proofs of Extended Commitment Ordering Properties

The following shows that a history property called "Extended Commitment Ordering" solves the global serializability problem for a distributed transaction processing system using any kind of mechanism in each resource manager for ensuring local serializability. In particular, global serializability is guaranteed by "Extended Commitment Ordering" when each resource manager in a distributed transaction processing system ensures local serializability, and the resource managers are autonomous to the extent that they coordinate via atomic commitment protocols only and do not exchange any additional concurrency control information, although the resource managers should identify their local transactions.

Definitions:

1. A transaction $T_i$ is a partial order of events. The binary, asymmetric, transitive, and irreflexive relation that comprises the partial order is denoted "$<_i$". The subscript i may be omitted when the transaction's identifier is known from the context. Events include read and write operations; $r_i[x]$ denotes that transaction $T_i$ has read resource x, i.e., has retrieved its state, and $W_i[x]$ means that transaction $T_i$ has written resource x, i.e., has modified its state. A transaction has also an event of deciding whether to commit or abort its results; $e_i$ means this decision event of $T_i$.

Axioms:

2. A transaction $T_i$ has exactly a single event $e_i$. A value is assigned to $e_i$ as follows: $e_i=c$ if the transaction is committed; $e_i=a$ if the transaction is aborted. $e_i$ may be denoted $c_i$ or $a_i$ when $e_i=c$ or $e_i=a$ respectively.

3. For any operation $p_i[x]$ that is either $r_i[x]$ or $w_i[x]$, $p_i[x]<_i e_i$.

Definitions:

4. Two operations on a resource x, $p_i[x]$, $q_j[x]$ are conflicting if they do not commute (i.e., operations performed in different orders result in different resource states, e.g., if $p_i[x]$ is $w_i[x]$ and $q_j[x]$ is $r_j[x]$).

5. A complete history H over a set T of transactions is a partial order with a relation $<_H$ defined according to the following axioms 6, 7 and 8.

Axioms:

6. If $T_j$ is in T and event$_a<_i$ event$_b$, then event$_a<_H$ event$_b$.

7. If $T_i$ and $T_j$ are in T then for any two conflicting operations $p_i[x]$, $q_j[x]$, either $p_i[x]<_H q_j[x]$ or $q_j[x]<_H p_i[x]$.

8. Let $T_i$, $T_j$ be transactions in T and $r_j[x]$ a read operation. If $w_i[x]<_H r_j[x]$ then either $e_i<_H r_j[x]$ or $r_j[x]<_H e_i$. (This axiom provides a unique definition of the history's semantics because if $e_i=a$ the effect of $w_i[x]$ is undone; i.e. reading x after $e_i$ results in reading a state of x that existed just before $w_i[x]$.) (Note: The subscript H in $<_H$ may be omitted when H is known from the context.)

Definitions:

9. A history is any prefix of a complete history. A prefix of a partial order P over a set S is a partial order P' over a set S'⊂S, with the following properties:

If b ∈ S' and a $<_p$ b then also a ∈ S'

If a,b ∈ S' then a $<_p$ b if and only if a $<_p$ b

10. A transaction $T_2$ is in conflict with transaction $T_1$ if for respective conflicting operations $q_2[x]$, $p_1[x]$, $p_1[x]<q_2[x]$. (Note that this definition is asymmetric.)

11. If $p_1[x]$ is $w_1[x]$ and $q_2[x]$ is $w_2[x]$ then $T_2$ is in a ww conflict with transaction $T_1$.

12. If $p_1[x]$ is $w_1[x]$ and $q_2[x]$ is $r_2[x]$ then $T_2$ is in a wr conflict with transaction $T_1$.

13. If $p_1$ is $r_1[x]$ and $q_2[x]$ is $w_2[x]$ then $T_2$ is in a rw conflict with transaction $T_1$.

14. There is a conflict equivalence between two histories H and H' (the two are conflict equivalent) if they are both defined over the same set of transactions T, and consist of the same transaction events (for partially executed transactions), and $p_i[x]<_H q_j[x]$ if and only if $p_i[x]<_{H'} q_j[x]$ for any conflicting operations $p_i[x]$, $q_j[x]$ of any committed transaction $T_i$, $T_j$ respectively in T (i.e. H and H' have the same conflicts between operations of committed transactions).

15. A history H over a transaction set T is serial if for every two transaction $T_i$, $T_j$ in T the following is true: If $p_i[x]<_H q_j[y]$ then for any other operations $s_i[u]$, $t_j[v]$ in H $s_i[u]<_H t_j[v]$ (i.e. all the operations of $T_i$ precede all the operations of $T_j$).

16. A history is serializable (SER; is in SER) if it is conflict equivalent to some serial history.

17. A Serializability Graph of a history H, SG(H), is the directed graph SG(H)=(T,C) wherein T is the set of all unaborted (i.e. committed and undecided) transactions in H, and C (a subset of TxT) is a set of edges that represent transaction conflicts such that for any two transactions $T_1, T_2$ in T, there is an edge from $T_1$ to $T_2$ if $T_2$ is in a conflict with $T_1$. The Committed Transactions Serializability Graph of a history H, CSG(H), is the subgraph of SG(H) with all the committed transactions as nodes and with all respective edges. The Undecided Transaction Serializability Graph of a history H, USG(H), is the subgraph of SG(H) with all the undecided transactions as nodes and with all the respective edges.

The Serializability theorem:

18. A history H is serializable (is SER) if and only if CSG(H) is cycle-free.

Definitions:

19. A transaction $T_2$ reads a resource x from transaction $T_1$ if $T_2$ reads x, and $T_1$ is the last transaction to write x before being read by $T_2$ (i.e. $W_1[x]<r_2[x]$ and there is no $W_3[x]$ such that $W_1[x]<W_3[x]<r_2[x]$). A history H is recoverable (REC; is in REC) if no committed transaction in H has read resource state written by an aborted transaction in H. To guarantee this, if for any two transactions $T_1$, $T_2$ in H, whenever $T_2$ reads any resource from $T_1$, $T_2$ is committed only after $T_1$ has been committed. Formally: ($T_2$ reads x from $T_1$) and $e_2=c$ implies (($e_1<e_2$ and $e_1=c$) or ($e_1<r_2[x]$ and $e_1=a$)).

20. A history H avoids cascading aborts (ACA; is in ACA, is cascadeless) if any transaction in H reads resources written by committed transactions only. Let $T_1$, $T_2$ be any two transactions in H. The following expression is a formal representation of this concept:

$T_2$ has read x from $T_1$ implies $e_1 < r_2[x]$.

21. Let $T_1, T_2$ be any two transactions in H. H is strict (ST; is in ST; has the strictness property) if $w_1[x] < p_2[x]$ implies $e_1 < p_2[x]$ where $p_2[x]$ is either $r_2[x]$ or $w_2[x]$.

Theorem:

22. REC$\supset$ACA$\supset$ST where $\supset$ denotes a strict containment. (This theorem follows immediately from the definitions.)

Definitions:

23. Two Phase Locking (2PL) is a serializability mechanism that implements two types of locks: write locks and read locks. A write lock blocks both read and write operations of a resource, while a read lock blocks write operations only. 2PL consists of partitioning a transaction's duration into two phases: In the first locks are acquired; in the second locks are released.

24. A history is in Strong-Strict Two-phase Locking (S-S2PL) if for any conflicting operations $p_1[x]$, $q_2[x]$ of transactions $T_1$, $T_2$ respectively in H $p_1[x] < q_2[x]$ implies $e_1 < q_2[x]$. (Note: A history is a two-phase locking if it can be generated by the two-phase locking mechanism. Strict two-phase locking requires that write locks issued on behalf of a transaction are not released until its end; however, read locks can be released earlier, at the end of phase one of the two-phase locking mechanism. Strong-Strict Two-Phase locking requires that all locks are not released before the transaction ends (when it is either committed or aborted.) Strong-Strict Two-Phase locking blocks any conflicting operations on a resource accessed by a transaction until the end of the transaction.)

25. A mechanism is blocking if in some situations it delays operations in a transaction until certain events occur in other transactions.

26. A history property is inherently blocking if it can be enforced by blocking mechanisms only.

27. A history property is non inherently blocking if it can be enforced by any non-blocking mechanism. (Note: Both serializability and recoverability are non inherently blocking because they can always be guaranteed by aborting a violating transaction any time before it ends. This observation is the basis for optimistic concurrency control, where transactions run without blocking each other's operations, and are aborted only when ended if violating serializability or any other desired property. Two-phase locking and ACA on the other hand are inherently blocking.)

28. A transaction is decided if it is either aborted or committed; otherwise it is undecided.

29. An undecided transaction is ready if it has completed its processing, and is prepared either to be committed or aborted; otherwise it is active.

30. A transaction is undecided if it is either ready or active.

Commitment Ordering Definition:

31. A history has the Commitment Ordering property (i.e., is in CO) if for any conflicting operations $p_1[x]$, $q_2[x]$ of committed transactions $T_1$, $T_2$ respectively, $p_1[x] < q_2[x]$ implies $e_1 < e_2$. Formally: ($e_1 = c$ and $e_2 = c$ and $p_1[x] < q_2[x]$) implies $e_1 < e_2$.

Commitment Ordering Theorem:

32. SER$\supset$CO (i.e., Commitment Ordering Implies Serializability.)

Proof: Let a history H be a CO, and let ... $\rightarrow T_i \rightarrow$ ... $\rightarrow T_j \rightarrow$ ... be a (directed) path in CSG(H). Using the CO definition and an induction by the order on the path we conclude immediately that $c_i < c_j$. Now suppose that H is not in SER. By the Serializability Theorem (1.18)(without loss of generality) there is a cycle $T_1 \rightarrow T_2 \rightarrow$ ... $\rightarrow T_n \rightarrow T_1$ in CSG(H) where $n \geq 2$. First let $T_i$ and $T_j$ above be $T_1$ and $T_2$ of the cycle respectively (consider an appropriate prefix of the expression describing the cycle). This implies by the observation above that $c_1 < c_2$. Now let $T_i$ and $T_j$ be $T_2$ and $T_1$ respectively (consider an appropriate suffix of the expression describing the cycle). This implies that $c_2 < c_1$. However, $c_1 < c_2$ and $c_2 < c_1$ contradict each other since the relation "<" is asymmetric. Hence CSG (H) is acyclic, and H is in SER by the Serializability Theorem. Now examine the following serializable, non CO history to conclude that the containment is strict: $r_1[x]$ $w_2[x]$ $c_2$ $c_1$ Definitions:

33. Timestamp Ordering (TO) concurrency control mechanisms provide serializability and are based on a time-stamp $ts(T_i)$ (e.g., a real number) associated with each transaction $T_i$; timestamps are distinct.

Timestep Ordering Rule:

34. For any two conflicting operations $p_1[x]$, $q_2[x]$ of any committed transactions $T_1$, $T_2$ respectively, $ts(T_1) < ts(T_2)$ implies $p_1[x] < q_2[x]$. (Note: timestep ordering is non-blocking (because it can be enforced by aborting either $T_1$ or $T_2$ after all their operations have been issued), and provides the basis for optimistic timestamp ordering based concurrency control, as well as a basis for blocking Timestamp Ordering based mechanisms.)

Blocking Timestamp Ordering Rule:

35. For any two conflicting operations $p_1[x]$, $q_2[x]$ of any transactions $T_1$, $T_2$ respectively, $ts(T_1) < ts(T_2)$ implies $p_1[x] < q_2[x]$. (Note: This Blocking Timestamp Ordering rule requires that conflicting operations are scheduled according to the timestamps order regardless of whether the respective transactions are committed.)

Timestamp Commitment Ordering Rule:

36. For any two committed transaction $T_1$, $T_2$ with respective conflicting operations, $ts(T_1) < ts(T_2)$ implies $e_1 < e_2$. Formally: ($e_1 = c$ and $e_2 = c$ and ($p_1[x]$, $q_2[x]$ conflict) and $ts(T_1) < ts(T_2)$) implies $e_1 < e_2$.

Theorem:

37. A history has the Commitment Ordering property if and only if it is generated by a mechanism that obeys both the Timestamp Ordering Rule (34) and the timestamp Commitment Ordering Rule (36). (Note: This theorem means that if the Timestamp Commitment Ordering (TCO) rule is being enforced by any Timestamp Ordering mechanism, then only histories having the Commitment Ordering Property are generated. The TCO rule can be enforced by delaying commitment events when necessary to comply with the timestamp order.)

Definitions:

38. Transaction Termination Scheduler (TTS) is an RM component that monitors the set of transactions and decides when and which transaction to commit or abort. In a multi-resource manager environment this component participates in atomic commitment procedures on behalf of its resource manager and controls (within the respective resource manager) the execution of the decision reached via atomic commitment for each relevant transaction.

39. A Commitment Ordering Transaction Terminating Scheduler (COTTS) performs the following procedure or its equivalent:

(a) The COTTS maintains a serializability graph, USC, of all undecided transactions. Every new transaction processed by the RM is reflected as a new node in USG; every conflict between transactions in USG if reflected by a directed edge (an edge between two transactions may represent several conflicts though). USG(H)=(UT, C) where UT is the set of all undecided transactions in a history H; and C (a subset of UT×UT) is the set of directed edges between transactions in UT. There is an edge from $T_1$ to $T_2$ if $T_2$ is in a conflict with $T_1$. The USG reflects all operation's conflicts until commit. The set of transactions aborted as a result of committing T (to prevent future cviolation-ordering violation) is defined as follows:

$$ABORT_{co}(T)=\{T'|T' \to T \text{ is in } C\}$$

The COTTS iteratively performs the following steps:
(a) selects any ready transaction (i.e. that has completed processing) T in USG (using any criteria, possibly by priorities assigned to each transaction; a priority can be changed dynamically as long as the transaction is in USG), and commit it;
(b) aborts all the transactions in the set $ABORT_{co}(T)$, i.e. all the transactions (both ready and active) in USG that have an edge going to T; and (c) removes any decided transaction (T and the aborted transactions) from the graph (they do not belong in USG by definition).

Theorem:

40. The Commitment Ordering Transaction Termination Scheduler (COTTS) produces histories having the Commitment Ordering (CO) Property.

Proof: The proof is by induction on the number of iterations by the COTTS, starting from an empty history $H_0$, and an empty graph $USG_0=USG(H_0)$. $H_0$ is CO. Assume that the history $H_n$, generated after iteration n, is CO. $USG_n$ (in its UT component) includes all the undecided transactions in $H_n$. Now perform an additional iteration, number n+1, and commit transaction $T_1$ (without loss of generality—wlg) in $USG_n$. $H_{n+1}$ includes all the transactions in $H_n$ and the new (undecided) transactions that have been generated after completing step n (and are in $USG_{n+1}$). Examine the following cases after completing iteration n+1:
(a) Let $T_2$, $T_3$ (wlg) be two committed transactions in $H_n$. If $T_3$ is in conflict with $T_2$ then $c_2<c_3$ since $H_n$ is CO by the induction hypothesis.
(b) $c_2<c_1$ for every (previously) committed transaction $T_2$ in $H_n$ with which $T_1$ is in a conflict.
(c) Suppose that a committed transaction $T_2$ is in a conflict with $T_1$. This means that $T_1$ is in $abort_{co}(T_2)$, and thus was aborted when $T_2$ was committed. This is a contradiction.

The cases above exhaust all possible pairs of conflicting committed transactions in $H_{n+1}$. Hence $H_{n+1}$ is CO.

(Note: If there exists a transaction that does not reside on any cycle in USG then there exists a transaction T with no edges from any other transaction. T can be committed without aborting any other transaction since $ABORT_{co}(T)$ is empty. If all the transactions in USG are on cycles, at least one transaction has to be aborted. This situation seems to be uncommon. In a multi RM environment, the RM (TTS) typically receives a request (via an atomic commitment protocol) to commit some transaction T in the USG, all transactions in $ABORT_{co}(T)$, i.e. with edges to T, need to be aborted when T is committed (by the COTTS). Thus, the COTTS has to delay its yes vote on T if it has voted yes on any transaction in ABORT(T) to guarantee a consistent commit order in all the RMs involved (enforcing CDDC for pairs of conflicting transactions; see definition 50 below). The TTS may choose to vote yes on T immediately (the non-blocking without delays approach). Another approach (non-blocking with delays) is to delay the voting on T for a given amount of time. During the delay the set $ABORT_{co}(T)$ may become smaller or empty. If T is in a ready state the set cannot increase. Instead of immediately committing, or delaying the voting on T for a given amount of time (which may result in aborts) the TTS can block the voting on T until all transactions in $ABORT_{co}(T)$ are decided. However, if another RM in the environment also blocks, this may result in a global deadlock.)

Definition:

41. A CORTTS is a COTTS which generates histories that are both CO and recoverable. The CORTTS maintains an enhanced serializability graph, wr-USG:

$$wr\text{-}USG(H)=(UT,C,C_{wr})$$

where UT is the set of all undecided transactions in the history H; and C is the set of edges between transactions in UT. There is a C edge from $T_1$ to $T_2$ if $T_2$ is only in non "read from" wr conflicts with $T_1$. $C_{wr}$ is the set of edges between transactions in UT with wr conflicts as well. There is a $C_{wr}$ edge from $T_1$ to $T_2$ if $T_2$ has read from $T_1$ (and possibly $T_2$ is also in conflicts of other types with $T_1$). $C_{wr}$ and $C_{wr}$ are disjoint. The set of transactions aborted as a result of committing T (to prevent future commitment-ordering violation) is defined as follows:

$$ABORT_{co}(T)=\{T'|T' \to T \text{ is in } C \text{ or } C_{wr}\}$$

The definition of $ABORT_{co}(T)$ here has the same semantics as of the respective set for COTTS. The set of aborted transactions due to recoverability, as a result of aborting transaction T', is defined as follows:

$$ABORT_{REC}(T')=\{T''|T' \to T'' \text{ is in } C_{wr} \text{ or } T'' \to t''' \text{ is in } C_{wr}$$

where T''' is in $ABORT_{REC}(T;)\}$ Note that the definition is recursire. This well reflects the nature of cascading aborts. The CORTTS iterates the following steps: (a) select any ready transaction T in wr-USG, that does not have any in-coming $C_{wr}$ edge (i.e. such that T is not in $ABORT_{REC}(T')$ for any transaction T' in $ABORT_{co}(T)$; this to avoid a need to later abort T itself), and commit it; (b) abort all the transaction T' (both ready and active) in $ABORT_{co}(T)$; (c) abort all the transaction T'' (both ready and active) in $ABORT_{REC}(T')$ for every T' aborted in the previous step (cascading aborts); and (d) remove any decided transaction (T and all the aborted transactions) from the graph. (Note: during each iteration wr-USG should reflect all operation's conflicts till commit.)

Theorem

42. The CORTTS produces CO, recoverable histories

Proof: The histories generated are CO by theorem 40 since CORTTS differs from COTTS only in aborting additional transactions during each iteration (due to the recoverability requirement). Since all the transactions that can violate recoverability (transactions in $ABORT_{REC}(T')$ for every aborted transaction T' in $ABORT_{co}(T)$ are aborted during each iteration (i.e. transactions that read data written by an aborted transaction before the abort), the generated histories are recoverable. (Note: The CORTTS can be implemented as a non-blocking without delays, with delays and blocking TTS with results similar to those discussed above in the notes about the COTTS.)

Corollaries:

43. A COTTS generates histories that are serializable.

44. A CORTTS generates histories that are both serializable and recoverable.

45. Non-blocking schedulers based on COTTS and CORTTS generate deadlock free executions only. (Note: The TTSs above can be combined with any resource access scheduler (RAS) for scheduling resource access operations. If both the TTS and the RAS are non-blocking, then also the combined mechanism is non-blocking, and hence ensures deadlock-freeness. A combination of a RAS and another TTS can replace a RAS above, if some filtering (by a TTS) is required to impose further history properties. In this case the filtering TTS may only abort transaction. But it does not matter if the RAS produces serializable histories since the CO TTSs above guarantee serializability. The combined mechanism may execute as follows: First, the transactions are controlled by the RAS (or a RAS with a TTS). The unaborted, ready transactions are considered by the COTTS as candidates to be committed, and transactions are aborted if violating the CO TTS's conditions. Note that if the scheduler above is S-S2PL based, then the USG of the respective CO TTS does not have any edges. This means that no aborts by the CO TTS are needed, as one can expect, and a CO TTS is unnecessary. This is an extreme case. Other scheduler types can induce other properties of the respective USGs to impose desired schedule patterns and system behaviors, according to the nature of the transactions involved. Note also that if the combined CC mechanism (a RAS, or a RAS and a TTS) guarantees the Recoverability property, and implements CDDC (see definition 50 below) for transaction pairs having "read from" conflicts, the COTTS is sufficient (no need for CORTTS because recoverability is inherited, the same is true also for cascadelessness and strictness). When the scheduler is Timestamp Ordering (TO) based and CO is desired, CO can be imposed by enforcing the Timestamp Commitment Ordering rule.

Definitions:

46. An environment comprises a distributed services system having a plurality of Resource Managers (RMs), where a transaction can span any subset of participating RMs. Each RM in an environment has an identifier (e.g. RM 2). Events are qualified by both a transaction's identifier and an RM's identifier (e.g. $w_{3,2}[x]$ means a write operation of resource x by RM 2 on behalf of transaction $T_3$).

Axiom:

47. If $p_{i,j}[x]$, $q_{k,l}[y]$, $j \neq l$ are operations (by RMs j, l respectively), then $x \neq y$; i.e. these operations cannot conflict.

Definitions:

48. A global transaction $T_i$ consists of one or more local subtransactions. A local subtransaction $T_{i,j}$, accesses all the data under the control of RM j that $T_i$ needs to access, and only these resources (i.e. all its events are qualified with j). A local subtransaction obeys the definition of a transaction. A local subtransaction has the states as defined in definitions 28, 29 and 30.

49. A local history is Generated by a single RM, and defined over the set of its local subtransactions. A local history obeys the definition 9 of a history. $H_i$ is the history Generated by RM i with a relation $<_{H_i}$.

It is assumed that an atomic commitment (AC) protocol is applied to guarantee atomicitV in the distributed environment. See definition 50 below. It is also assumed that a commit decision delegation condition (CDDC) is applied by each RM participating in the AC protocol when different transactions have dependent commit decisions. See definition 50 below.

50. An AC protocol implements the following general scheme each time a transaction is decided: Each participating RM votes either "Yes" or "No" (but not both) after the respective local subtransaction has reached the "ready" state, or votes "No" if unable to reach the "ready" state. The transaction is committed by all RMs if and only if all have voted "Yes". Otherwise it is aborted by all the RMs. (Note: 2PC is a special case of AC.) In what follows we distinguish between the commit decision events by the AC protocol, and the commit events in the individual RMs. We consider only the commit decision events of the AC protocol which are unique for every committed transaction.

An RM obeys CDDC for $T_1$ and $T_2$ if, after voting yes on $T_1$, it does not vote yes on $T_2$ before committing or aborting $T_1$.

Example: The following two transactions both access resources x and y. x, y are under the control of RMs 1, 2 respectively. $T_1$ and $T_2$ and their local transactions are the following:

RM 1   $T_{1,1}$: $r_{1,1}[x]\, c_1$     $T_{2,1}$: $w_{2,1}[x]\, c_2$
RM 2   $T_{1,2}$: $r_{1,2}[y]\, c_1$     $T_{2,2}$: $w_{2,2}[y]\, c_2$
        $T_1$                              $T_2$

The RMs generate the following (local) histories $H_1$ and $H_2$:
RM 1: $H_1 r_{1,1}[x] w_{2,1}[x] c_2\, c_1$
RM 2: $H_2 w_{2,2}[y] c_2 r_{1,2}[y] C_1$ Note that the history $H_1$ violates commitment-ordering which results in a (global) serializability violation. The respective global history H is described by the following order relationships:

$r_{1,1}[x] < w_{2,1}[x] < c_2 < r_{1,2}[y] < c_1$
$w_{2,2}[y] < c_2$

51. For any history property X a (global) history H is in Local-X (is locally X) if the local history of every RM in the environment is in X (is X).

Theorem:

52. A history is in X (is globally X) if and only if it is in Local-X (i.e. Local-X=X), where X is any of the following properties: REC, ACA, ST, CO, S-S2PL.

Proof: Follows from the definition of Local-X, Axiom 47, AC, CDDC, and the definitions of REC, ACA ST, CO and S-S2PL.

Theorem:

53. Being in Local-X does not imply that a history is in X (i.e. Local-X⊃X), where X is any of the following properties: SER, 2PL, S2PL.

Proof: Let H be the history as in the example above. The history H is in Local-SER, Local-2PL and Local-S2PL since both $H_1$ and $H_2$ are in SER, 2PL and S2PL. However H is not in SER, 2PL or S2PL. CSG(H) has a cycle, so by the serializability Theorem (18) the H is not in SER. If it is in 2PL or S2PL, it is also in SER, and we have a contradiction.

Theorem:

54. SER⊃Local-CO. In other words if a history is in Local-CO then it is globally serializable. This theorem follows from the Commitment Ordering theorem and theorem 52.

(Note: Local-CO can be maintained by RMs using any types of CO mechanisms.)

Definition:

55. Let S be a system over a set of possible states, STATES. S guarantees a property P if every state in STATES is in P. In what follows, global histories generated by a multiple-RM environment are considered states of the environment. A permanent risk (PR) transaction is a transaction that can cause a potential serializability violation when committed, and will stay in this situation forever. The PR property is relative to the resource manager. The above requirement implies that each RM in the environment should implement the following Commitment Strategy (CS): Starting from a history with no decided transactions any ready transaction is committed (usually the RM is requested via an AC protocol to commit some transaction). Every other transaction that is a PR is aborted. (hidden axiom is assumed here, that resources are not held unnecessarily. Otherwise PR transactions can be marked and kept undecided for ever.) Then another (any) ready transaction, that cannot cause a serializability violation, is committed. Again all the PR transactions are aborted, and so forth. Ready transactions can be committed concurrently if CDDC is maintained for any pair of transactions $T_1$, $T_2$ such that $T_2$ is in a conflict with $T_1$.

Theorem:

56. If only local serializability information is available for each RM in the environment, and if atomic commitment is applied, then CS is a necessary strategy for each RM, in order to guarantee global serializability. CS produces locally CO histories (global histories in Local-CO).

Proof: The Serializability Theorem implies that the serializability graph provides all the necessary information about serializability. We assume that every RM, say RM i, "knows" its local serializability graph $SG_i$ (it includes all the committed and undecided transactions only) and its subgraphs $CSG_i$ (includes committed transactions only) and $USG_i$ (includes all undecided transactions). We also assume (based on AC) that each RM has committed a transaction, if and only if it has voted "Yes", and "knows" that all other RMs participating in a transaction have voted "Yes", and will eventually commit it. The goal for each RM is to guarantee a cycle-free (global) CSG (committed transaction serializability graph), by avoiding any action that may create a global cycle (local cycles in $CSG_i$ are eliminated by RM i). First, CS is trivially necessary for the following reasons: Since a PR transaction remains PR for ever (by definition), it cannot be committed and must be aborted to free resources. On the other hand, any ready transaction that cannot cause a serializability violation can be committed. We now need to identify permanent risk (PR) transactions, while implementing CS. We show that this implies that each RM operates as a COTTS. Each RM implements CS as follows:

(a) Base stage: Assume that $CSG_i$ does not include any transaction. Commit any ready transaction T. Suppose that prior to committing T there is an edge T'→T in $USG_i$. It is possible that there is an edge T→T' in some $USG_j$ of some RM j, j≠i, but RM i, though, cannot verify this. This means that committing T' later may cause a cycle in CSG. Since committing T cannot be reversed (see transaction state transitions in section 3), no event can change this situation. Hence T' is a PR, and RM i must abort it.

(b) Inductive stage: Suppose that $CSG_i$ includes one transaction at least. We show that no ready transaction can cause a serializability violation if committed, and hence can be committed (provided that a consensus to commit is reached by all the participating RMs via AC): Commit any ready transaction T. Examine any undecided transaction T' (in $USG_i$.) Suppose that prior to committing T there is an edge T'→T in $USG_i$. Using again the arguments given for the base stage, T' is a PR, and RM i must abort it (by voting "No" via AC). If there is no edge from T' to T, no decision concerning T' is taken at this stage. Examine now any previously committed transaction T''. It is impossible to have a path T→ ... →T'' in $CSG_i$ or in $CSG_j$ for any RM j, j≠i since if this path existed at the stage when T'' was committed, it would have been disconnected during that stage, when aborting all transactions with edges to T'' (using the arguments given for the base stage above), and since no incoming edges to T'' could have been generated after T'' has been committed. Hence, only a path T''→ ... →T can exist in $CSG_i$ or in $CSG_j$ for any RM j, j≠i. This means that no cycle in CSG through T and T'' can be created, and no T'' needs to be aborted (which would fail the strategy).

The arguments above ensure that no ready transaction can cause a serializability violation when committed at the beginning of an inductive stage, as was assumed, and hence (any ready transaction) T could have been committed.

In the CS implementation above all the PR transactions are identified and aborted at each stage. Examining this implementation we conclude that it functions as a COTTS. Hence, by theorem 40 every RM involved produces a CO history, and the generated (global) history is locally CO (in Local-CO). The only possible deviation from the implementation above is by aborting additional transactions at each stage. Such a deviation still maintains the generated history in Local-CO.

Corollary

57. If RMs coordinate concurrency control via atomic commitment only, then guaranteeing local commitment-ordering is a necessary and sufficient condition for guaranteeing (global) serializability. This corollary follows from theorems 52, 55 and 56.

Corollary

58. If RMs coordinate concurrency control via atomic commitment only, then guaranteeing local commitment-ordering and local. recoverability are a necessary and sufficient condition for guaranteeing (global) serializability and recoverability. This corollary follows from Theorem 52.

59. A global deadlock is a deadlock caused by a mutual blocking of two or more local subtransactions in two different transactions at least, by two different RMs at least. (Notes: Since commitment-ordering is not inherently blocking, it can be implemented in a non blocking manner, for example, by aborts or by aborts after delays. If the schedulers of all the RMs in the environment are non-blocking (with the exception of one that can be blocking), the executions are deadlock-free.

Another way to implement commitment-ordering is by using blocking CO certifiers (CO schedulers with a non-blocking RAS and a blocking TTS). If the schedulers for all RMs are certifiers, when two at least are blocking, the global deadlocks can occur (even if each RM resolves its own deadlocks). In this case all the transactions involved with a deadlock are in a ready state. This fact allows to resolve deadlocks during atomic commitment.

If schedulers of two or more RMs are blocking, where one, at least, has a blocking RAS (e.g. S-S2PL, or CO, BTO based), then also active transactions can be involved with a global deadlock. In this case atomic commitment messages are not sufficient for deadlock resolution, and additional messages signaling the presence of blocks (possibly piggy-backed on AC messages of other transactions) are required).

Definitions:

60. Extended Commitment Ordering (ECO) is a property of histories that guarantees global serializability when applied locally (in each RM) together with (local) serializability. ECO generalizes Commitment Ordering (CO) by distinguishing between local transactions (i.e., confined to a single RM) and global ones (i.e., span two or more RMs). A history is ECO if the order of any two committed, global transactions on any path in the committed transaction serializability graph (CSG; i.e., as reflected by the direction of edges) matches the order of the respective commitment events. Thus, ECO applies the commitment order condition to global transactions. ECO is not inherently blocking, and can be implemented in a non-blocking manner, which guarantees deadlock-freeness if also the local serializability mechanism is non-blocking. The price for this, however, is the possibility of cascading aborts when recoverability is applied.

61. Let $\Gamma$ be a set of directed graphs $G_k$ (k is a member in some set of integers I), all of them over the same set of nodes T. G, the union graph over $\Gamma$ is a directed graph over all the nodes in all the graphs $G_k$, with all the edges of all the graphs. Formally: A node $T_i$ is a node of G if and only if it is a node of some $G_k$ in $\Gamma$. G has an edge $(T_i, T_j)$ if and only if this is an edge in some $G_k$ in $\Gamma$.

Lemma:

64. Let an environment consist of a set of RMs, {RM k| is in I}, that are coordinated via Atomic Commitment (AC) protocols. Let $H_k$ be the history of RM k, and let H be the global history in the environment. Then CSG(H) is the union graph over the set of all the graphs $CSG(H_k)$.

Proof: Since the RMs in the environment are coordinated via AC, global atomicity is guaranteed, and a transaction $T_i$ is a node in $CSG(H_k)$ for every RM k that participates in $T_i$ if and only if it is committed. $T_i$ is also a node in CSG(H) if and only if it is committed. Thus, $T_i$ is a node in CSG(H) if and only if it is a node in all $CSG(H_k)$ such that RM k participates in $T_i$. Similar arguments hold for edges that represent conflicting operations between committed transactions.

Definition:

63. The (binary) relation $\Rightarrow$ (reads: precedes in CSG) is a relation between two committed transactions. Let $T_1$, $T_2$ be two committed transactions in a history H. $T_1 \Rightarrow T_2$ (reads: $T_1$ precedes $T_2$ in CSG(H)) if there is a (directed) path in CSG(H) from $T_1$ to $T_2$. The notation $\Rightarrow_k$ is used for CSG $(H_k)$, where $H_k$ is the history of RM k.

Lemma:

64. A history H is in CO if and only if for any two committed transactions $T_1$, $T_2$, in H $T_1 \Rightarrow T_2$ implies $c_1 < c_2$.

Proof: (i) Suppose that a history H is in CO. For any two committed transactions $T_1$, $T_2$, in H, an edge $T_1 \rightarrow T_2$ in CSG(H) means that $T_2$ is in conflict with $T_1$. H being in CO implies that $c_1 < c_2$ (by the definition of CO). Suppose that . . . $\rightarrow T_i \rightarrow \ldots T_j \rightarrow \ldots$ is a (directed) path in CSG(H). By the above observation and an induction by the order on the path, we conclude that $c_i < c_j$. Using the definition of $\Rightarrow$, we conclude that for any two transactions $T_i$, $T_j$ in CSG(H) $T_i \Rightarrow T_j$ implies $c_i < c_j$; (ii) If for any two committed transactions $T_i$, $T_j$, $T_i \Rightarrow T_j$ implies $c_i < c_j$, this is particularly true for paths in CSG(H) of length one, i.e., if the edge $T_i$, $T_j$ is in CSG(H) then $c_i < c_j$. Thus $T_j$ being in a conflict with $T_i$ implies $c_i < c_j$, and H is in CO.

Definition

65. A history H is in ECO if for any two committed, global transactions $T_1$, $T_2$ respectively in H, $T_1 \Rightarrow T_2$ implies $c_1 < c_2$. Formally: ($c_1 = c$ and $c_2 = c$ and ($T_1$ is global) and ($T_2$ is global) and $T_1 \Rightarrow T_2$) implies $C_1 < c_2$. In particular, a history $H_k$ generated by RM k is in ECO if and only if for any two committed, global transactions $T_1$, $T_2$ respectively, $T_1 \Rightarrow_k T_2$ implies $c_1 < c_2$.

Theorem

66. ECO$\supset$CO (i.e., CO implies ECO). Proof: (i) Suppose that a history is in CO. Thus, for any two transactions $T_i$, $T_j$, $T_i \Rightarrow T_j$ implimplies $c_i < c_j$. This is true particularly for two global transactions $T_i$, $T_j$, which implies ECO; (ii) To conclude that the containment is strict, examine the following (local) history that is in ECO but not in CO: $w_1[x]r_2[x]$ $w_3[x]C_2c_1c_3$ where $T_1$, $T_3$ are global and $T_2$ is a local transaction.

67. ECO=Local-ECO (i.e., a global history is in ECO if and only if it is in Local-ECO).

Proof: (i) Let a history H be in Local-ECO. By lemma 62 $T_i \Rightarrow T_j$ implies (without loss of generality) that there exist sequences of RMs and global transactions such that $T_i = TR_0 \Rightarrow_{RM\_1} TR_1 \Rightarrow_{RM\_2} \Rightarrow_{RM\_m} TR_m \Rightarrow_{RM\_m+1} \Rightarrow_{RM\_n}$ $TP_n = T_j$ where $TR_m$ is a global transaction with participating RMs R\_m and R\_m+1 (and possibly others), where M=0, . . . ,n-1. Since every RM is in ECO (by definition of Local-ECO), $TR_m \Rightarrow_{RM\_m+1} TR_{m+1}$ implies $c(TR_m) < c(TR_{m+1})$ where $c(TR_m)$ is the commit event of $TR_m$. Thus, $c(TR_0) < c(TR_n)$. Hence, $T_i \Rightarrow T_j$ implies $c_i < c_j$, and H is in ECO;

(ii) If a history H is in ECO then $T_1 \Rightarrow T_2$ implies $c_1 < c_2$ for any two committed global transactions in H. By lemma 62 $T_1 \Rightarrow_k T_2$ implies $T_1 \Rightarrow T_2$. Thus, by the claim above for every RM k in the environment and any two global transactions $T_1$, $T_2$, $T_1 \Rightarrow_k T_2$ implies $c_1 < c_2$, and H is in Local-ECO.

68. SER$\supset$ Local-SER-ECO (=Local-ECO$\cap$Local-SER) (i.e., local ECO together with local serializability imply global serializability. In spite of the fact that Local-SER$\supset$SER (theorem 53), if we apply Local-ECO in addition to Local-SER, we guarantee global serializability. (Note: The notation Local-SER-ECO is used for the class Local-ECO$\cap$Local-SER that is also the class ECO$\cap$Local-SER (by theorem 67)).

Proof: Suppose that a history H is in Local-ECO and in Local-SER, and it is not in SER. Hence, CSG(H) includes a cycle. Assume (without loss of generality) that the cycle is $T_1 \rightarrow T_2 \rightarrow \ldots T_n \rightarrow T_1$.

(i) Suppose that one transaction at most (i.e., one or none) on the cycle is global. This means (follows by definition 61) that all the transactions on the cycle, with the possible exception of a single transaction, are local to the same RM k (i.e., do not span any other RMs). Thus, all conflicts represented by the cycle's edges are by operations of RM k. Hence, $CSG(_k)$ has a cycle (the same cycle as the cycle above), which contradicts local serializability.

(ii) Suppose now that the cycle above includes two global transactions (and possibly more) $T_i, T_j$, i<j. Since H is in Local-ECO, it is also in ECO by theorem 66. $T_i, T_j$ being on a cycle implies that both $T_i \Rightarrow T_j$ and $T_j \Rightarrow T_i$ are true. This implies, by the definition of ECO, that both $c_i < c_j$ and $c_j < c_i$ are true, and again we have reached a contradiction. Thus, CSG(H) cannot have a cycle and H is in SER.

Corollary

69. If each RM in the environment generates a serializable, ECO (local) history (or a history that is CO), then the global history is serializable (since it is in Local-SER-ECO). (This is concluded from theorems 52 and 66.)

Theorem

70. Local-SER-ECO$\supset$Local-CO. Proof: Local-SER-ECO=Local-ECO$\cap$Local-SER by definition. Local-ECO= ECO$\supset$CO=Local-CO by theorems 66, 67, and 68. Also, Local-SER$\supset$SER$\supset$CO=Local-CO by definition 51 and theorems 52 and 53. Thus, Local-SER-ECO$\supseteq$ Local-CO. The following global history is in Local-SER-ECO but not in Local-CO, showing that the containment is strict:

| RM 1 | $r_{1,1}[x] \rightarrow w_{2,1}[x] \rightarrow c_2 \rightarrow c_1$ |
|---|---|
| RM2 | $w_{2,2}[y] \rightarrow c_2$ |

In this example, $T_1$ is a local transaction; $T_2$ is global. The history is (trivially) in Local-SER-ECO but not in Local-CO.

Definition

71. Extended Timestamp Commitment Ordering Rule (ETCO): For any two global committed transactions $T_1$, $T_2$ such that $T_1 \Rightarrow T_2$, $ts(T_1)<ts(T_2)$ implies $e_1<e_2$. Formally: ($e_1=c$ and $e_2=c$ and ($T_1 \Rightarrow T_2$ or $T_2 \Rightarrow T_1$) and $ts(T_1)<ts(T_2)$) implies $e_1<e_2$.

Theorem

72. A history is in ECO if and only if it is generated by a mechanism that obeys both the TO and the ETCO rules. This follows from the definitions of TO, ETCO and ECO. The theorem above means that if the ETCO rule is being enforced by any TO mechanism, then only ECO histories are generated. The ETCO rule can be enforced by delaying commitment events when necessary to comply with the timestamp order.

Procedure

73. The following ECO procedure enforces the ECO property on RMs' histories. The ECO procedures are executed locally in each RM involved. This is done in a cooperation with a local concurrency control mechanism (any) that guarantees local serializability, and with an atomic commitment (AC) protocol that coordinates the RMs involved with global transactions. The ECO procedures maintain the GTCO Serializability Graph (GTCO-SG), that has transactions as nodes and conflicts among them as directed edges. A distinction is made between local and global transactions. GTCO-SG(H)=(GT,LT,C) where GT is the set of all undecided global transactions in a history H; LT is the set of the following local transactions: A local transaction is in LT if it is either undecided or it is committed and has a directed path from any undecided transaction; and C (a subset of (GT∪LT)×(GT∪LT) is the set of directed edges between transactions in GT∪LT. There is an edge from $T_1$ to $T_2$ if $T_2$ is in a conflict with $T_1$.

The set $ABORT_{ECO}(T)$ is defined to be the set of transactions aborted as a result of committing a global transaction T (to prevent future ECO violation). $ABORT_{ECO}(T)$ is constructed as follows: Let T" be a global or active transaction that has a directed path in the GTCO-SG to T (i.e T"⇒T) that does not go through any other transaction in GT. For every path from any such T" to T, $ABORT_{ECO}(T)$ includes exactly one transaction T' in GT ∪ LT such that either T' is T", or T' is an undecided (local) transaction such that T"⇒T' and T'⇒T, and if there exists a T'" such that T'⇒T'"⇒T, then T'" is either committed or ready. (Notes: If all the local transactions on the path above from T" to T are committed, then T'=T". T' is one of the following: The closest active neighbor of T on every path from T" to T; or a ready neighbor that does not have any active transaction on any path from T' to T. For every T in GT, there are usually several ways to select the set $ABORT_{ECO}(T)$(i.e., it is not uniquely defined). The set is selected in a way that minimizes the cost (using any criteria) of aborting its members. A special case that uniquely determines $ABORT_{ECO}(T)$, but less optimizes it, is selecting T' to be the closest undecided (active or ready) neighbor.

In order to enforce ECO locally, the following procedure enforces CDDC for any global transactions T' and T such that T' is in $ABORT_{ECO}(T)$.

A procedure that enforces ECO is as follows:

1) select any ready transaction (i.e., a transaction that has completed processing) T in the GTCO-SG (using any criteria, possibly by priorities assigned to each transaction; a priority can be changed dramatically as long as the transaction is in GTCO-SG).

2) if T is global and no YES vote has been issued (via an AC protocol) on any transaction in $ABORT_{ECO}(T)$(to comply with CDDC), then vote YES on T. Later, asynchronously, if T is committed by the AC protocol, abort all the transactions in the set $ABORT_{ECO}(T)$; remove T and the (possibly other) aborted transactions from the graph (they do not belong in the GTCO-SG by definition); remove all committed (local) transactions that do not have a path from any undecided transaction (such transactions do not belong in the GTCO-SG by definition).

3) else (i.e., if T is local), commit T (provided that the local serializability mechanism has previously requested this by notifying that T is ready, i.e., committing T does not result in a local serializability violation). Asynchronously, if T does not have a path from any undecided transaction, remove T from the GTCO-SG (it does not belong in the GTCO-SG by definition). (Note: During each iteration, the GTCO-SG should reflect all operations' conflicts of all its transactions until T is committed.)

Theorem

74. Histories generated by a scheduler that involves the above procedure are in ECO.

Proof: The proof is by induction on the number of iterations by the procedure, starting from an empty history $H_0$, and an empty graph GTCO-SG$_0$=GTCO-SG($H_0$). $H_0$ is in ECO. Assume that the history $H_n$, generated after iteration n, is in ECO. Now perform an additional iteration, number n+1, and commit transaction $T_1$ (without loss of generality—wlg) in GTCO-SG$_n$. $H_{n+1}$ includes all the transactions in $H_n$ and the new (undecided) transactions that have been generated after completing step n (and are in GTCO-SG$_{n+1}$). Examine the following cases after completing iteration n+1:

(i) Let $T_1$ be a local transaction. Since no edges in SG($H_{n+1}$) into a previously committed transaction could have generated, no new paths between global committed transactions could have been generated, and thus, $H_n$ being in ECO (induction hypothesis) implies that $H_{n+1}$ is also in ECO.

(ii) Now let $T_1$ be a global transaction. (a) Let $T_2$, $T_3$ (wlg) be two (previously) committed global transactions in $H_n$. If $T_2 \Rightarrow T_3$ then $c_2<c_3$ since $H_n$ is ECO by the induction hypothesis. (b) It is obvious that $c_2<c_1$ for every (previously) global committed transaction $T_2$ in $H_n$ such that $T_2 \Rightarrow T_1$. (c) Suppose that $T_1 \Rightarrow T_2$ where $T_2$ is a global (previously) committed transaction, that was committed in step j<n+1. When $T_2$ was committed, aborting all the transactions in $ABORT_{ECO}(T_2)$ means that either one of the following is true: $T_1$ was in $ABORT_{ECO}(T_2)$ and thus was aborted earlier, contrary to the fact that $T_1$ is the last committed transaction, or all the paths in GTCO-SG($H_{j-1}$) to $T_2$ from any global transaction have been disconnected when aborting the transactions in $ABORT_{ECO}(T_2)$, and no new paths could have been generated after $T_2$ was committed, especially paths from $T_1$ to $T_2$. Thus, $T_1 \Rightarrow T_2$ is impossible, and again we have reached a contradiction.

The cases above exhaust all possible pairs of global committed transactions in $H_{n+1}$ that are related through "$\Rightarrow_j$". Hence, $H_{n+1}$ is in ECO.

(Notes: In a multi RM environment, a RM's event scheduler typically receives a request via an AC protocol to vote on committing some global transaction T in the GTCO-SG (local transactions are decided by the RM). If the scheduler can commit the transaction it votes "YES" via AC, which is an obligation to either commit or abort according to the decision reached by the AC protocol. When the scheduler commits T, all transactions in $ABORT_{ECO}(T)$ need to be aborted by procedure 73. Thus, the scheduler has to delay its YES vote on T (enforcing CDDC), if it has voted YES on any transaction in $ABORT_{ECO}(T)$, since this can result in a contradiction (i.e., in a different commit order of the two transactions in another RM) if the AC protocol decides to commit both. If YES vote on T is possible, the scheduler may choose to do so immediately upon being requested (the non-blocking without delays approach), or to delay the voting for a given, predetermined amount of time (non-blocking with delays). During the delay, the set $ABORT_{ECO}(T)$ may become smaller or empty, since its members may be decided and removed from the GTCO-SG, and since $ABORT_{ECO}(T)$ cannot increase after T has reached the ready state. Instead of immediately voting, or delaying the voting for a given amount of time (which may still result in aborts), the scheduler can block the voting on T until $ABORT_{ECO}(T)$ is empty. However, if another RM in the environment also blocks, this may result in a global deadlock (e.g., if T' is in $ABORT_{ECO}(T)$ for one RM, and T is in $ABORT_{ECO}(T')$ for another Procedure 75. Recoverability can be enforced either by the local concurrency control mechanism that enforces CDDC for any transaction pair with "read from" conflicts, or by an enhancement of the ECO procedure. If recoverability (or ACA or ST) is enforced by the local CC mechanism, also the combined mechanism (i.e., the CC mechanism, together with the ECO procedure) guarantees it. If the local CC mechanism does not provide recoverability, the ECO procedure can be enhanced to guarantee it. In the modified procedure edges in the GTCO-SG that represent wr conflicts of a reading transaction with transactions that have written the last states read, are marked as wr edges (i.e., the GTCO-SG includes this additional information). To enforce recoverability, this wr conflict information is utilized as follows:

1) A transaction T with a marked wr conflict with a transaction T' is not committed before T' is committed; and 2) Whenever a transaction T is aborted, all the transactions T' that (recursively) have a marked wr conflict with T are aborted as well (cascading aborts). These transactions are defined by the following $ABORT_{REC}(T)$ set: $ABORT_{REC}(T) = \{T' | T'$ is in a marked wr conflict with T, or T' is in a marked wr conflict with some T''' in $ABORT_{REC}(T)\}$.

The following is the modified ECO-Recoverability procedure. The modifications are emphasized:

Repeat the following steps:

1) Select any ready transaction (i.e., a transaction that has completed processing) T in the GTCO-SG (using any criteria, possibly by priorities assigned to each transaction; a priority can be changed dynamically as long as the transaction is in GTCO-SG), that does not have any marked wr conflicts with any undecided transaction (in GTCO-SG).

2) If T is global and no YES vote has been issued (via an AC protocol) on any transaction in $ABORT_{ECO}(T)$, then vote YES on T. Later, asynchronously, if T is committed (by the AC protocol), abort all the transactions in the set $ABORT_{ECO}(T)$ and in the sets $ABORT_{REC}(T')$ for every T' in $ABORT_{ECO}(T)$; if T is aborted, abort also all transactions in $ABORT_{REC}(T)$; remove T and the (possibly other) aborted transactions from the graph (they do not belong in the GTCO-SG by definition); remove all committed (local) transactions that do not have a path from any undecided transaction (such transactions do not belong in the GTCO-SG by definition).

3) Else (i.e., if T is local), commit T (provided that the local serializability mechanism has previously requested this by notifying that T is ready, i.e., committing T does not result in a local serializability violation. Asynchronously, if T does not have a path from any undecided transaction, remove T from the GTCO-SG (it does not belong in the GTCO-SG by definition).

(Notes: During each iteration, the GTCO-SG should reflect all operations' conflicts of all its transactions until T is committed. If a local transaction T is (asynchronously) aborted by the scheduler, rather than becoming ready, then also the transactions in $ABORT_{REC}(T)$ are aborted, and the aborted transactions are removed from the GTCO-SG).

The following is an example of optimizing the abort set $ABORT_{ECO}(T)$. Suppose that every transaction T in the ECO-SG is assigned with a priority, defined by a cost function C(T)(taking real values).

The optimization problem for the ABORT(T) set, where T is global, is the following:

Select ABORT(T) such that $\Sigma_{T' \in ABORT(T)} C(T') = $ Minimum

This problem is reduced to the Maximum Flow in a Network problem.

A network N(T) is constructed from the ECO-SG as follows:

The committed transaction T is the sink node.

A new node, $T_0$ is the source. A new edge $(T_0, T')$ are introduced for every T' that is either global (and undecided), or active, local.

Every node V in the ECO-SG other than T is replaced with two nodes: $V_{in}$ and $V_{out}$. All the in-coming edges to V enter $V_{in}$; all the out-going edges from V leave $V_{out}$. There is an edge $(V_{in}, V_{out})$ from $V_{in}$ to $V_{out}$.

Capacities c(V,V') are assigned to each edge (V,V') in N(T). For edges that should be a-priori out of the minimum capacity cut (minimum cut) we assign "infinite" capacities denoted $\infty$. Practically, a large value like the sum of all the transaction priorities in the ECO-SIG is sufficient for $\infty$. Capacities are assigned as follows:

$c(T_0, V_{in}) = \infty$    for any V.

$c(V_{out}, V'_{in}) = \infty$    for any V, V'.

$c(T_{in}, T_{out}) = \infty$    for any decided T (I.E., local, committed)

$c(T_{in}, T_{out}) = C(T)$    for every undecided T.

Note that there is no "infinite" capacity path from $T_0$ to T. The optimal ABORT(T) is the following: ABORT (T)={T' | the edge $(T'_{in}, T'_{out})$ is in the minimum cut of N(T)}

Note that due to the "infinite" capacities only $(V_{in}, V_{out})$ edges can be members of the minimum cut. Procedures for computing the minimum cut of N(T), and thus the optimal ABORT(T), can be found in Shimon Even, Graph Algorithms, Computer Science Press, 1979.

Theorem

76. Histories generated by a scheduler that involves procedure 75 are in both ECO and REC.

Proof: The arguments given in the proof of theorem 74 for procedure 73 hold true also for procedure 75, and thus, histories generated by procedure 75 are in ECO.

The discussion above, describing the modifications in procedure 73 explains how recoverability is maintained after each iteration of procedure 75. Thus, only recoverable histories are generated by the procedure.

Definitions:

77. Theorem 68 implies that if all the RMs in the environment provide (local) serializability (i.e., the global history is in Local-SER), and are coordinated via AC protocols, then Local-ECO is a sufficient condition for global serializability (SER).

We now show that if Local-SER is applied, and all the RMs in the environment have the extended knowledge autonomy property (i.e., the RMs are coordinated solely via AC protocol, and can identify local transactions), then Local-ECO is also a necessary condition for guaranteeing global serializability (SER).

Theorem:

78. If all the RMs in the environment have the extended knowledge autonomy property, and each of them provides (local) serializability (i.e., the global history is in Local-SER), then guaranteeing Local-ECO is a necessary condition for guaranteeing global serializability (SER).

Proof: Suppose that guaranteeing Local-ECO is not necessary for guaranteeing global serializability under the conditions above. Let Y be the most general history property (class) that is necessary. Since under the conditions above Local-ECO is a sufficient condition, the following is true:

(i) Y⊃ECO (strict containment; if Y=ECO, then guaranteeing ECO is the necessary property, contrary to our assumption above).

The above assumption, together with theorem 68 imply:

(ii) SER⊃Local-Y∩Local-SER⊃Local-ECO∩Local-SER.

Suppose that the environment includes two RMs that generate local serializable histories: Rm 1 that generates histories in Y, and RM 2 that generates histories in ECO, which are also in Y (by (i)). Hence, all the global histories generated are in Local-Y (by definition of Local-Y) as well as in Local-SER, and thus also in SER (by (ii)).

We now schedule transactions in the environment above in such a way that the following global history H is generated:

It includes two global transactions $T_1$, $T_2$ where $c_2 < c_1$, with the following characteristics:

$w_{1,1}[x] < w_{2,1}[x]$, i.e. $T_1 \Rightarrow T_2$, which is possible since $H_1$ is in Y by the assumption above, and not necessarily in ECO (by i; otherwise Y collapses to ECO, and (i) is contradicted).

$w_{2,2}[x] < w_{1,2}[x]$, i.e. $T_2 \Rightarrow T_1$ as should exist since $H_2$ is in ECO by the assumption above.

$T_1 \Rightarrow T_2$ and $T_2 \Rightarrow T_1$ imply that CSG(H) has a cycle, i.e., H is not in SER (theorem 2.1) and we have reached a contradiction.

Hence, guaranteeing ECO is a necessary condition.

Corollary:

79. Local ECO and local serializability (Local-SER-ECO) is a necessary and sufficient condition for guaranteeing (global) serializability in an environment of RMs that have the extended autonomy property. (This is concluded from theorems 68 and 78.)

Conclusion:

80. These proofs show that applying ECO locally in each RM that participates in global transactions via atomic commitment (AC) protocols guarantees global serializability in a multi Resource Manager (RM) environment. ECO in this environment optimizes the RMs' concurrency control, and can be implemented as non-blocking (optimistic) mechanisms. Because ECO can be enforced locally in each RM, no change in existing atomic commitment protocols and interfaces is required to utilize the ECO solution to the global serializability problem. The only additional knowledge that a RM needs to implement ECO is that about its local transactions. Therefore, ECO is a practical solution for the global serializability problem in a high-performance, distributed transaction processing environment.

APPENDIX II

Commitment Ordering Based Distributed Concurrency Control for Bridging Single and Multi-Version Resources Multi version (MV) based database systems allow queries (read-only transactions) to be executed without blocking updaters (read-write transactions), or being blocked by them. Such systems become more and more common. In a multi database environment, transactions may span several single version (SV) based database systems, as well as MV based ones. The database systems may implement various concurrency control techniques. It is required that a globally correct concurrency control is guaranteed.

Commitment Ordering (CO) is a serializability concept, that allows global serializabilitV to be effectively achieved across multiple autonomous Resource Managers (RMs; e.g., database systems). The RMs may use different (any) concurrency control mechanisms. Thus, CO provides a solution for the long standing global serializability problem. For MV resources, the correctness criterion that corresponds to serializability is one-copy serializability (1SER). CO also allows to effectively achieve global 1SER. This work provides a theoretical framework to deal uniformly with both SV and MV resources. Generic distributed CO procedures, which guarantee the 1SER property over multiple REs with mixed, SV and MV resources are presented. It is also shown, that CO is a necessary condition for guaranteeing 1SER over multiple autonomous RMs with mixed resources.

1 Introduction

Multi version (MV) based database systems allow queries (read-only transactions) to be executed without blocking, or being blocked by updaters (read-write transactions). Such systems become more and more common (e.g., [Ragh 91], [Rdb/VMS], [Oracle], [InterBase]). Various mechanisms for implementing this idea have been proposed (e.g., [Agra 89], [Agra 92], [Bobe 92a], [Bobe 92b], [Chan 85], [Garc 82], [Moha 92], [Weih 87]). These mechanisms, which are inherently based on transient multi versioning (i.e., several last versions of a data item/object are maintained), implement special data access strategies for queries, that do not interact, or loosely interact with the access strategies for updaters, but provide an overall correct concurrency control. A vast literature on concurrency control over multiple single version (SV) based database systems exists (e.g., [Brei 91], [Elma 87], [Geor 91], [Litw 89], [Pu 88], and [Veij 92]). However, in a multi database environment transactions may span several SV based database systems, as well as MV based systems. The database systems may implement various concurrency control techniques. It is required that a globally correct concurrency control is guaranteed in such environments. This work provides generalizations for multi mixed MV and SV based databases. The work does not concentrate on any specific MV mechanism, but rather shows how to integrate various (any) such techniques, including SV based, in heterogeneous environments of multi databases.

Commitment Ordering (CO, [Raz 92]) is a serializability concept that allows global serializability to be effectively achieved across multiple autonomous Resource Managers (RMs; e.g., database systems, recoverable objects, etc.) that may use different (any) concurrency control mechanisms. Thus, CO provides a solution for the long standing global serializability problem (e.g., [Shet 90], [Silb 91]). ([Brei 91] redefines CO, naming in strong recoverability (this property was introduced there in the last revision of the paper, Apr.

18, 1991), and uses CO to show (the previuosly known result; e.g., [Pj 88] that applying rigorousness (named S-S2PL in Appendix I, above) locally implies global serializability.) CO is based on ordering transactions' commit decision events by the order of respective conflicting resource access operations. In this work we use the notion of transactions in conflicts defined and generalized for MV resources. The generalized definition allows to view SV resources as a special case of MV ones, and deal with both within a common theoretical framework. For MV resources, the correctness criterion, that corresponds to serializability (SER), is one-copy serializability (1SER; see for example, [Bern 87]). In this work we show that CO also allows to effectively achieve global 1SER over mixed SV and (non-SV) MV resources, or mixed SV and MV RMs in a multi RM (distributed) environment. Generic distributed CO procedures, which guarantee the 1SER property over multiple RMs with mixed resources (some RMs may be either SV or MV based), are presented. Appendix I, above, shows that CO is a necessary condition for guaranteeing global serializability over multiple autonomous SV based RMs. Similarly, CO is also a necessary condition for guaranteeing 1SER over multiple autonomous RMs with mixed resources.

We define a RM to be (concurrency control) autonomous, if it does not share any resources and concurrency control information (e.g., timestamps) with another entity (external to the RM), and is being coordinated at the nonapplication level) with other RMs solely via Atomic Commitment (AC) protocols. (For other definitions/types of autonomy see for example [Garc 88]) This notion of autonomy is useful, since a RM is typically unaware of any resource state dependency with states of resources external to the RM (cross RM integrity constraints), implied by applications. This is also true in the cases where RMs are coordinated by multi-database systems, which provide applications with integrated views of resources. AC protocols are needed to achieve global atomicity. Atomicity means that either a distributed transaction is committed, i.e., its effects on all the resources involved become permanent, or it is aborted (rolled back), i.e., its effects on all the resources are undone. Since atomicity is an inherent property of a transaction (we do not deal here with transaction models that compromise atomicity), AC protocols are essential for multi RM transactions. Thus, by our definition of autonomy, guaranteeing global serializability across autonomous RMs means achieving this goal by using the minimum RM coordination (communication) possible. The most commonly used atomic commitment protocols are variants of the Two Phase Commitment protocol (2PC—[Gray 78], [Lamp 76]).

This work provides generalizations for MV based resources of the results in Appendix I. Correctness is guaranteed by updaters complying with CO (i.e., the generated histories' projections on updaters are in the class CO, and thus in 1SER) to guarantee consistent resources (e.g., databases), while queries using either CO, or any other access strategy (e.g., by timestamps) that provides correct results. queries may implement various consistency levels, that may either comply to, or relax 1SER, as described in [Bobe 92b].

The MV 2PL based protocols described in the literature above are CO compliant. [Agra 92] provides performance results for centralized, MV based, non-2PL locking protocols, that are CO compliant as well (see there ordered sharing locking with before image, for the special case when locks are released at transaction end), and well motivate CO, even in the single RM case.

Section 2 presents a theory framework to deal with transactions and histories over mixed single-version and multi-version resources. Section 3 defines CO and shows that it implies 1SER, and section 4 presents centralized procedures for enforcing CO. Section 5 provides distributed CO protocols, and section 6 proves that CO is a necessary and sufficient condition for guaranteeing global 1SER over autonomous RMs. Section 7 provides a conclusion.

2 Concurrency Control for Mixed Multi and Single Version Resources

This section reformulates known concepts and results of concurrency control theory for multi version (MV) resources (see also [Bern 87]). The presentation here differs from other texts on MV scheduling (e.g., [Bern 87]) mainly in the way conflicting operations are defined. The approach presented here allows single version (SV) resources to be viewed as a special case of MV ones. SV resources allow transactions to read their last existing version only. The model and history properties discussed here are a generalization for MV resources of respective parts in Appendix I, above ([Raz 92]).

2.1 MV Transactions and Histories

For a multi-version (MV) resource, a new resource version (state) is generated by each write operation of the resource, and the various versions persist, and can be read independently (e.g., see [Bern 87]). The versions of each resource are totally ordered by the order of their generation. A multi version resource is single-version (SV), if only the last version that exists can be read (i.e., a SV resource is a special case of a MV one).

It is common that a RM supports either SV or non-SV, MV resources, but not both types. However, it is possible, in principle to have a RM supporting both types. Some RMs that support non-SV resources allow dual resource-access mode: either as SV, or non-SV resources. The first mode is used for updaters (i.e., transactions that modify resources), and the latter to support queries (read-only) transactions (i.e., transactions that do not modify resources; e.g. see snapshots in [Rdb/VMS]).

A transaction, informally, is an execution of a set of programs that access shared resources. It is required that a transaction is atomic, i.e., either the transaction completes successfully, and its effects on the resources become permanent, or all its effects on the resources are undone, i.e., related versions disappear or become inaccessible. In the first case, the transaction is committed. In the second, the transaction is aborted. (The term permanent is relative and depends on a resource's volatility (e.g., sensitivity to process or media failure).)

Formally, we use for the notion of a transaction an abstraction that captures only events and relationships among them, that are necessary for reasoning about concurrency control.

A single RM transaction $T^i$ is a partial order of events (specific events within the above informally defined transaction).

The (binary, asymmetric, transitive, irreflexive) relation which comprises the partial order is denoted "$<_i$".

Remarks:

event$_a <_i$ event$_b$ reads: event$_a$ precedes event$_b$ (in $T_i$).

The subscript i may be omitted when the transaction's identity is known from the context.

The events of interest are the following:

The operation of reading a resource; $ri_{[xj]}$ denotes that transaction Ti has retrieved (read) the version (state) of the resource x written by transaction $T_j$.

The operation of writing a resource; $wi_{[xi]}$ means that transaction $T_i$ has modified (written) the state of the resource x, generating a new version (state) $x_i$.

Ending a transaction; $e_i$ means that $T_i$ has ended (has been either committed or aborted) and will not introduce any further operations.

More event types such as locking and unlocking may be introduced when necessary.

A transaction obeys the following transaction rules (axioms):

TR1 A transaction $T_i$ has exactly a single event $e_i$. A value is assigned to $e_i$: $e_i=c$ if the transaction is committed; $e_i=a$ if the transaction is aborted. Notation: $e_i$ may be denoted $c_i$ or $a_i$ when $e_i=c$ or $e_i=a$, respectively.

TR2 For any operation $p_i[x_j]$ (either $r_i[x_j]$ or $w_i[x_j]$) $pi[x_j]<_i e_i$ Transaction states (in addition to committed and aborted) are defined as follows:

A transaction is decided, if it is either aborted or committed; otherwise, it is undecided.

An undecided transaction is ready if it has completed its processing, and is prepared either to be committed or aborted; otherwise it is active.

The following diagram defines the possible transitions between states:

FIG. 2.1: Transaction States and Their Transitions

The notion of conflicting operations plays a central role in serializability theory. Traditionally only write-read conflicts (e.g., [Bern 87]) are defined for MV resources. Here we deviate from the common definitions, and define conflicting operations as follows: If $T_i$ and $T_j$, $i \neq j$, are in T, then the operations in the following pairs are conflicting (if both exist):

$w_i[x_i]$, $r_j[x_i]$, $i \neq j$.

$w_i[x_i]$, $r_j[x_l]$, $l \neq i$, $i \neq j$.

$w_i[xi]$, $w_j[x_j]$, $i \neq j$.

A complete (MV) history H over a set T of transactions is a partial order with a relation $<_H$ defined according to the following history rules (axioms):

HIS1 If $T_i$ is in T and $event_a <_i event_b$, then $event_a <H event_b$

HIS2 If $T_i$ and $T_j$ and $T_l$ are in T then the following precedence relationships exist between conflicting operations:

If $r_j[x_i]$, $i \neq j$, exists, then $w_i[x_i]<r_j[x_i]$.

If $r_j[x_l]$ and $w_i[x_i]$, $l \neq i$, $i \neq j$ exist, then either $w_i[x_i]<r_j[x_l]$ or $r_j[x_l]<w_i[x_i]$ is true.

If $w_i[x_i]$ and $w_j[x_j]$, $i \neq j$ exist, then either $w_i[x_i]<w_j[x_j]$ or $w_j[x_j]<w_i[x_i]$ is true.

HIS3 Let $T_i$, $T_j$ be transactions in T, where $e_i=a$. Then if $r_j[x_i]$ exists, then $r_j[x_i]<_H e_i$ (After $T_i$ is aborted, $x_i$ is inaccessible, i.e., practically does not exist).

Remark: The subscript H in $<_H$ may be omitted when H is known from the context.

For modeling executions with incomplete transactions, we define a history to be any prefix of a complete history. A prefix of a partial order P over a set S is a partial order P' over a set $S' \subset S$, with the following properties:

If $b \in S'$ and $a<_p b$ if and only if $a<_p b$.

2.2 Correct Histories—1SER and REC

Transaction conflicts are redefined for the MV case. Like in the pure SV case, also here ww and wr transaction conflicts have a correlation with time-precedence between respective operations. However, for the MV case rw conflicts are determined solely by the version read, regardless of the time of reading, i.e., a rw conflict can occur even if the read operation takes place after the respective write operation. Conflicts between transactions are redefined as follows: $T_j$ is in conflict with $T_i$ in the following cases:

If $r_j[x_i]$, $i \neq j$, exists, or if $r_j[x_l]$ exists, and $w_i[x_i]<w_l[x_l]$, $l \neq i$, $i \neq j$, then $T_j$ is in a wr (write-read) conflict with $T_i$ (on x). A special case: If $r_j[x_i]$, $i \neq j$, exists, we say that $T_j$ reads (x) from $T_i$, or $T_j$ is in a wrf (read-from) conflict with $T_i$ (on x).

If $r_i[x_i]$ exists, and $w_i[x_i]<w_j[x_j]$, $l \neq i$, $i \neq j$, then $T_j$ is in a rw (read-write) conflict with Ti (on x).

If $w_i[x_i]<w_j[x_j]$, $i \neq j$, then $T_j$ is in a ww (write-write) conflict with $T_i$ (on x).

A conflict equivalence exists between two histories H and H' (the two are conflict equivalent) if they are both defined over the same set of transactions T, and consist of the same transaction events (for partially executed transactions), and $T_j$ is in a (rw or wr or ww) conflict with $T_i$ in H, due to operations $p_i[x_k]$, $q_j[x_l]$, if and only if $T_j$ is in a conflict with $T_i$ in H', due to the same operations, for any conflicting operations $p_i[x_k]$, $q_j[x_l]$ of any committed transactions $T_i$, $T_j$, respectively, in T (i.e., H and H' have the same conflicts between operations of committed transactions).

A history H over a transaction set T is serial, if for every two transactions $T_i$, $T_j$ in T all the operations and $e_i$, the end of $T_i$, precede all the operations and $e_j$, the end of $T_j$ (i.e., if $p_i[x_k]<_H q_j[y_l]$ then for any operations $s_i[u_m]$, $t_j[v_n]$ in H, $s_i[u_m]<_H t_j[v_n]$, and $e_i<_H t_j[v_n]$).

The commit projection of a history H, is its projection (restriction) on its set of committed transactions. Let P be a partial order over a set S. A projection (restriction) of P on a Set $S'' \subset S$ is a partial order P', a subset of P, that consists of all the elements in P, involving elements of S' only.

A serial history is one-copy serial (1-serial), if for all i, j, and x, if $T_i$ reads x from $T_j$, then i=j, or $T_j$ is the last transaction preceding $T_i$ that writes x ([Bern 87]).

A history is one-copy serializable (1SER), if its commit projection is conflict-equivalent with a 1-serial history.

In our model Serializability (SER) is defined for SV histories, i.e., histories over transactions that access SV resources only. For SV histories serializability is defined here to be identical to one-copy serializability. This definition properly positions 1SER as a generalization of SER for mixed SV and non-SV resources, and as the correctness criterion for MV histories analogous to SER for SV histories.

The Serializability Graph of a history H, SG(H), is the following directed graph:

SG(H)=(T, C)

where

T is the set of all unaborted (i.e., committed and undecided) transactions in H.

C (a subset of T×T) is a set of edges that represent transaction conflicts: Let $T_1$, $T_2$ be any two transactions in T. There is an edge from $T_1$ to $T_2$ if $T_2$ is in a conflict with $T_1$.

The Committed Transaction Serializability Graph of a history H, CSG(H), is the subgraph of SG(H) with all the committed transactions as nodes and all the respective edges.

The Undecided Transaction Serializability Graph of a history H, USG(H), is the subgraph of SG(H) with all the undecided transactions as nodes and all the respective edges.

Theorem 2.1 provides a criterion for checking one-copy serializability.

Theorem 2.1—The One Copy Serializability Theorem

A MV history H is one-copy serializable (1SER) if and only if CSG(H) is cycle free.

Proof outline:

CSG(H) as defined here is similar to the graph MVSG (H,<<) defined in [Bern 87] (except for transaction conflicts involving unread versions). It is shown there that one-copy serializability of H is a necessary and sufficient condition for the acyclicity of MVSG(H,<<). The same proof applies here. The same criterion holds true for serializability:

Corollary 2.1—The Serializability Condition (e.g., [Bern 87])

A single version history H is serializable (SER) if and only if CSG(H) is cycle-free.

Recoverability (REC; special cases: cascadelessness (ACA—avoiding cascading aborts), strictness; see [Bern 87], [Hadz 88], is an essential property of histories when aborted transactions are present (i.e., in all real situations). Recoverability guarantees that committed transactions read only resource versions (states) written by committed transactions, and hence, no committed transactions read corrupted (aborted) versions, which later become inaccessible.

2.3 Updaters vs. Queries

Only updaters (read-write transactions), which modify resources, determine the resources' consistency. However, also queries (read-only transactions), need to provide consistent results. Non-SV, MV resources allow to achieve 1SER in higher concurrency and performance than with SV resources, by serializing queries before updaters (e.g., [Agra 89], [Agra 92], [Bobe 92a], [Bobe 92b], [Chan 85], [Moha 92], [Weih 87]).

2.3.1 Updaters

Updaters employ any access strategy/mechanism that guarantees 1SER and recoverability. The solutions referenced above implement locking for updaters, and most of them guarantee strictness.

2.3.2 Queries

Performance gain is achieved by enforcing queries to access already committed resource versions, and thus avoiding them from blocking updaters, or being blocked by updaters due to locks.

This also implies that no query is involved in a deadlock and needs to be aborted.

The common mechanism for queries (e.g., see the references above), which guarantees 1SER (e.g., [Bern 87]), implements timestamps (members of any totally ordered set). Each updater is assigned with a timestamp upon logging the commit decision. This timestamp is used to timestamp all the resource versions committed by that updater. Each query is assigned with a timestamp upon starting. A query reads committed resource versions, that are timestamped with the latest timestamp that is still earlier than the query's timestamp. This means that for each resource versions older than the latest version, that is younger (by timestamp) than the oldest running query, can be garbage-collected (transient multi versioning).

[Bobe 92b] and [Garc 82] describe correctness criteria (consistency levels, which define different history properties) for queries, that generalize (and may violate) 1SER. However, 1SER is maintained for updaters (i.e., the histories' projections on updaters are 1SER). [Bobe 92b] presents mechanisms for implementing the generalized criteria, and shows that being less constraining than 1SER, they provide additional performance gain.

3 Commitment Ordering (CO)

Commitment Ordering (CO) is a property of histories that guarantees 1SER. A history is CO if the order induced by the conflicts between any two committed transactions matches the order of their commit events.

CO allows access by conflicting operations, while using any access scheduling strategy. This allows CO to be implemented also in a non-blocking manner (optimistic; see [Kung 81]), which guarantees deadlock-freedom. The price for this, however, is the possibility of cascading aborts when recoverability is applied.

Definition 3.1

A history is in CO, if for any committed transactions $T_1$, $T_2$, whenever $T_2$ is in a conflict with $T_1$, then $e_1 < e_2$.

Formally: ($e_1 = c$ and $e_2 = c$ and ($T_2$ is in a conflict with $T_1$)) implies $e_1 < e_2$.

CO implies 1SER (proving this is almost identical to proving that CO implies SER; see Appendix I, above.

Theorem 3.1

1SER⊃CO (strict containment).

Note that the interpretation of the commit event is flexible. The commit event is typically considered the commit decision logging event. In a multi RM environment this event usually occurs in a system component that executes an atomic commitment (AC) protocol (typically named transaction manager, TM; see more in section 5 below).

4 Commitment Ordering Scheduling

This sections describes a generic CO procedure which provides procedural characterizations for the property CO. Though this procedure is applicable to all the transactions involved, in a MV environment it is possible to apply CO to updaters only, while allowing queries to use different scheduling strategies (as described in section 2.3). In this case only the histories' projections on updaters are in CO.

The Commitment Order Coordinator (COCO) is a component of a RM's scheduler that guarantees generating CO histories. The generated histories are not necessarily recoverable. Recoverability, if required, can be applied by enhancing the COCO or by an external mechanism (see more below).

A COCO maintains a serializability graph, the USG, of all undecided transactions. Every new transaction processed by the RM is reflected as a new node in the USG; every conflict between transactions in the USG is reflected by a directed edge (an edge between two transactions may represent several conflicts).

USG (H)=(UT,C)

where

UT is the set of all undecided transactions in a history H

C (a subset of UT×UT) is the set of directed edges between transactions in UT. There is an edge from $T_1$ to $T_2$, if $T_1$ is in a conflict with $T_1$.

The set of transactions in the USG, aborted as a result of committing a transaction T (to prevent any future commitment ordering violation) is defined as follows:

$ABORT_{CO}(T)=\{T'|$ The edge $T\rightarrow T'$ is in $C\}$

These aborts cannot be compromised, as stated by lemma 4.1:

Lemma 4.1 Aborting all the members of $ABORT_{CO}(T)$, after T is committed, is necessary for guaranteeing CO (assuming that every transaction is eventually decided).

Proof: Suppose that T is committed. Let T' be some transaction in $ABORT_{CO}(T)$. Thus T' is undecided when T is committed. If T' is later committed, then c<<c', where c and c' are the commit events of T and T' respectively. However, T is in a conflict with T', and thus, CO is violated.

Lemma 4.1 is the key for the CO procedure, executed by the COCO.

Procedure 4.1—The CO Procedure

Repeat the following steps:

Select any transaction in the ready state (i.e., a transaction that has completed processing) T in the USG (using any criteria, such as by priorities assigned to each transaction; a priority can be changed dynamically as long as the transaction is in the USG), and commit it.

Abort all the transactions in the set $ABORT_{CO}(T)$, i.e., all the transactions (both ready and active) in the USG that have an edge going to T.

Remove any decided transaction (T and the aborted transactions) from the graph (they do not belong in the USG by definition).

Remark: During each iteration the USG should reflect all operations' conflicts until commit.

For MV resources incoming edges can be generated in the serializability graph for ready and committed transactions (this is impossible for the SV case). Thus, for MV resources the condition in lemma 4.1, implemented by the CO procedure, is necessary, but not sufficient for guaranteeing CO. The following condition provides the required additional restriction:

Definition 4.1—The Multi Version Commitment Ordering condition

MVCO No committed version older than the last committed version is read. (However, uncommitted versions may be read without any restriction.)

Note that MVCO is always true for SV resources.

The next theorem defines under what conditions the CO procedure is correct.

Theorem 4.1

The CO procedure (procedure 4.1) generates CO, MV histories only (guarantees CO), if and only if MVCO is maintained.

Proof:

(i) If MVCO is maintained, then all the histories generated are proven to be in CO, i.e., CO is guaranteed:

This claim is proven by induction on the number of iterations by the procedure, starting from an empty history $H_0$, and an empty graph $USG_0=USG(H_0)$. $H_0$ is in $C_O$. Assume that the history $H_n$, generated after iteration n, is in CO. $USG_n$ (in its UT component) includes all the undecided transactions in $H_n$. Now perform an additional iteration, number n+1, and commit transaction $T_1$ (without loss of generality—wlg) in $USG_n$. $H_{n+1}$ includes all the transactions in $H_n$ and the new (undecided) transactions that have been generated after completing step n (and are in $USG_{n+1}$).

Examine the following cases after completing iteration n+1:

Let $T_2$, $T_3$ (wlg) be two committed transactions in $H_n$. If $T_3$ is in a conflict with $T_2$ then $c_2<c_3$ since $H_n$ is in CO by the induction hypothesis.

Obviously, $c_2<c_1$ for every (previously) committed transaction $T_2$ in $H_n$ with which $T_1$ is in a conflict.

Suppose that a committed transaction $T_2$ is in a conflict with $T_1$. If the conflict is ww or wr then $T_1$ is in $ABORT_{CO}(T_2)$, and thus aborted when $T_2$ was committed earlier. A contradiction. If the conflict is rw, assume (wlg) that the conflict is on resource x. If $r_1[x_i]<w_2[x_2]$ then the case of ww and wr conflicts applies, and we reach the same contradiction. Suppose that $w_2[x_2]<r_1[x_i]$. Since for having a rw conflict $w_i[x_i]<w_2[x_2]$ is true (see the definition of a rw conflict in section 2.2), the operation $r_1[x_i]$ does not represent reading the last committed version of x, and thus MVCO is violated. A contradiction.

The cases above exhaust all possible pairs of conflicting committed transactions in $H_{n+1}$. Hence, $H_{n+1}$ is in CO.

(ii) Suppose that the condition above is not always maintained. Then, the following scenario is possible: Suppose that the USG has a single node $T_k$. Let $x_i$ be the last committed version of x, and $x_j$ the previous committed version. Suppose that $T_k$ reads versions $x_j$ and $z_i$, and then is being committed. Let H be the history at that stage. By the definitions of conflicts (section 2.3.1) the following conflicts exist:

$T_k$ is in wr conflicts with $T_i$ (reading $z_i$) and $T_j$ (reading $x_j$).

$T_i$ is in a rw conflict with $T_k$, since $r_k[x_j]$ exists, and $w_j[x_j]<w_i[x_i]$.

Since $T_i$ is a committed transaction as well, CSG(H) has the edges $T_k \rightarrow T_i$ and $T_i \rightarrow T_k$. Hence, CSG(H) has a cycle, and by theorem 2.1 H is not in 1SER. Thus, H is not in CO by theorem 3.1, and CO is not guaranteed.

The version of the CO procedure (procedure 4.1), applied to transactions that obey MVCO, is referred to as the MVCO procedure. By theorems 3.1 and 4.1 we conclude corollary 4.1:

Corollary 4.1

The MVCO procedure generates 1SER histories only (guarantees 1SER).

Note that aborting the transactions in $ABORT_{CO}(T)$ when committing T prevents any cycle involving T being generated in the CSG in the future. This observation is a direct way to show that the procedure 4.1 guarantees 1SER. If a transaction exists, that does not reside on any cycle in the USG, then a transaction T exists with no incoming edges from any other transaction. T can be committed without aborting any other transaction since $ABORT_{CO}$ (T) is empty. If all the transactions in the USG are on cycles, at least one transaction has to be aborted when committing another one. If the COCO is combined with a scheduler that guarantees (local) 1SER, cycles in the USG are either prevented, or eliminated by the scheduler aborting transactions.

The COCO is completely passive regarding the access strategy implemented by the scheduler. Thus, any concurrency control can be utilized as long as the COCO is updated with conflict information.

Recoverability (or cascadelessness (ACA) or strictness; see [Bern 87], [Hadz 88]) can be enforced either by the local concurrency control mechanism or by an enhancement of procedure 4.1. If recoverability (cascadelessness, strictness)

is enforced by the local concurrency control mechanism, also the combined mechanism (i.e., the concurrency control mechanism together with the CO procedure) guarantees it (see the recoverability inheritance theorem in Appendix I, above). Like procedure 4.1, also the enhanced procedure is correct for MV resources, provided that the MVC0 condition is maintained.

Cascadelessness is guaranteed if no write-read conflicts (wr; section 2.2) are reflected in the USG. The following condition, a special case of MVCO, guarantees cascadelessness when applied with the CO procedure:

Definition 4.2—The Multi Version Cascadelessness condition

MVACA Whenever a resource is read, its last committed version is read.

Note that the MVACA condition applied to queries also guarantees that they are serialized before updaters, exploiting the benefits of multi-versioning for CO.

5 Multi RM Environment

A multi RM transaction consists of one or more local subtransactions. A local subtransaction is the portion of a transaction within a single RM1. (Local subtransactions reflect transaction partitioning over RMs, and are independent of possible transaction partitioning to nested subtransactions by an application.) A local subtransaction obeys the transaction rules and has states as defined in section 2. It is assumed that an atomic commitment (AC) protocol is applied to guarantee atomicity across the local subtransactions.

An AC protocol implements the following general scheme each time a transaction is decided:

AC Each participating RM votes either YES or NO (also absence of a vote within a specified time limit may be considered NO) after the respective local subtransaction has reached the ready state, or votes NO if unable to reach the ready state. The transaction is committed by all RMs if and only if all have voted YES. Otherwise it is aborted by all the RMs.

The YES vote is an obligation to end the local subtransaction (commit or abort) as decided by the AC protocol. After voting YES the RM cannot affect the decision anymore. The fact that AC is used allows one to assume that like in the single RM case, also a distributed (committed) transaction has a single commit event, interpreted as logging the commit decision, which is executed by the AC protocol (in a distributed Transaction Manager, TM, component) for global transactions (i.e., transactions that span two or more RMs). Each RM applies by itself the commit decisions to its local transactions. This means that all participating RMs, that enforce a certain commit decision order (which can be applied also for global transactions; see below), view (portions of) the same commitment (partial) order of commit decision events. By theorem 3.1 this implies global 1SER.

5.1 Distributed CO Procedures

In a multi RM environment, the COCO described in section 4 also votes on behalf of its RM in AC protocols. The COCO typically receives a request, via an AC protocol to commit some transaction T in the USG. If the COCO can commit the transaction, it votes YES via AC, which is an obligation to either commit or abort according to the decision reached by the AC protocol. When the COCO commits T, all transactions in ABORT$_{CO}$(T) need to be aborted (by lemma 4.1). Thus the COCO has to delay its YES vote on T, if it has voted YES on any transaction in ABORT$_{CO}$(T), since not delaying the YES vote can result in a contradiction if the AC protocol decides to commit both (Note that committing first T' in ABORT$_{CO}$(T), and then committing T is not sufficient, since T can be in ABORT$_{CO}$(T') in another RM, and committing both will result in a global serializability violation. By similar arguments the COCO cannot vote YES on T, if T is in ABORT$_{CO}$(T') for some T' on which it has already voted YES. If YES vote on T is possible, the COCO may either choose to do so immediately upon being requested (the non-blocking without delays approach), or to delay the voting for a given, predetermined amount of time (non-blocking with delays). During the delay the set ABORT$_{CO}$(T) may become smaller or empty, since its members may be decided and removed from the USG. For SV resources ABORT$_{CO}$(T) cannot increase after T has reached the ready state. Instead of immediately voting, or delaying the voting for a given amount of time, which may still result in aborts, the COCO can block the voting on T until all transactions in ABORT$_{CO}$(T) are decided. However, if another RM in the environment also blocks, this may result in a global deadlock (e.g., if T is in ABORT$_{CO}$(T) for one RM, and T is in ABORT$_{CO}$(T') for another RM). Aborting transactions by timeout is a common mechanism for resolving such deadlocks. Controlling the timeout by the AC protocol, rather than aborting independently by the RMs, is preferable for preventing unnecessary aborts. Note that aborting transactions by the COCO is necessary only if a local cycle in its USG is not eliminated by some external entity (e.g., a scheduler that generates a cycle-free USG or one that uses aborts to resolve cycles), or if a global cycle (across two or more local USGs) is generated. The cycles are generated exclusively by the way resource access is scheduled and are independent of the commit order. Thus the COCO does not have to abort more transactions that need to be aborted for serializability violation prevention.

The following is an AC based CO procedure (CO-AC), which combines procedure 4.1 with a generic AC protocol. By the arguments given above, the procedure enforces CO (and thus 1SER) globally if executed by each RM in the environment, and if the condition MVC0 is maintained:

Procedure 5.1—CO-AC, The distributed CO procedure Repeat the following steps:

Select any transaction T in the USG, that meets the following conditions (using any criteria; selecting T that minimizes the cost of aborting the transactions in the set ABORT$_{CO}$(T), when T is later committed, is desirable):

T is in the ready state (i.e., has completed processing).

T is not in ABORT$_{CO}$(T') of any T' on which a YES vote has been issued (see discussion above).

No YES vote has been issued on any transaction in ABORT$_{CO}$(T)(see discussion above).

If such a T is found, then vote YES on T.

Later, asynchronously (after receiving a notification about the decision on T), do the following:

If T is committed by the AC protocol, commit T and abort all the transactions in the set ABORT$_{CO}$(T); otherwise (T is aborted by the AC protocol) abort T.

Remove T and the (possibly) other aborted transactions from the graph (they do not belong in the USG by definition).

The distributed CO procedure (procedure 5.1) above assumes that all the transactions are decided by the AC protocol. If a RM's scheduler "knows" that a ready transaction is local, i.e., does not span other RMs (vs. global which spans two or more), the (local) COCO itself decides whether to commit or abort it. Procedure 5.2 is an enhancement of the distributed CO procedure, where local transactions are decided locally, rather than being decided by the AC protocol. A knowledge about a transaction being local is usually acquired by a RM by an explicit notification from an application (program) that interacts with the RM.

Procedure 5.2—Distributed CO procedure that differentiates local transactions Repeat the following steps:

Select any ready transaction (i.e., a transaction that has completed processing) T in the USG, that is not in $ABORT_{CO}(T')$ of any T' on which a YES vote has been issued, and no YES vote has been issued on any transaction in $ABORT_{CO}(T)$(using any criteria, possibly by priorities assigned to each transaction; a priority can be changed dynamically as long as the transaction is in USG).

If T is global then vote YES on T, and later, asynchronously, do the following:

If T is committed by the AC protocol, commit T and abort all the transactions in the set $ABORT_{CO}(T)$; otherwise abort T.

Remove T and other aborted transactions (if any) from the graph (they do not belong in the USG by definition).

Otherwise, if T is local, do the following:

Commit T and abort all the transactions in the set $ABORT_{CO}(T)$.

Remove T and other aborted transactions (if any) from the graph (they do not belong in the USG by definition).

Remark: If all the transactions are assumed to be global, i.e., decided by the AC protocol (even local), this procedure reduces to procedure 5.1.

Theorem 4.1 and the discussions above imply the correctness of procedures 5.1 and 5.2:
Theorem 5.1

Procedures 5.1 and 5.2 guarantee global MV CO histories, if and only if the MVCO condition is maintained.

When a RM has the knowledge about transactions being local, the CO condition can be relaxed, and global 1SER can be achieved by enforcing locally in each RM the Extended Commitment Ordering (ECO) property together with (local) 1SER. ECO is defined in in Appendix I above, where a distributed ECO procedure, a generalization of procedure 5.2 above, is presented. Unlike CO, ECO enforces a (partial) order on the commit decision events of global transactions only. Like the CO procedures, also the ECO procedure is applicable to MV resources, provided that the MVCO condition is maintained.

We can now summarize some relationships between local CO histories (of individual RMs) and the properties induced by them on respective global histories. Note that the commit events in the definition of CO are interpreted as the commit decision events, occurring at an AC protocol system component (distributed Transaction Manager, TM).
Definition 5.1

For any history property X a (global) history is in Local-X, if the respective (local) history of every RM in the environment is in X.

Note that like for serializability (SER), also Local-1SER⊃1SER, i.e., a global history is not necessarily 1SER even if each respective local history is 1SER. (This follows by theorem 2.1, by examining a global CSG and its respective local CSGs.) However, since AC guarantees a single commit (decision) event for each committed transaction, the theorem below follows by definitions 3.1 and 5.1:
Theorem 5.2

Local-CO=CO i.e., a (global) history is in CO if and only if it is in Local-CO.

Proof: (i) Assume that a history H is in Local-CO. By the arguments given in the discussion above, for each RM that enforces CO and for any two committed transactions $T_1$ and $T_2$, $T_2$ is in a conflict with $T_1$ in the RM (reflected by the RM's operations), if and only if $c_1<c_2$ (the commit decision events). Thus for all the RM participating in both $T_1$ and $T_2$, either $T_2$ is in a conflict with $T_1$, or no conflict exists (the third possibility, $T_1$ being in a conflict with $T_2$, implies that $c_2<c_1$, a contradiction). Thus, the condition above is globally true, and H is in CO.

(ii) If H is in CO, then $T_2$ being in a conflict with $T_1$ implies $c_1<c_2$. This is true for all the RM that view this conflict (i.e., where $T_2$ is locally in a conflict with $T_1$). Thus every RM is in CO, and H is in Local-CO.

The following theorem is a consequence of theorems 3.1 and 5.2:
Theorem 5.3

1SER⊃Local-CO i.e., if a (global) history is in Local-CO then it is 1SER.

Theorem 5.3 means that if each RM provides CO, then global 1SER is guaranteed.

5.2 Distributed Queries

As was described in section 2.3, the main motivation for transient multi versioning is serializing queries before all the running updaters. If the MVACA condition (definition 4.2) is applied (at least for queries) with the distributed CO procedure, then this goal is achieved, and no specialized access strategy for queries (other than CO) is required. Otherwise, for non-SV, MV resources, queries may not participate in CO procedures, but rather use other access strategies. For SV resources, however, it is usually unavoidable that queries may serialize after some running updaters. Thus, to guarantee 1SER, a query accessing SV resources should be treated as an updater, i.e., participate in a CO procedure (unless query serialization before the updaters is somehow guaranteed).

The timestamping mechanism described for queries in section 2.3 can be used for multi RM queries as follows:

Upon logging the commit decision of an updater, the AC protocol assigns a global timestamp (i.e., unique in the multi RM environment) to the updater. This timestamp is propagated with the updater's commit messages to all the participating RMs. The updater's modified resources (its respective new versions) are timestamped upon locally being committed (by respective RMs).

A global timestamp is assigned to each query upon starting, and it propagates with the query invocations over the RMs spanned by the query. For any resource read, the query reads the latest (committed) version timestamped with a timestamp smaller than the query's timestamp.

Remarks:

The timestamp mechanism is unnecessary, if the MVACA condition (definition 4.2) is enforced for queries with the CO procedure.

Generating globally unique timestamps requires synchronizing the distributed AC protocol system components (transaction managers, TMs), i.e., additional synchronization messages are required.

These timestamps do not impose any blocking on updaters' operations.

The timestamps piggy-backed on commit messages violate RM autonomy as defined in section 1.

6 Necessary and Sufficient Conditions for Guaranteeing 1SER Globally

Definition 6.1

A system (any collection of interacting components/objects) guarantees a property P, if every reachable state of the system has property P.

Thus, a property $P_1$ is necessary (a necessary condition) to guarantee property P2, if when all the reachable states have property $P_2$, then they also have property $P_1$. Equivalently, the existence of a reachable state that does not have property $P_1$ implies the existence of a (possibly different) reachable state that does not have property $P_2$.

We concentrate on the case where systems' states are histories generated by the system. (The related state transition function has a history and an event set as its arguments. Its values on a given history and its prefixes, and on a given event set and int subsets, are compatible. Such a function is neither formalized nor explicitly used here.)

By theorem 3.1 Local-CO is a sufficient condition for a global history to be in 1SER. In this section it is shown that under the requirements of RM autonomy (as defined in section 1), guaranteeing Local-CO is also a necessary condition for guaranteeing 1SER globally in a multi-RM environment. By theorem 3.1 and definition 2.1 we immediately conclude the following:

Theorem 6.1 Guaranteeing Local-CO is a sufficient condition for guaranteeing global 1SER.

In what follows we show, using (informally) knowledge theoretic arguments (e.g., see [Halp 87], [Hadz 87]), under what conditions guaranteeing Local-CO is also a necessary condition for guaranteeing global 1SER:

Theorem 6.2 If all the RMs in the environment are autonomous (i.e., the RMs are coordinated solely via AC protocols), then guaranteeing Local-CO is a necessary condition for guaranteeing global 1SER.

Proof:

Let the environment guarantee (global) 1SER. Since guaranteeing 1SER implies guaranteeing Local-1SER (by theorem 2.1, considering the global CSG vs. the respective local CSGs), the environment guarantees Local1SER as well.

Suppose that guaranteeing Local-CO is not necessary for guaranteeing global 1SER under the conditions of RM autonomy. Let Y be the (most general) history property (class) such that Local-Y is necessary for guaranteeing global 1SER under RM autonomy conditions. Since Local-CO is a sufficient condition for 1SER (theorem 5.3), the following is true:

(i) Y⊃CO (strict containment; if CO⊃Y, then CO is the necessary property, contrary to our assumption above; if Y and CO are incomparable, Y cannot be the necessary property).

and thus:

(ii) 1SER⊃Local-Y⊃Local-CO.

Suppose that the environment includes two RMs (with local 1SER histories; see above). Assume that RM 1 generates histories in Y, and RM 2 generates histories in CO, which are also in Y (by (i)). Hence, the global histories are in Local-Y (by definition of Local-Y), and thus also in 1SER (by (ii)). We now schedule transactions in the environment above in such a way that the generated global history H includes the following elements and relationships among them: Since RM1 guarantees Y, we can schedule two global transactions (without loss of generality) $T_1$, $T_2$ such that $T_2$ is in a conflict with $T_1$ (for RM1), both are committed, and $c_2 < c_1$ (otherwise, if we cannot, Y collapses to CO, contrary to (i)). The above two transactions can be scheduled in RM2 in such a way that $T_1$ is in a conflict with $T_2$ (for RM2). The commitment order above, i.e., $c_2 < c_1$ is in agreement with CO for RM2, and thus consistent with the operation of RM2. Since no RM has any knowledge about the conflicts of transactions in the other RM, the situation described above is possible in normal operation. However, the conflicts above imply that CSG(H) has a cycle through $T_1$ and $T_2$, i.e., H is not in 1SER (theorem 2.1), and we have reached a contradiction. Hence, no such property Y exists, and CO is a necessary condition.

Note that when the RMs have the knowledge of autonomous RMs, and in addition the knowledge about transactions being local, i.e., they can distinguish between local and global transactions (defined to have the extended knowledge autonomy (EKA) property), then the more general property, Extended Commitment Ordering (ECO), is the necessary condition for guaranteeing global 1SER (see Appendix I, above; the proof presented there is applicable to MV histories as well).

By theorems 6.1 and 6.2 we conclude:

Corollary 6.1 Guaranteeing CO locally (Local-CO) is a necessary and sufficient condition for guaranteeing (global) 1SER in an environment of autonomous RMs.

7 Conclusion

This work provides a theoretic framework to deal with mixed, single and multi version resources. It demonstrates the Commitment Ordering (CO) property as an integrated solution for a correct global concurrency control in a heterogeneous environment of multi autonomous RMS. The RMs may use different (any) concurrency control mechanisms. The correctness criteria utilized are one-copy serializability (1SER) and recoverability (REC). Guaranteeing CO locally is shown to be a necessary and sufficient condition for guaranteeing 1SER globally over autonomous RMs. Atomic commitment (AC) based distributed procedures for enforcing CO (and thus 1SER) globally are presented. The simplicity of the CO procedures and the lack of any communication overhead (i.e., no messages beyond AC) in the distributed case, make CO an efficient and practical basis for concurrency control in a distributed, multi RM, high performance transaction processing environment. The MVC0 and MVACA conditions (see section 4) allow the CO procedure to exploit the transient multi-versioning benefits for queries. However, it is also possible to apply the CO procedures to updaters only, for preserving resource consistency. This can be done without interfering with specialized MV resource access strategies applied for queries, while query result consistency is maintained.

References

[Agra 89] Agrawal, D., Sengupta, S., "Modular Synchronization in Multiversion Databases: Version Control and Concurrency Control", in *Proc. of the ACM SIGMOD Int. Conf. on Management of Data*, pp. 408–417, Portland, Oreg., June 1989.

[Agra 92] D. Agrawal, A. El Abbadi, R. Jeffers, "An Approach to Eliminate Transaction Blocking in Locking Protocols", in *Proc. of the Eleventh ACM Symposium on Principles of Database Systems*, pp. 223–235, San Diego, Calif., June 1992.

[Bern 87] P. Bernstein, V. Hadzilacos, N. Goodman, *Concurrency Control and Recovery in Data-base Systems*, Addison-Wesley, 1987.

[Bobe 92a] Bober, P., Carey, M., "On Mixing Queries and Transactions via Multiversion Locking", in *Proc. of the*

*Eighth Int. Conf. on Data Engineering*, pp. 535–545, Tempe, February 1992.

[Bobe 92b] Bober, P., Carey, M., "Multiversion Query Locking", in *Proc. of the Eighteenth Int. Conf. on Very Large Databases*, pp. 497–510, Vancouver, British Columbia, August 1992.

[Brei 91] Y. Breibart, Dimitrios Georgakopoulos, Marek Rusinkiewicz, A. Silberschatz, "On Rigorous Transaction Scheduling", *IEEE Trans. Soft. Eng.*, 17(9), September 1991.

[Chan 85] Chan, A., Gray, R., "Implementing Distributed Read-Only Transactions", *IEEE Tras. on Soft. Eng.* 11(2), February 1985.

[Elma 90] A. Elmagarmid, W. Du, "A Paradigm for Concurrency Control in Heterogeneous Distributed Database Systems", *Proc. of the Sixth Int. Conf. on Data Engineering*, Los Angeles, Calif., February 1990.

[Garc 82] H. Garcia-Molina, G. Wiederhold, "Read-Only Transactions in a Distributed Database", *ACM Trans. Database Systems* 7(2), pp. 209–234, June 1982.

[Garc 88] H. Garcia-Molina, B. Kogan, "Node Autonomy in Distributed Systems", in *Proc. of the IEEE Int. Sym. on Databases in Parallel and Distributed Systems*, pp. 158–166, Austin, Tex., December 1988.

[Geor 91] Dimitrios Georgakopoulos, Marek Rusinkiewicz, Amit Sheth, "On serializability of Multi database Transactions Through Forced Local Conflicts", in *Proc. of the Seventh Int. Conf. on Data Engineering*, Kobe, Japan, April 1991.

[Gray 78] Gray, J. N., "Notes on Database Operating Systems", *Operating Systems: An Advanced Course*, Lecture Notes in Computer Science 60, pp. 393–481, Springer-Verlag, 1978.

[Hadz 87] Vassos Hadzilacos, "A Knowledge Theoretic Analysis of Atomic Commitment Protocols", *Proc. of the Sixth ACM Symposium on Principles of Database Systems*, pp. 129–134, Mar. 23–25, 1987.

[Hadz 88] Vassos Hadzilacos, "A Theory of Reliability in Database Systems", *Journal of the ACM*, (35)1, pp. 121–145, 1988.

[Halp 87] Joseph Y. Halpern, "Using Reasoning about Knowledge to Analyze Distributed Systems", Research Report RJ 5522 (56421) Mar. 3, 1987, Computer Science, IBM Almaden Research Center, San Jose, Calif., 1987.

[Kung 81] Kung, H. T., Robinson, J. T., "On Optimistic Methods for Concurrency Control", *ACM Trans. on Database Systems* 6(2), pp. 213–226, June 1981.

[InterBase] Marc Descolonges, "A Concurrency Control Model for Transaction Management", an abstract, in *Proc. of the ACM SIGMOD Int. Conf. on Management of Data*, pp. 164, San Diego, Calif., June 1992.

[Lamp 76] Lampson, B., Sturgis, H., "Crash Recovery in a Distributed Data Storage System", Technical Report, Xerox, Palo Alto Research Center, Palo Alto, Calif., 1976.

[Litw 89] Litwin, W., H. Tirri, "Flexible Concurrency Control Using Value Date", in *Integration of Information Systems: Bridging Heterogeneous Databases*, ed. A. Gupta, IEEE Press, 1989.

[Moha 92] C. Mohan, Hamid Pirahesh, Raymond Lorie, "Efficient and Flexible Methods for Transient Versioning to Avoid Locking by Read-Only Transactions", in *Proc. of the ACM SIGMOD Int. Conf. on Management of Data*, pp. 124–133, San Diego, Calif., June 1992.

[Oracle] Roger Bamford, "Using Multiversioning to Improve Performance without Loss of Consistency", an abstract, in *Proc. of the ACM SIGMOD Int. Conf. on Management of Data*, pp.164, San Diego, Calif., June 1992.

[Papa 86] Papadimitriou, C. H., *The Theory of Concurrency Control*, Computer Science Press, 1986.

[Pu 88] Calton Pu, "Transactions across Heterogeneous Databases: the Superdatabase Architecture", Technical Report No. CUCS-243-86 (revised June 1988), Department of Computer Science, Columbia University, New York, NY.

[Puus 91] J. Puustjarvi, "Distributed Management of Transactions in Heterogeneous Distributed Database Systems", BIT, 31(2), pp. 406–420, 1991.

[Ragh 91] Raghavan, A., Rengarajan, T. K., "Database Availability for Transaction Processing", *Digital Technical Journal* 3(1), Winter 1991.

[Raz 92] Yoav Raz, "The Principle of Commitment Ordering, or Guaranteeing Serializability in a Heterogeneous Environment of Multiple Autonomous Resource Managers, Using Atomic Commitment", in the *Proc. of the Eighteenth Int. Conf. on Very Large Data Bases*, pp. 292–312, Vancouver, Canada, August 1992.

[Rdb/VMS] Lilian Hobs and Ken England, *Rdb/VMS, A Comprehensive Guide*, (section 4.5), Digital Press, 1991.

[Shet 90] Amit Sheth, James Larson, "Federated Database Systems for Managing Distributed, Heterogeneous, and Autonomous Databases", *ACM Computing Surveys*, Vol. 22, No 3, pp. 183–236, September 1990.

[Silb 91] Avi Silberschatz, Michael Stonebraker, Jeff Ullman, "Database Systems: Achievements and Opportunities", *Communications of the ACM*, Vol. 34, No. 10, October 1991.

[Veij 92] J. Veijalainen, A. Wolski, "Prepare and Commit Certification for Decentralized Transaction Management in Rigorous Heterogeneous Multidatabases", in *Proc. of the Eighth Int. Conf. on Data Engineering*, Tempe, Ariz., February 1992.

[Weih 87] Weihl, W., "Distributed Version Management for Read-Only Actions", *IEEE Trans. on Soft. Eng.* 13(1), January 1987.

What is claimed is:

1. A method of operating a digital computer to process read-write transactions and read-only transactions in a computer system, said method comprising the steps of:

a) beginning preparation of results of said transactions;

b) determining an order of conflicts among said read-write transactions;

c) committing to memory state of said computer system prepared results of a selected one of said read-write transactions;

d) aborting an abort set of said read-write transactions for which commitment is contrary to said order of conflicts and said committing to memory state of said computer system said prepared results of said selected one of said read-write transactions;

e) retaining a prior version of memory state of said computer system existing prior to being updated by said prepared results of said selected one of said read-write transactions; and f) permitting selected ones of said read-only transactions to read said prior version of memory state after said prepared results of said selected one of said read-write transactions are committed to memory state of said computer system, while preventing said read-write transactions from reading said prior version of memory state after said prepared results' of said selected one of said read-write transactions are committed to memory state of said computer system.

2. The method as claimed in claim 1, wherein said step of determining said order of conflicts includes detecting when a data access operation for one of said read-write transactions addresses data accessed by data access operations for other ones of said read-write transactions.

3. The method as claimed in claim 1, wherein said read-only transactions are prevented from reading any results of said read-write transactions before said results of said read-write transactions are committed to said state memory, so that said read-only transactions do not conflict with said read-write transactions.

4. The method as claimed in claim 1, wherein said read-write transactions include global read-write transactions that are distributed across the computing system and local read-write transactions that are not distributed across the computing system, and said step of determining an order of conflicts among said read-write transactions disregards conflicts between said local read-write transactions but takes into account indirect conflicts between said global read-write transactions that are caused by said local read-write transactions.

5. The method as claimed in claim 1, wherein said step of determining an order of conflicts comprises recording in memory of said digital computer a graph of conflict orders between said transactions, and wherein said method further comprises searching said graph for determining said abort set of transactions, said abort set including a transaction on each path in said graph to said selected one of said global transactions from a global transaction not yet having results aborted or committed to memory state of said computer system.

6. The method as claimed in claim 1, further comprising the step of selecting said selected one of said read-write transactions in response to a commit command from a global coordinator.

7. The method as claimed in claim 1, further comprising the step of selecting said selected one of said read-write transactions in order to minimize the number of read-write transactions that are aborted in said step d).

8. The method as claimed in claim 1, further comprising the step of receiving from a coordinator a request to prepare a specified one of said read-write transactions, and delaying acknowledgement of completion of preparation of said specified one of said read-write transactions until none of said transactions not yet committed in step c) nor aborted in step d) are contrary to said order of conflicts and commitment of said specified one of said read-write transactions.

9. The method as claimed in claim 1, wherein a read operation of a second one of said read-write transactions reads write data written by a write operation of a first one of said read-write transactions before said first one of said read-write transactions is committed, and wherein said method further comprises the step of aborting results of all of said transactions that have read data written by aborted read-write transactions.

10. The method as claimed in claim 1, wherein a sufficient number of prior committed versions of memory state of said computer system are retained to process said read-only transactions by permitting each read-only transaction to read a version of memory state last committed prior to the time that processing of said each read-only transaction is begun and without delaying commitment of read-write transactions that update memory state to be read by said each read-only transaction.

11. The method as claimed in claim 1, wherein said computer system includes a plurality of processors, said read-write transactions include global read-write transactions that are distributed across the computer system and that are each processed and committed at more than one of said processors, and said read-only transactions include global read-only transactions that are distributed across the computer system and are each processed at more than one of said processors, and said method further includes synchronizing the processing of said global read-only transactions with commitment of results of said global read-write transactions at each of said processors so that each global read-only transaction reads results committed at one of said processors that are consistent with results committed, and read by said each global read-only transaction, at another of said processors.

12. The method as claimed in claim 11, wherein said synchronizing is performed by synchronizing transmission of commitment messages from a global update coordinator to said processors with initiation of said each global read-only transaction by a global query coordinator.

13. The method as claimed in claim 11, wherein said synchronizing is performed by serializing performance of said global read-only transactions with commitment of said read-write transactions.

14. The method as claimed in claim 11, wherein the performance of said global read-only transactions is serialized with the commitment of said read-write transactions by issuing a timestamp when each of said global read-write transactions is committed and when each of said global read-only transactions is initiated, and for each global read-only transaction, comparing the timestamp issued to said each global read-only transaction with timestamps issued to global read-write transactions to determine a proper version of said memory state of said computer system to be read by said each global read-only transaction.

15. A method of operating a digital computer to process read-write transactions and read-only transactions in a computer system, said method comprising the steps of:

a) beginning preparation of results of said transactions;

b) determining an order of conflicts among said read-write transactions by detecting when a data access operation for one of said read-write transactions addresses data accessed by data access operations for other ones of said read-write transactions;

c) committing to memory state of said computer system prepared results of a selected one of said read-write transactions;

d) aborting an abort set of said read-write transactions for which commitment is contrary to said order of conflicts and said committing to memory state of said computer system said prepared results of said selected one of said read-write transactions;

e) retaining a prior version of memory state of said computer system existing prior to being updated by said prepared results of said selected one of said read-write transactions; and f) maintaining a sufficient number of prior committed versions of memory state of said computer system to process said read-only transactions by permitting each read-only transaction to read a version of memory state last committed prior to the time that processing of said each read-only transaction is begun and without delaying commitment of read-write transactions that update memory state to be read by said each read-only transaction, while preventing said read-write transactions from reading any of said prior versions of memory state having been updated by committed ones of said read-write transactions, and preventing said read-only transactions from reading any results of said read-write transactions before said results of said read-write transactions are committed to said memory state of said computer system, so that said read-only transactions do not conflict with said read-write transactions.

16. The method as claimed in claim 15, wherein said computer system includes a plurality of processors, said read-write transactions include global read-write transactions that are distributed across the computing system and that are each processed and committed at more than one of said processors, and said read-only transactions include global read-only transactions that are distributed across the computing system and that are each processed at more than one of said processors, and said method further includes synchronizing the processing of said global read-only transactions with commitment of results of said global read-write transactions at each of said processors so that each global read-only transaction reads results committed at one of said processors that are consistent with results committed, and read by said each global read-only transaction, at another of said processors.

17. The method as claimed in claim 16, wherein said synchronizing is performed by synchronizing transmission of commitment messages from a global update coordinator to said processors with initiation of said each global read-only transaction by a global query coordinator.

18. The method as claimed in claim 16, wherein performance of said global read-only transactions is synchronized and serialized with commitment of said read-write transactions by issuing a timestamp when each of said global read-write transactions is committed and when each of said global read-only transactions is initiated, and for each global read-only transaction, comparing the timestamp issued to said each global read-only transaction with timestamps issued to global read-write transactions to determine the version of memory state last committed prior to the time that processing of said each global read-write transaction is begun.

19. A digital computer system for processing read-write transactions and read-only transactions, said digital computer system comprising, in combination:

a) means for performing operations of said read-write transactions such that operations of some read-write transactions are performed in accordance with availability of resources of said digital computer system before commitment of other read-write transactions;

b) means for determining an order of conflicts among said read-write transactions; and c) means for enforcing an order of commitment of selected ones of said read-write transactions in accordance with said order of conflicts, said means for enforcing including means for delaying commitment of selected read-write transactions and means for aborting an abort set of said read-write transactions selected so that committing of a selected one of said read-write transactions before commitment of other of said read-write transactions excluded from said abort set is consistent with said order of conflicts; and d) means for maintaining a sufficient number of prior committed versions of memory state of said computer system to process said read-only transactions by permitting each read-only transaction to read a version of memory state last committed prior to the time that processing of said each read-only transaction is begun and without delaying commitment of read-write transactions that update memory state to be read by said each read-only transaction, while preventing said read-write transactions from reading any prior versions of memory state having been updated by committed ones of said read-write transactions, and preventing said read-only transactions from reading any results of said read-write transactions before said results of said read-write transactions are committed to said memory state, so that said read-only transactions do not conflict with said read-write transactions.

20. The digital computer system as claimed in claim 19, further including means for delaying the aborting of read-write transactions in said abort set when said means for delaying commitment delays commitment of said selected one of said read-write transactions.

21. The digital computer system as claimed in claim 19, wherein said means for delaying includes means for delaying acknowledgement of completion of preparation of a selected one of said read-write transactions until committing of said specified one of said read-write transactions before committing all other of said read-write transactions not yet committed nor aborted is consistent with said order of conflicts.

22. The digital computer system as claimed in claim 21, further comprising means for terminating said delaying in response to a signal in an atomic commitment protocol.

23. The digital computer system as claimed in claim 19, wherein said means for aborting includes means for aborting all of said read-write transactions that have read data written by aborted read-write transactions.

24. The digital computer system as claimed in claim 19, wherein said means for determining said order of conflicts comprises means for recording in memory of said digital computer system a graph of conflict orders between said read-write transactions, and means for searching said graph for determining said abort set of read-write transactions, said abort set including a read-write transaction on each path in said graph to said selected one of said read-write transactions from a read-write transaction not yet having results aborted or committed to memory state of said digital computer system.

25. The digital computer system as claimed in claim 19, wherein said read-write transactions include global read-write transactions that are distributed across said computer system and that are each committed at more than one of said processors, and local read-write transactions that are not distributed across said computer system and that are each committed at only one of said processors, and wherein said digital computer system includes means employing write-locks for ensuring that local read-write transactions provide consistent results but permitting global transactions to disregard said write-locks, and wherein said means for determining an order of conflicts disregards conflicts between said local read-write transactions but takes into account indirect conflicts between said global read-write transactions caused by said local read-write transactions.

26. The digital computer system as claimed in claim 19, wherein said digital computer system includes a plurality of processors, said read-write transactions include global read-write transactions that are distributed across said processors and that are each processed and committed at more than one of said processors, and said read-only transactions include global read-only transactions that are distributed across said processors and that are each processed at more than one of said processors, and said computer system further includes means for synchronizing the processing of said global read-only transactions with commitment of results of said global read-write transactions at each of said processors so that each global read-only transaction reads results committed at one of said processors that are consistent with results committed, and read by said each global read-only transaction, at another of said processors.

27. The digital computer system as claimed in claim 26, wherein said means for synchronizing includes means for synchronizing transmission of commitment messages from a global update coordinator to said processors with initiation of said each global read-only transaction by a global query coordinator.

28. The digital computer system as claimed in claim 26, wherein said means for synchronizing includes means for serializing processing of said global read-only transactions with commitment of said read-write transactions by issuing a timestamp when each of said global read-write transactions is committed and when each of said global read-only transactions is initiated, and for each global read-only transaction, comparing the timestamp issued to said each global read-only transaction with timestamps issued to global read-write transactions to determine the version of memory state last committed prior to the time that processing of said each global read-write transaction is begun.

29. A method of operating a digital computer to process read-write transactions in a computer system, said method comprising the steps of:

a) beginning preparation of results of said read-write transactions, said results including uncommitted versions of memory state associated with said read-write transactions, and
   (i) preparing a first transaction by modifying a last committed version of memory state to create a first uncommitted version of memory state associated with said first transaction, and
   (ii) before committing said first uncommitted version to memory state of said computer system, preparing a second transaction by modifying said first uncommitted version of memory state to create a second uncommitted version of memory state associated with said second transaction;

b) determining an order of conflicts among said versions of memory state associated with said read-write transactions, wherein said order of conflicts includes said second uncommitted version of memory state following said first uncommitted version of memory state;

c) committing to memory state of said computer system prepared results of a selected one of said read-write transactions; and d) aborting an abort set of said uncommitted versions of memory state for which commitment is contrary to said order of conflicts and said committing to memory state of said computer system said prepared results of said selected one of said read-write transactions, and when said first uncommitted version of memory state is aborted, aborting said second uncommitted version.

30. The method as claimed in claim 29, wherein said beginning preparation of results of said read-write transactions includes following a predefined strategy for selecting either said last committed version or one of said uncommitted versions for access by a third transaction for which preparation has begun.

31. The method as claimed in claim 30, wherein said predefined strategy includes initially selecting said last committed version, and from said last committed version preparing a third uncommitted version associated with said third transaction, and after a conflict is detected between said third uncommitted version and said first uncommitted version wherein said third uncommitted version is based upon a resource of said last committed version having been modified in said first uncommitted version, preparing from said first uncommitted version a fourth uncommitted version associated with said third transaction.

32. A method of operating a digital computer to process read-write transactions in a computer system, said method comprising the steps of:

a) beginning preparation of results of said read-write transactions, said results including uncommitted versions of memory state associated with said transactions, including:
   (i) preparing a first transaction by modifying a last committed version of memory state to create a first uncommitted version of memory state associated with said first transaction, and
   (ii) preparing a second transaction by modifying said last committed version of memory state to create a second uncommitted version of memory state associated with said second transaction;

b) during preparation of said uncommitted versions, detecting conflicts between said uncommitted versions, said conflicts occurring when one uncommitted version includes a modified version of a resource of a prior version and another uncommitted version is based upon said resource of said prior version, wherein said first uncommitted version includes a modified version of a resource in said last committed version upon which said second uncommitted version is based, and said second uncommitted version includes a modified version of a resource in said last committed version upon which said first uncommitted version is based, so that said first uncommitted version and said second uncommitted version are mutually conflicting;

c) committing to memory state of said computer system an uncommitted version of memory state associated with a selected one of said read-write transactions; and d) aborting an abort set of said uncommitted versions of memory state which are based upon any resources of any prior version having been modified in said version of said memory state committed in step (c), wherein one of said first and second uncommitted versions is aborted when the other of said first and second uncommitted versions is committed in step (c).

33. The method as claimed in claim 32, wherein said beginning preparation of results of said read-write transactions includes following a predefined strategy for selecting either said last committed version or one of said uncommitted versions for access by a third transaction for which preparation has begun.

34. The method as claimed in claim in claim 33, wherein said predefined strategy includes initially selecting said last committed version, and from said last committed version preparing a third uncommitted version associated with said third transaction, and after a conflict is detected between said third uncommitted version and said first uncommitted version wherein said third uncommitted version is based upon a resource of said last committed version having been modified in said first uncommitted version, preparing from said first uncommitted version a fourth uncommitted version associated with said third transaction.

* * * * *